US009253166B2

(12) United States Patent
Gauda

(10) Patent No.: US 9,253,166 B2
(45) Date of Patent: Feb. 2, 2016

(54) CLOUD FILE SYSTEM

(75) Inventor: Anthony Francois Gauda, Palo Alto, CA (US)

(73) Assignee: BITCASA, INC., San Mateo, CA (US)

(*) Notice: Subject to any disclaimer, the term of this patent is extended or adjusted under 35 U.S.C. 154(b) by 267 days.

(21) Appl. No.: 13/977,643

(22) PCT Filed: May 14, 2012

(86) PCT No.: PCT/US2012/037860
§ 371 (c)(1),
(2), (4) Date: Jun. 28, 2013

(87) PCT Pub. No.: WO2012/158654
PCT Pub. Date: Nov. 22, 2012

(65) Prior Publication Data
US 2013/0305039 A1    Nov. 14, 2013

Related U.S. Application Data

(60) Provisional application No. 61/538,928, filed on Sep. 25, 2011, provisional application No. 61/533,264, filed on Sep. 11, 2011, provisional application No. 61/549,206, filed on Oct. 19, 2011, provisional application No. 61/486,240, filed on May 14, 2011.

(51) Int. Cl.
*G06F 21/62* (2013.01)
*H04L 29/06* (2006.01)

(52) U.S. Cl.
CPC ........ *H04L 63/0428* (2013.01); *G06F 21/6218* (2013.01); *G06F 21/6272* (2013.01); *G06F 2221/2107* (2013.01)

(58) Field of Classification Search
CPC ............ G06F 21/6218; G06F 21/6272; G06F 2221/2107; H04L 63/0428
USPC ........................................................ 713/153
See application file for complete search history.

(56) References Cited

U.S. PATENT DOCUMENTS

2010/0332401 A1    12/2010 Prahlad et al.
2010/0332456 A1    12/2010 Prahlad et al.
(Continued)

FOREIGN PATENT DOCUMENTS

EP            1299971 B1       3/2010

OTHER PUBLICATIONS

Mark W. Storer, et al., Secure Data Deduplication, StorageSS'08, Oct. 31, 2008, Fairfax, Virginia, USA, Copyright 2008 ACM, 10 pages.
(Continued)

*Primary Examiner* — Kambiz Zand
*Assistant Examiner* — Benjamin Kaplan
(74) *Attorney, Agent, or Firm* — Nicholson De Vos Webster & Elliott LLP

(57) ABSTRACT

A cloud storage system supporting user agnostic encryption and deduplication of encrypted files is described. Further the cloud storage system enables users to share a file, a group of files, or an entire file system with other users without a user sending each file to the other users. The cloud storage system further allows a client device to minimize the utilization of bandwidth by determining whether the encrypted data to transfer is already present in the cloud storage system. Further the cloud storage system comprises mechanisms for a client device to inform the cloud storage system of which data is likely to be required in the future so that the cloud storage system can make that data available with less latency one the client device requests the data.

162 Claims, 42 Drawing Sheets

(56) References Cited

U.S. PATENT DOCUMENTS

2010/0333116 A1 12/2010 Prahlad et al.
2011/0022642 A1 1/2011 deMilo et al.

OTHER PUBLICATIONS

Sarah Perez, With Bitcasa, The Entire Cloud Is Your Hard Drive for Only $10 Per Month, Sep. 12, 2011, TechCrunch, 11 pages.

Sarah Perez, Finally! Bitcasa CEO Explains How the Encryption Works, Sep. 18, 2011, TechCrunch, 3 pages.

BackupPC Info, Copyright 2001-2013, downloaded from the internet at: http://backuppc.sourceforge.net/info.html, on Aug. 18, 2011, 2 pages.

Douceur, et al., Reclaiming Space from Duplicate Files in a Serverless Distributed File System, Technical Report MSR-TR-2002-30, Microsoft Research, Microsoft Corporation, Jul. 2002, 14 pages.

Encrypted bandwidth-efficient backup using the rsync algorithm, Duplicity, downloaded at: http://duplicity.nongnu.org/, Jun. 18, 2011, 2 pages.

Nuts & Bolts, SpiderOak Inc., Copyright 2007-2011, downloaded Sep. 12, 2011, 5 pages.

Storer, et al., Secure Data Deduplication Storage, SS'08, Oct. 31, 2008, Fairfax, Virginia, USA, Copyright 2008 ACM, 10 pages.

Grolimund et al., Cryptree: A Folder Tree Structure for Cryptographic File Systems, 25th IEEE Symposium on Reliable Distributed Systems (SRDS'06), 2006, 10 pages.

Dropbox—Features—Online backup, file sync and sharing made easy, downloaded at: http://web.archive.org/web/20100316192428/http:/www.dropbox.com/features, Mar. 16, 2010, 2 pages.

Questions about Carbonite Online Backup, downloaded at: http://web.archive.org/web/20070425124734/http://www.carbonite.com/faqs_tech.aspx, Apr. 25, 2007, 4 pages.

Wuala Blog—Wuala's Encryption for Dummies, Apr. 21, 2011, downloaded at: http://www.wuala.com/blog/2011/04/wualas-encryption-for-dummies.html, 6 pages.

PCT International Search Report and Written Opinion for PCT/US2012/037860, mailed Jul. 16, 2012, 18 pages.

European Search Report for EP Application No. 12785102.0, dated Apr. 8, 2015, 7 pages.

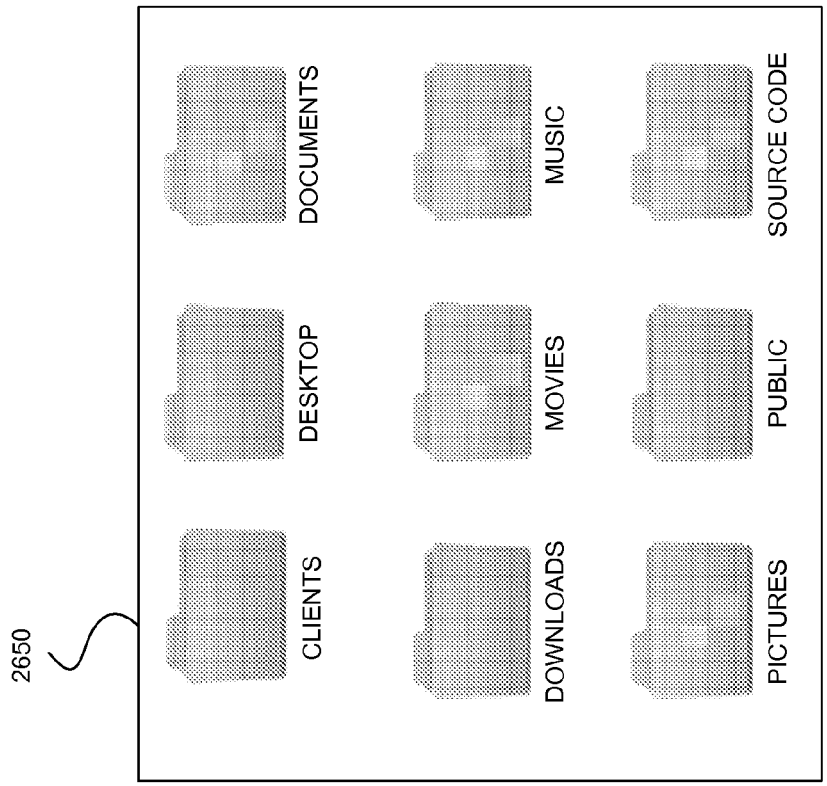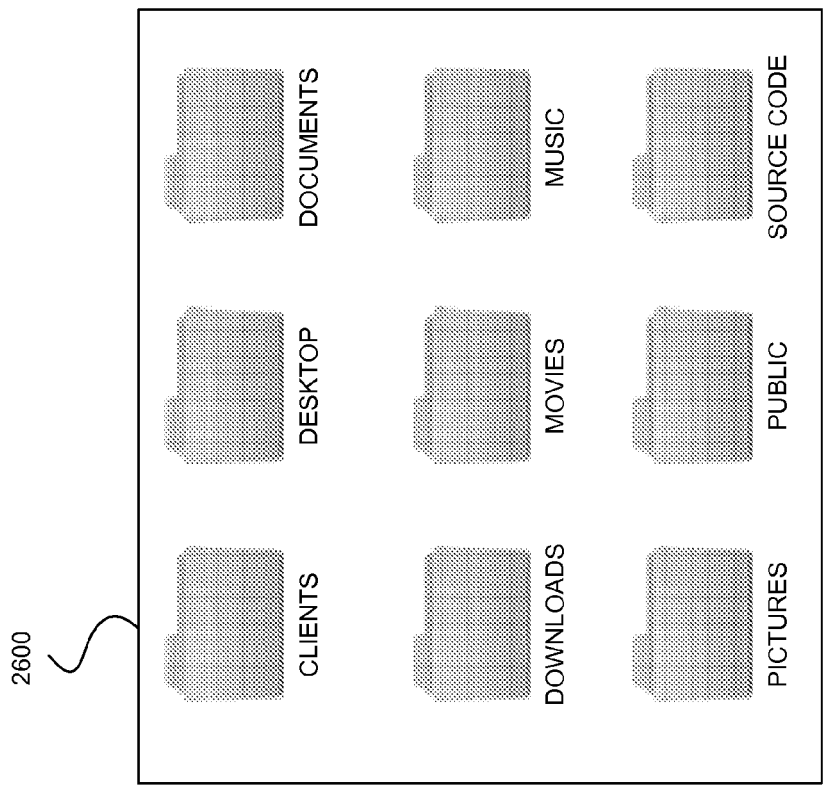
FIG. 26

CLOUD FILE SYSTEM

CROSS-REFERENCE TO RELATED APPLICATIONS

This patent application is a U.S. National Phase Application under 35 U.S.C. §371 of International Application No. PCT/US2012/037860, filed May 14, 2012, entitled CLOUD FILE SYSTEM WITH SERVER-SIDE DEDUPLICATION OF USER-AGNOSTIC ENCRYPTED FILES, which claims the benefit of the following U.S. Provisional Applications: U.S. Provisional Application No. 61/549,206 filed Oct. 19, 2011; U.S. Provisional Application No. 61/538,928 filed Sep. 25, 2011; U.S. Provisional Application No. 61/533,264 filed Sep. 11, 2011; and U.S. Provisional Application No. 61/486,240 filed May 14, 2011; each of which are hereby incorporated by reference.

FIELD

Embodiments of the invention relate to the field of network attached storage; and more specifically, to a cloud storage system.

BACKGROUND

As cloud based storage systems, online backup services, and large file transfer systems become commonplace, storage and bandwidth requirements are two critical factors which, if controlled, can lead to key competitive advantages. However, there is the competing factor that users of these online storage systems desired that their data be secure from both the operators of such services and other users from the services.

The traditional way of implementing an online file system as a service to customers is to allow each user to upload files to the online storage system through a world wide web interface, across a file transfer protocol connection, or other file transport protocol. Typically, the files are sent to the service unencrypted meaning the operator of the service could access the user's data. In some cases, the services encrypt the data for storage within their service while in other cases the services provide client software that encrypts data prior to uploading the data to the service. In cases where the client encrypts data prior to uploading, the traditional method is to 1) have a client encrypt a file using some unique encryption key (e.g., user password or public key); 2) have the client upload the encrypted file; 3) store the encrypted file on the server.

The traditional means of providing an encrypted upload to clients of online storage systems presents a number of drawbacks. First, it is possible that two distinct clients have exact copies of data (e.g., pictures, movies, songs, documents) that each client stores in the online storage system. However, since both files would be uniquely encrypted by each client, the encrypted data is not identical and the online storage system must store two copies of the same unencrypted data (albeit in encrypted form). The service is unable to store just one copy of this data as each client would only be able to decrypt the copy that client uploaded.

One alternative approach is to have the service manage the encryption keys on the server side and, thus, be capable of decrypting files that the clients upload. The server is then able to determine that two decrypted files are identical and store just one copy of the decrypted data. Then, when each client requests its data the server encrypts the data with that client's encryption key and transmits the requested file. This approach compromises security in that the operator has complete access to each client's data. Unscrupulous operators may rifle through their client's data. Further, the service itself is a single point of weakness and a successful breach in security exposes all of the clients' data.

Under either the traditional or alternative approach described, each time a client saves a file to the online storage system, the client must upload the encrypted data regardless of whether a copy of that file (in encrypted or unencrypted form) already exists in the online storage system. Thus, even under the alternative approach described the client wastes valuable bandwidth resources uploading data the server does not need because the online storage system already has the data in its storage pool.

BRIEF DESCRIPTION OF THE DRAWINGS

The invention may best be understood by referring to the following description and accompanying drawings that are used to illustrate embodiments of the invention. In the drawings:

FIG. 20 illustrates a user interface listing files stored in a cloud file system in accordance with embodiments of the invention.

FIG. 22 illustrates a user interface provided by a cloud file system client module for managing cloud file system access on a client device in accordance with embodiments of the invention.

FIG. 26 illustrates a user interface showing a sub-set of file system elements before and after conversion to storage in a cloud file system according to embodiments of the invention.

DESCRIPTION OF EMBODIMENTS

Figure 1:
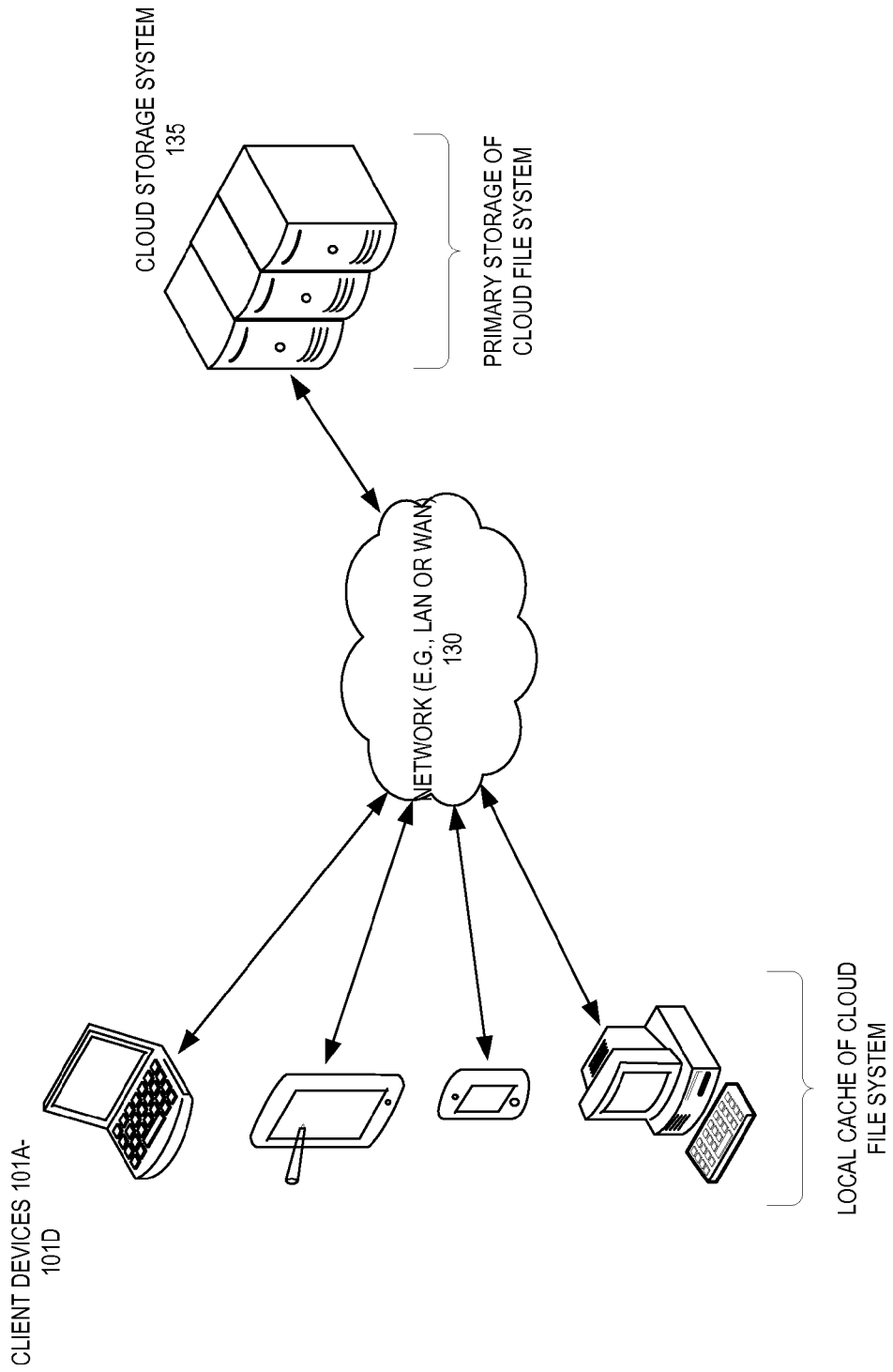
FIG. 1 is block diagram illustrating a cloud storage system coupled with client devices according to embodiments of the invention.

It is desirable to construct a storage system (a "cloud storage system") which stores encrypted client data, eliminates duplication of data stored in the cloud storage system without having client encryption keys on the servers, and minimizes bandwidth utilization. The following description describes methods and apparatus for generating a cloud storage system that minimizes duplication of data in the cloud storage system while providing end-to-end encryption of data and minimizing bandwidth utilization.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The techniques shown in the figures can be implemented using code and data stored and executed on one or more electronic devices. Such electronic devices store and communicate (internally and/or with other electronic devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible machine readable medium and transitory machine-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

FIG. 1 is block diagram illustrating a cloud storage system coupled with client devices according to embodiments of the invention. In traditional online storage systems the online storage of client data secondary, e.g. a backup, to the storage of the client's data on the client's device. Therefore, each file is stored primarily on the client device and copies of those files are stored in the online storage system. This presents the problems requiring a client device to be capable of storing at least as much data as the client is storing in the online storage system or creating a logistical problem of maintaining synchronization between data stored on the client device and in the online storage system. For example, the user perceives the data in online storage system as a copy of data on their device rather than perceiving data in the online storage system as an extension of their device.

FIG. 1 shows a plurality of client devices 101A-D coupled with a cloud storage system 135 through a communication network 130, such as a local area network or wide area network. Embodiments of the invention support many different client devices. Client devices are computing devices that are capable of accessing files and communicating across a network connection. For example, a client device can be a desktop computer, a laptop computer, a server, a tablet computer, a palm computer, a smart phone, a set top box, or a gaming console. One of skill in the art would recognize that the client devices described are exemplary and by no means limiting to the client devices supported by embodiments of the invention.

In FIG. 1 the cloud storage system 135 acts as a primary storage of data for cloud file systems ("CFS"). Furthermore, the client devices 101A-D are configured to run a CFS client module configured to access the CFSs. The CFS client module further manages a local cache of the CFSs utilized by that client device 101A-B. The local cache in each client device 101A-D is largely transparent to users of client device 101A-D. Further, while a user, utilizing a client device 101A, is shown the appearance of each file and folder stored in that user's CFS, not all data required for accessing all of those files and folders is always present in the local cache of that user's CFS. As the user accesses a file from his CFS the client device 101A retrieves any data from the cloud storage system 135 that is not present in his client device's 101A local cache and is required to access that file. As the local cache in the user's client device 101A fills with data from the cloud storage system 135, the client device 101A evicts data from the local cache to make room for data from the cloud storage system 135. In at least one embodiment, the data located in the local cache of the CFS can be marked for non-eviction ("pinned") so during eviction pinned data will not be evicted from the local cache of the CFS. In at least one embodiment, the client device 101A presents the contents of the CFS to the user as if the CFS is a local device.

For example, the CFS client module may include a database of file chunks that are present in the local cache of the CFS. The database of file chunks would comprise information used by the CFS client module to track which file chunks are present, which file chunks may be evicted to make room for more file chunks, which file chunks have been pinned for local caching, which file chunks have been saved to the cloud storage system, and how much space is being used by the local cache. One method the CFS client module may use to determine which file chunks should be evicted is to determine the timestamp each of the cached file chunks was last used by the client device; for instance, the database would include a field that is updated each time a file chunk is accessed by the CFS client module. The CFS client module would then be able to determine any file chunks that have not been recently accessed, for example accessed in the last thirty days, and elect those for eviction first. The CFS client module could track the access/use of a file chunk whenever the CFS client module attempts to retrieve a file chunk as described with reference to FIG. 8. The CFS client module may further track how often a file chunk has been used by incrementing a counter in the database each time a file chunk is used. Then the CFS client module can take into account the used counter when determining which file chunks should be evicted such that between two otherwise equal eviction candidates, the candidate with a lowed used count would be evicted first. It will be appreciated by those skilled in the art that other eviction strategies may be implemented which include more, less, or different eviction criteria. For example, it will be appreciated that the CFS client module would cache the file chunks in the client device's local storage system and a user may be enabled to set a storage limit for the local cache such that the CFS client module starts evicting file chunks as that storage limit is approached or exceeded by the data in the local cache.

In one embodiment of the database of file chunks, the file chunks themselves are also stored in the database while in another embodiment the file chunks are stored separately from the database and the database is used for tracking of this file chunks.

These features present the distinct advantage of seamlessly integrating a CFS with client device 101A such that the user can treat the CFS similarly to other storage systems available to the client device 101A. Furthermore, the CFS is capable of storing far more data than the amount of data saved the local cache in client device 101A. For example, if the client device's local storage system can store 80 gigabytes ("GB") of data and the local cache is limited to 12.5% of the local storage system, then the local cache is 10 GBs. However, the CFS may comprise every file ever stored in the cloud storage system. The amount of data is likely far greater than 10 GBs and is probably orders of magnitude, perhaps 100 terabytes. Since the CFS client module only keeps up to 10 GBs at a time, the CFS client module is able to represent all the files available to a user on the client device without actually having all the data needed for those files. As a user accesses files in the CFS, the CFS client module retrieves needed data from the cloud storage system. It should be noted that the amount of storage space available to the client device for storage in the CFS is not limited based on the client device's local storage system, which only requires enough storage space to provide adequate space for the local cache. Rather, the amount of storage space available to the client device for storage in the CFS is limited based on the amount of storage in the cloud storage system.

This creates many desirable usage models for users on a client device. For example, by using a CFS the user has access to vast amounts of storage space without ever adding large storage devices to the client device. As a user fills the capacity of their local storage system, it is possible to move data into the cloud storage system to free capacity in the local storage system.

Further files are available to all of a user's client devices by mounting the CFS on that device and the CFS is available to another client device once the CFS is mounted. As such, it is possible to provide a client device with access to files by granting access (read or write access) to a CFS. Then as the client devices accesses files, that file data is retrieved from the cloud storage system, making sharing of data across devices seamless and noticeable faster than waiting to download an entire library of files to share. Further, a user with a large media collection could convert their media library folder to a folder in the CFS and share that CFS with all of the user's devices. Then all of the user's media collection would be available to any client device that mounted the CFS. Further, the user can easily create a snapshot, or a new version, of an entire file system simply by copying a CFS manifest to a new name without uploading any additional file data or storing copies of the files in the CFS thereby allowing a user to keep multiple versions of entire file systems at his fingertips.

Further, as the CFS client module becomes more integrated with a device, for example becoming part of an operating system loaded very early in the initialization of a client device, then more and more files can be stored in the cloud storage system. In fact not only would a user's documents be available in the CFS, but even applications could be made available in the CFS. In fact manufacturers could easily integrate the CFS client module into the operating system on a cloud device and push operating system files and application files to the client device by updating a CFS and sharing the CFS with the client device which accesses its files from the CFS.

Further, content providers now have an easy method of distributing content to subscribers by generating a CFS containing their content and sharing the CFS with users. In fact, the content provider could generate individual cloud file systems specific to each user all containing the same content and only upload the content one time since each user would have access to the content once the user mounted his specific CFS. In fact, utilizing central access control capabilities of the cloud storage system, the content provider could disable access to CFS to users no longer subscribed.

In one embodiment, the cloud storage system 135 is a service provided to users that join the service and, generally, open to the public to join. Another embodiment of the invention allows an enterprise to maintain a cloud storage system 135 for client devices 101A-101D that are members of the enterprise.

Figure 2:
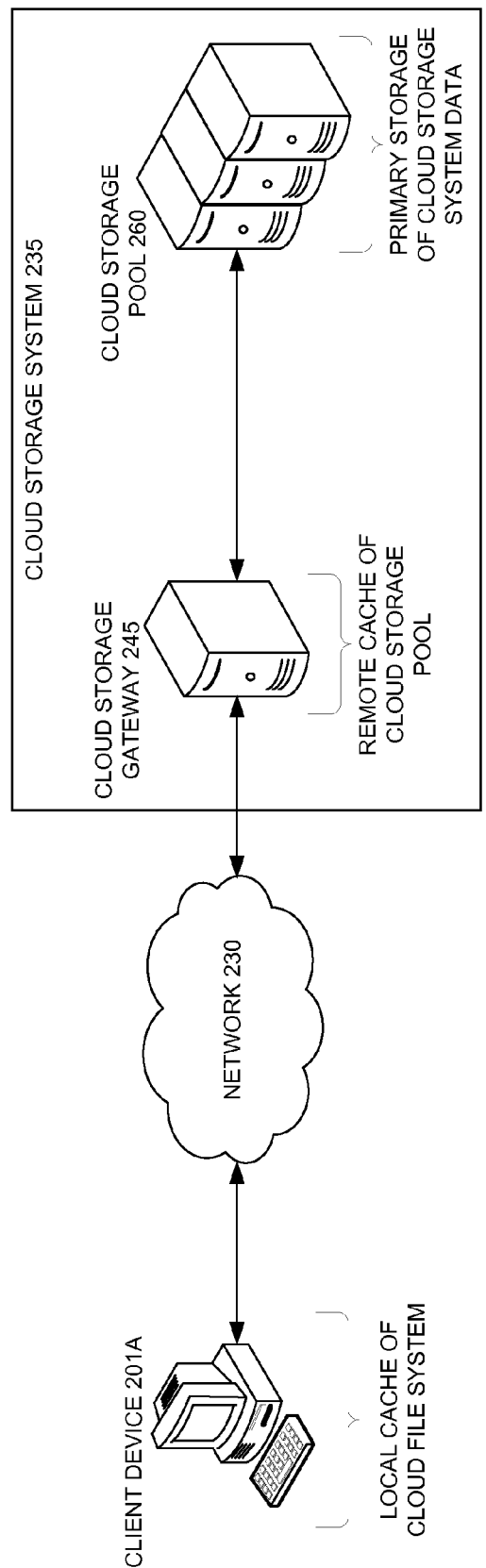
FIG. 2 is block diagram illustrating a cloud storage system comprising a cloud storage gateway and a cloud storage pool.

FIG. 2 is block diagram illustrating a cloud storage system comprising a cloud storage gateway and a cloud storage pool. In FIG. 2, a client device 201A, such as one of the client devices 101A-D, is coupled with a cloud storage system 235 through a communication network 230. The cloud storage system 235 comprises a cloud storage gateway 245 which is coupled with a cloud storage pool 260. The cloud storage gateway 245 communicates with the client device 201A and the cloud storage pool 260.

The cloud storage gateway 245 translates requests from the client device 201A to cloud storage system 235 application programming interface ("API") calls. Furthermore, in at least one embodiment, the cloud storage gateway includes a remote cache of the cloud storage pool 260. Thus, the cloud storage gateway 245 receives requests for data as the client device requests data from the cloud storage system 235. In turn the cloud storage gateway 245 utilizes cloud storage system 235 API calls to request data from the cloud storage pool 260. As the cloud storage gateway 245 receives the requested data from the cloud storage pool 260 the cloud storage gateway 260 transmits the requested data back to the client device 201A. Further, in embodiments where the cloud storage gateway 245 includes a remote cache of the cloud storage pool 260, the cloud storage gateway 245 saves the requested data in the remote cache of the cloud storage pool 260 such that future requests for the requested data from the client device 201A, or other client devices (not shown), can be serviced without communicating with the cloud storage pool 260. As the remote cache of the cloud storage pool 260 fills, the cloud storage gateway 245 evicts data from the remote cache of the cloud storage pool 260 to make room for more data from the cloud storage pool 260.

Figure 3:
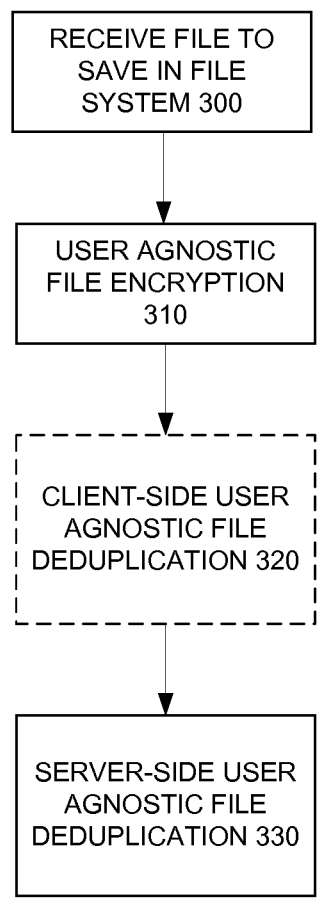
FIG. 3 illustrates a flow chart of a method for saving a file in a cloud file system stored in accordance with embodiments of the invention.

FIG. 3 illustrates a flow chart of a method for saving a file in a CFS stored in accordance with embodiments of the invention. In FIG. 3, a client device is running a CFS client module. The CFS client module receives a file to save in the CFS at block 300, the CFS being primarily stored in a cloud storage system. The CFS client module encrypts the file with a user agnostic file encryption function at block 310.

As described in the background, traditional client-side encryption encrypts data with keys that are unique to each user or client device. Therefore, the same data encrypted by two clients using traditional client-side encryption has a high probability having differences between the resulting encrypted data. However, the user agnostic file encryption differs from traditional encryption in that two files with the same data encrypted by different users or client devices will produce files with identical encrypted data.

The CFS client module continues at block 320 by storing the encrypted file in a local cache of the CFS on the client device. The CFS client module utilizes user agnostic deduplication to store the encrypted file on the client device. When utilizing user agnostic deduplication, the CFS client module is able to recognize when the encrypted file is already present in the local cache of the CFS and does not store a second copy of the encrypted file.

The CFS client module continues at block 330 by performing a server-side user agnostic file deduplication wherein the CFS client module determines whether the encrypted file is already present in the cloud storage system. In the case that the encrypted file is not present in the cloud storage system, the CFS client module transmits the encrypted data to the cloud storage system. The server-side user agnostic file deduplication enables the CFS client module to cause the cloud storage system to store the encrypted file such that other users or client devices can access the encrypted file from the cloud storage system given the other users or client devices can identify the encrypted file. However, although the other users or client devices may have access to the encrypted file, the other users or client devices would not be able to decrypt the encrypted file without previously generating or receiving the encryption key used by the user agnostic file encryption function.

Figure 4:
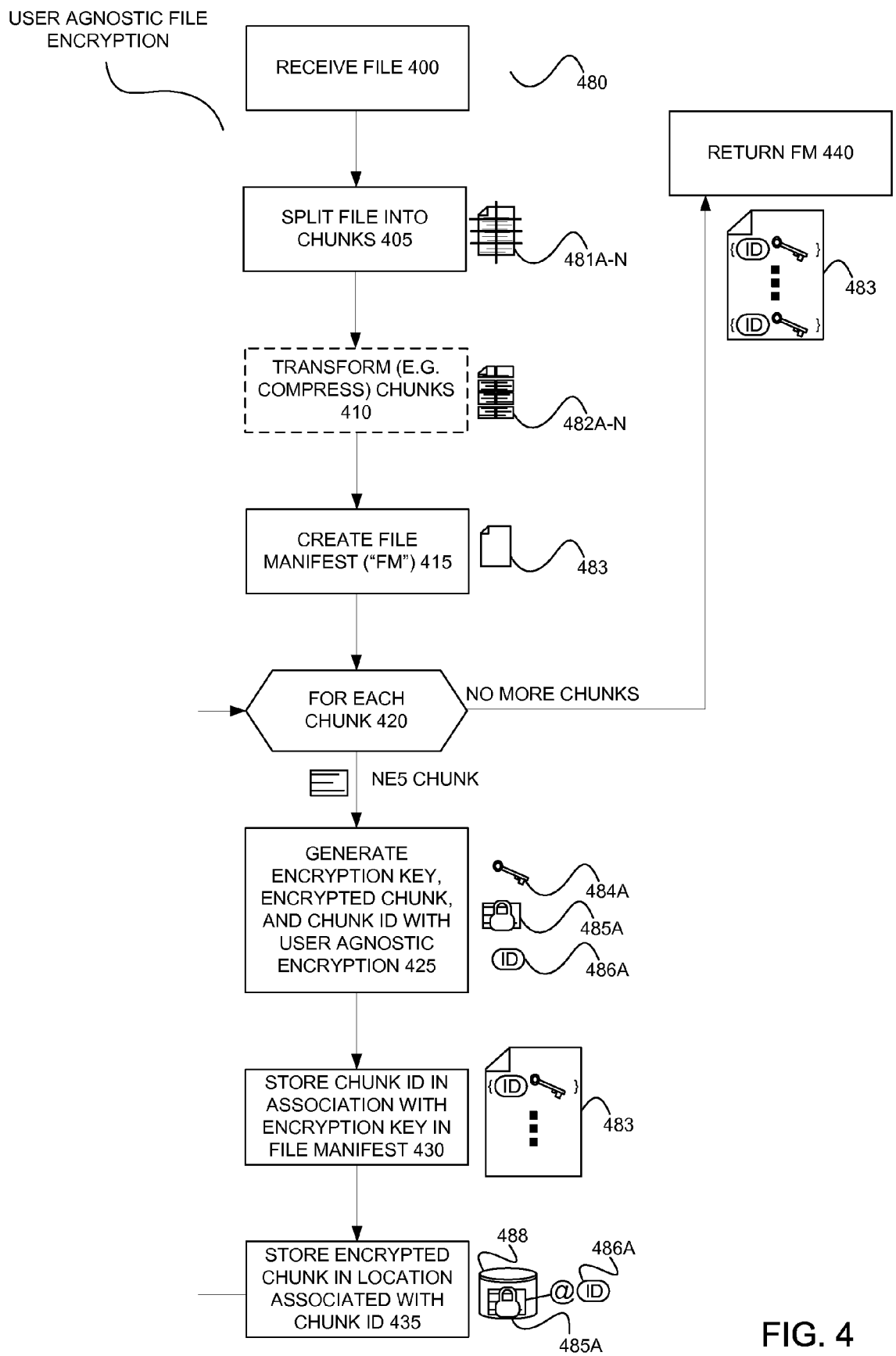
FIG. 4 illustrates a flow chart of a method for performing user agnostic file encryption in accordance with embodiments of the invention.

FIG. 4 illustrates a flow chart of a method for performing user agnostic file encryption in accordance with embodiments of the invention. In FIG. 4, a client device is running a CFS client module that interacts with a cloud storage system. The CFS client module receives a file 480 to compress and encrypt at block 400. At block 405 the CFS client module splits the file 480 into a set of chunks 481A-N.

In at least one embodiment, the CFS client module determines one or more of the chunks will benefit from a data transformation function and in that case transforms those chunks that will benefit from the transformation. For example, chunks of data may benefit from a compression transformation, such as zip bzip or gzip, thereby reducing the size of the chunk. Still further, some chunks would not benefit from transformation, or it would not be desirable to transform those chunks, and therefore no transformation will occur on those chunks.

In block 410, the CFS client module generates a set of compressed chunks 482A-N. In one embodiment, the CFS client module further embeds information into the compressed chunk describing how the chunk was transformed (e.g., which compression algorithm was utilized). As described above, it may be that one of more of the compressed chunks 482A-N is identical to the chunk from which it derived (i.e. no compression or transformation occurred). Further, one of skill in the art would recognize that compression of chunks could occur at another time in processing the chunks. For example, compression could occur after the encryption key was generated in block 425 but prior to encryption of the chunk. Even still, compression could even after encryption of the chunk in block 430, although conventional understand suggests that compression of encrypted data does not produce results as favorable of encryption on unencrypted data.

The CFS client module generates a file manifest 483 at block 415. The CFS client module iterates through each chunk in the set of compressed chunks 482A-N at block 420. Using each chunk, e.g. chunk 482A, the CFS client module generates an encryption key 484A, an encrypted chunk 485A, and a chunk identifier ("ID") 486A from chunk 482A with user agnostic encryption in block 425. In block 430, the CFS client module stores the chunk ID 486A and the encryption key 484A in the file manifest 483. The CFS client module stores each chunk ID 486A-N and the encryption key 484A-N in the file manifest 483 in the order the corresponding chunk 481A-N appear in the file 480. The encryption keys 484A-N are sometimes referred herein as user agnostic encryption keys.

In block 435 the CFS client module stores the encrypted chunk 485A in the cloud storage system at a location corresponding to the chunk ID 486A. For example, the CFS client module may invoke a communication thread responsible for transmitting the encrypted chunk 485A to the cloud storage system for storage. This way the CFS client module may invoke a plurality of communication threads for uploading a plurality of chunks to the cloud storage system. These threads may be managed by the CFS client module such that at any given time only a designated number of threads exist and only a designated amount of bandwidth is consumed such that the client device's performance is not degraded by the CFS client module. Further, the CFS client module can prioritize the communication threads such that certain chunks are transmitted prior to other chunks. For example, if the CFS client module receives an indication that a CFS has been shared with other users or devices, then the CFS client module can prioritize the upload of encrypted chunks associated with the shared CFS. In this way, encrypted chunks that may be requested from other users and client devices will be uploaded to the cloud storage system before other encrypted chunks that have not been shared with other user or client devices.

In one embodiment, the client device includes a local cache of the CFS and the CFS client module determines whether the local cache of the CFS already contains an encrypted chunk at the location corresponding to the chunk ID 486A. Since chunks are encrypted with user agnostic encryption, the chunk ID 486A corresponds with the encrypted data 485A regardless of whether it was generated by another user or client device. Therefore, if the local cache of the CFS contains an encrypted chunk at the location corresponding to the chunk ID 486A then that encrypted chunk is identical to the encrypted chunk 485A and the CFS client module need not store the encrypted chunk 485A again.

Similarly, the CFS client module can inquire the cloud storage system whether the cloud storage system contains an encrypted chunk at the location corresponding to the chunk ID 486A and, if the cloud storage system does not, the CFS client module can queue an upload of the encrypted chunk 485A and chunk ID 486A to the cloud storage system. For example, a cloud storage system generates a data structure indicating data that is present in the cloud storage system. This data structure is communicated to the client device and the CFS client module inquires with the data structure to the presence of a chunk. This way, the CFS client module does not have to upload chunks that already exist in the cloud storage system. In one embodiment, the data structure is a hash table of all chunk IDs present in the cloud storage system. In another embodiment, the data structure is a bloom filter that is used to determine which chunks are present in the cloud storage system. Still other data structures may be provided to allow the CFS client module to inquire regarding which chunks are present in the cloud storage system or the CFS client module may communicate the inquiry with the cloud storage system which in turn responds with the status of the chunk's presence in the cloud storage system.

The inquiry of which chunks already exist in the cloud storage system presents significant advantages. Specifically, the cloud storage system can be seeded with data from any client device since the stored chunks of identical data are identical regardless of which client device or user stored the chunk into the cloud storage system. A service provider, for example, could seed the cloud storage system with data it determines will be highly likely to be on client devices. For example, applications and operating system files have a high degree of identity across users and client devices. If this data is added to the cloud storage system by any of the service provider, a client device, or a user; than any subsequent client device or user will not have to upload the data since it already exists in the cloud storage system. Because data transmission consumes valuable resources (e.g. time required to upload and bandwidth usage, which may have a monetary cost associated) the lack of uploading the data presents savings to the service provider and the client device/user. This same savings can be gained with the storage of media data which has a high degree of identity. For example, a song or movie retrieved from a content distributor is likely to have a high degree of identity regardless of which user retrieved said data. Once a first user or client device stores that data into the cloud storage system, other client devices or users will have no need to upload the data again.

At block 440, the user agnostic encryption function returns the completed file manifest 483 for further processing, such as adding the file manifest 484 to a file system manifest containing the details of the files and folders location in the CFS.

Figure 5:
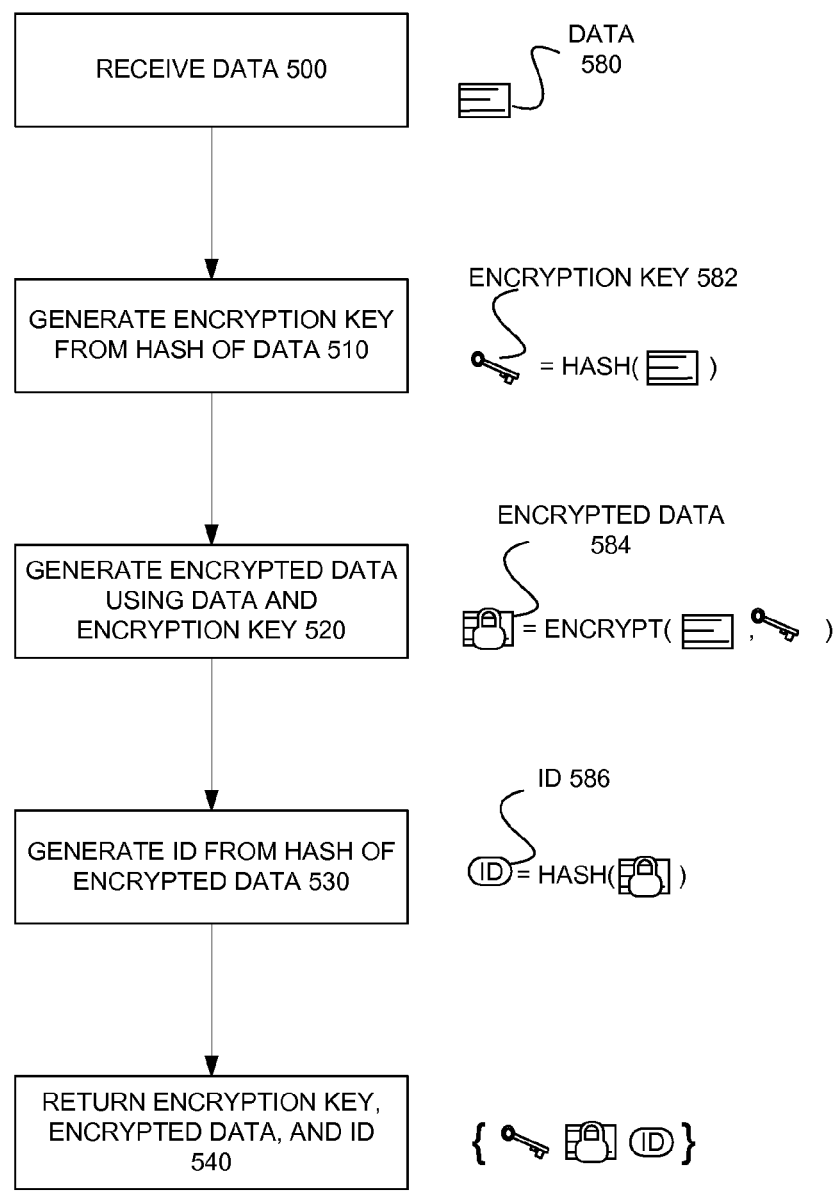
FIG. 5 illustrates a flow chart of a method for performing user agnostic encryption of data in accordance with embodiments of the invention.

FIG. 5 illustrates a flow chart of a method for performing user agnostic encryption of data in accordance with embodiments of the invention. In block 500 the user agnostic encryption method receives data (e.g. a chunk of file, a file, a file manifest, etc.) 580 to encrypt. The method then generates an encryption key 582 from the data 580. The encryption key 582 can be any key that will be identically generated regardless of the user or client device generating the encryption key 582 for that particular data 580.

For example, the encryption key 582 could be the result of hashing the data 580. Examples of desirable hashing algorithms include cryptographic hash functions; e.g., a secure hash algorithm ("SHA", like SHA-0, SHA-1, SHA-256, or SHA-512) or a message-digest ("MD") algorithm (like MD-2, MD-4, or MD-5). In other embodiments, the encryption key 582 could be calculated via other algorithms. For example, the encryption key 582 could be calculated as simply as retrieving a predetermined sub-set of the data 580.

The user agnostic encryption method continues at block 520 by generating encrypted data 584 using the data 580 and the encryption key 582. The data 580 can be encrypted with any suitable encryption symmetric or asymmetric encryption algorithm. Non-limiting examples of suitable encryption algorithms include Advanced Encryption Standard ("AES"), Data Encryption Standard ("DES"), Triple DES, Blowfish, Twofish, Serpent, Rivest-Shamir-Adleman ("RSA"), NTRUEncrypt, and Elliptic Curve Cryptography ("ECC"). In any case, a suitable encryption algorithm and encryption key generation method are selected so that the generated encryption key 582 is usable by the selected encryption algorithm.

In block 530, an ID 586 is generated from the encrypted data 584. The ID 586 can be any ID that will be identically generated regardless of the user or client device generating the ID 586 for that particular data 580. For example, the ID 586 could be the result of hashing the encrypted data 584. As described with reference to block 510, any suitable hashing algorithm may be used. In other embodiments, the ID 586 could be calculated via other algorithms such as retrieving a predetermined sub-set of the encrypted data 586. Still further embodiments of the invention may generate the ID 586 using the data 580 rather than the encrypted data 586, though such embodiments may expose the encrypted data 586 to potential security risks. In block 540, the user agnostic encryption method returns the encryption key 582, the encrypted data 584, and the ID 586. It would be appreciated by one of skill in the art that the CFS client module may wish to embed information with the encrypted data 584. For example, the CFS client module may prepend the encrypted data with a fixed, or variable, width chunk header. The chunk header could include information such has block type, encoding type, and original size. This block header could then be used by the cloud storage system and/or CFS client modules to validate data and/or to assist in the decryption/decompression of encrypted chunks. In one embodiment, the chunk header includes the block type (one byte), encoding type (one bye), and original size (four byes). While another embodiment the chunk header includes more, less, or other fields. For example, one embodiment of the invention generates a chunk header comprised of an encoding type and original size only.

Embodiments of the invention are described with reference to symmetric encryption algorithms in which the same key used to encrypt data is also used to decrypt data. However, using an asymmetric algorithm, one that utilizes one key for encryption and a different corresponding key for decryption, is equally operable. When using an asymmetric encryption function for the user agnostic encryption, the user agnostic encryption method described would need to return a decryption key corresponding to the generated encryption key 582 instead of the encryption key 582. Likewise, other references to saving an encryption key for future decryption of encrypted data would instead save the corresponding decryption key.

In one embodiment of the invention it is necessary for each user and client device to utilize the same algorithm when generating the ID 586 so that data stored in the location identified by ID 586 is identical for all users and client devices accessing said data. Further, while it is described that numerous algorithms may be used to generate the encryption key 582, the encrypted data 584, and the encrypted data 586, it would be appreciated by one skilled in the art that certain advantages exist when selecting the same algorithms for all users within a particular system. Particularly, when each user or client device utilizing a given cloud storage system employs a given set of algorithms, then for identical data each user or client device will generate identical encryption keys, encrypted data, and IDs. Therefore, although the encryption of the data will be user agnostic, the cloud storage system will be able to identify encrypted data by its corresponding ID and only store one copy of that data.

Figure 6:
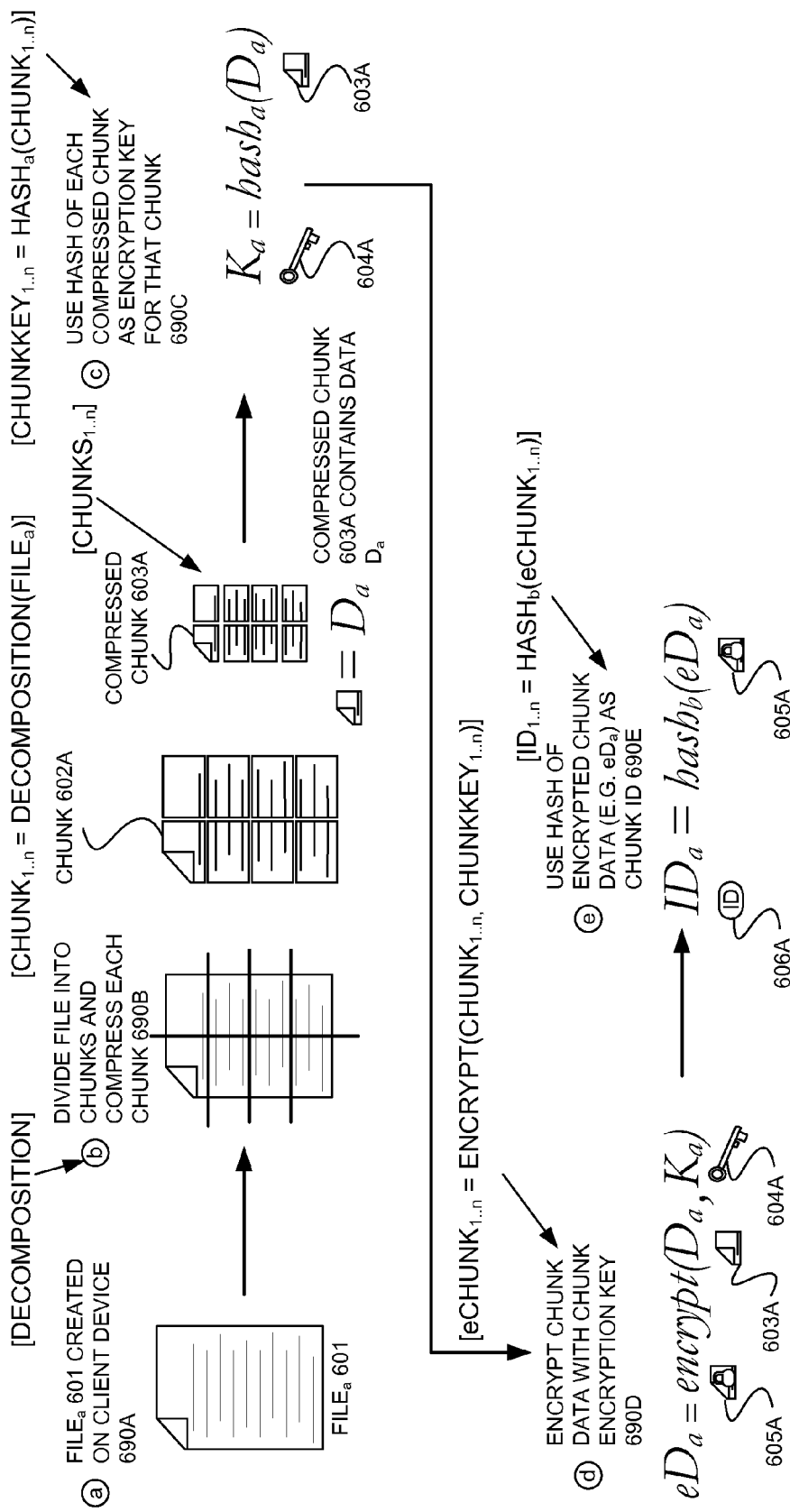
FIG. 6 illustrates a visualization of a method for performing user agnostic file encryption in accordance with embodiments of the invention.

FIG. 6 illustrates a visualization of a method for performing user agnostic file encryption in accordance with embodiments of the invention. The method begins at step 690A with a client device creating $FILE_a$ 601. In step 690B, a CFS client module running on the client device divides the file into chunks 602A-N and, optionally, compresses each chunk into compressed chunks 603A-N (also shown in FIG. 6 as $CHUNKS_{1...n}$); this step can also be referred to as the decomposition of a file into chunks. At step 690C, the CFS client module uses data D from each chunk to generate an encryption key for that chunk. Such that $D_a$ is the data from compressed chunk 603A and used to generate an encryption key 604A, i.e. $K_a$; i.e. $K_a=hash_a(D_a)$ or as a set $CHUNKKEY_{1...n}=HASH_a(CHUNK_{1...n})$. As step 690D, each compressed chunk 603A-N is encrypted with that chunks encryption key 604A-N to generate encrypted data 605A-N; i.e. $eD_a=encrypt(D_a, K_a)$ or as a set $eCHUNK_{1...n}=ENCRYPT(CHUNK_{1...n}, CHUNKKEY_{1...n})$. In step 690E, the CFS client module generates an ID 606A-N from the encrypted data 605A-N; i.e. $ID_a=hash_b(eD_a)$ or as a set $ID_{1...n}=HASH_b(eCHUNK_{1...n})$.

Figure 7:
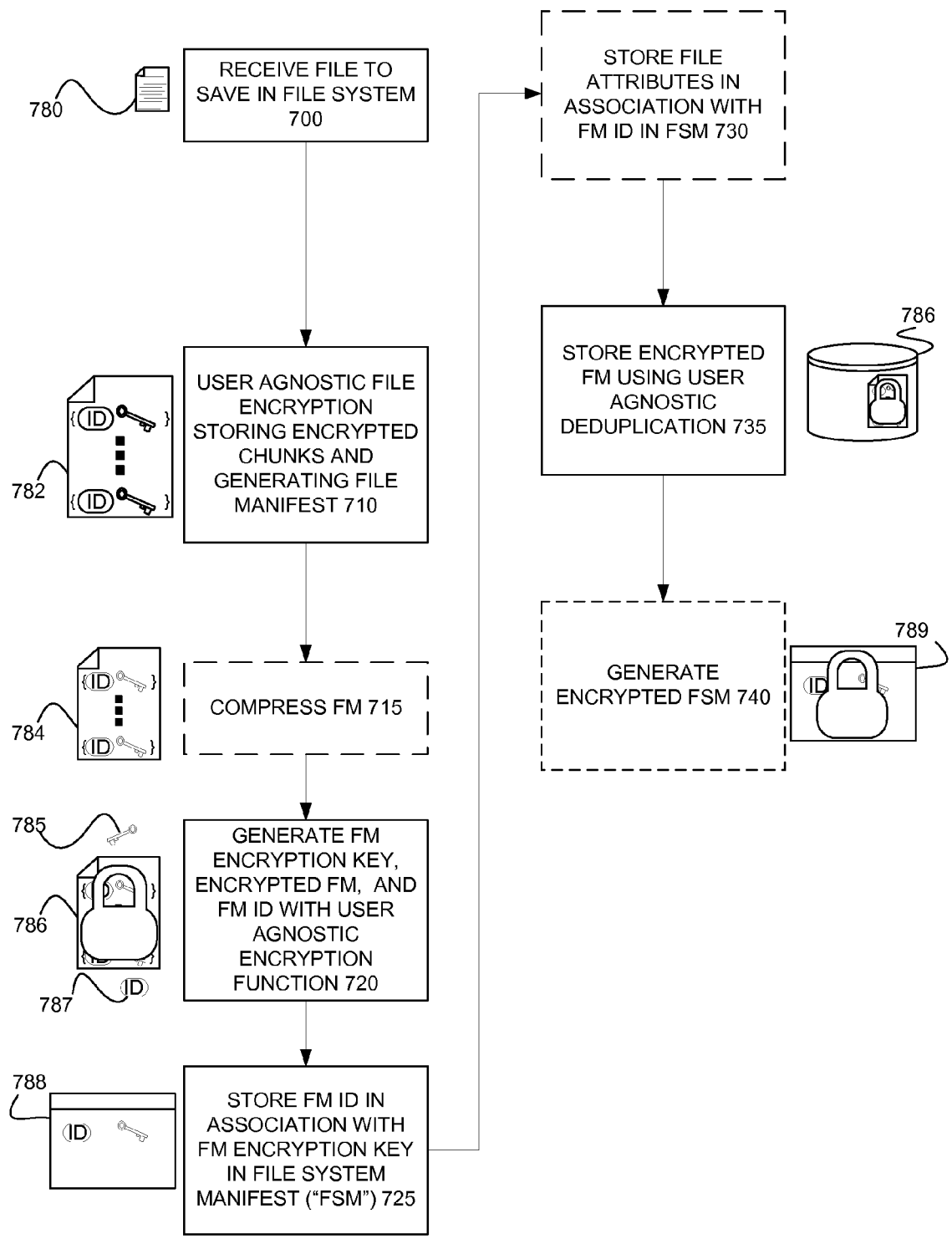
FIG. 7 illustrates a flow chart of a method for saving a file in a cloud file system including generating a file system manifest in accordance with embodiments of the invention.

FIG. 7 illustrates a flow chart of a method for saving a file in a cloud file system including generating a file system manifest in accordance with embodiments of the invention. Another embodiment of generating a file system manifest in accordance with embodiments of the invention will be described with reference to FIG. 27. In FIG. 7, a client device is running a CFS client module. The CFS client module receives a file 780 to save in the CFS at block 700, the CFS being primarily stored in a cloud storage system. The CFS client module encrypts the file 780 with a user agnostic file encryption function at block 710 that stores encrypted chunks and generates a file manifest 782. As described with reference to FIG. 4, the encrypted chunks are each stored in the cloud storage system and, optionally, stored further in a local cache of the CFS. Further, the file manifest 782 comprises an ordered list of chunk IDs and encryption keys that each correspond to one of the encrypted chunks. In some embodiments, it is beneficial to compress the file manifest 782 for storage and the CFS client module compresses the file manifest 782 in block 715.

In block 720, the CFS client module generates a file manifest encryption key 785, an encrypted file manifest 786, and a file manifest ID 787. In one embodiment, these are generated with a user agnostic encryption method such as described with reference to FIG. 5. In block 725, the CFS client module stores the file manifest ID 787 and the file manifest encryption key 785 in a file system manifest 788. The file system manifest 788 comprises a listing of all files stored within the CFS. Along with information identifying the files for display to the user, such as the path at which each file should be displayed, the corresponding file manifest ID and file manifest encryption key is stored so that the CFS client module can retrieve the encrypted file manifest corresponding to that file from the cloud storage system and decrypt the encrypted file manifest.

In block 730, the CFS client module, optionally, stores file attributes corresponding to the file 780. For example, a file may have set of metadata associated with the file such as file size, creation timestamp, modification timestamp, access control listings/permissions, read-only marker, hidden file marker, or other attributes as used by client device.

In block 735, the CFS client module stores the encrypted FM in the cloud storage system with user agnostic deduplication. As such the CFS client module performs a server-side user agnostic deduplication wherein the CFS client module determines whether the encrypted file manifest 786 is already present in the cloud storage system. In the case that the encrypted file manifest 786 is not present in the cloud storage system, the CFS client module transmits the encrypted file manifest 786 to the cloud storage system along with the file manifest ID 787. Further, the CFS client module may perform a client-side user agnostic deduplication, wherein the CFS client module is able to recognize when the encrypted file manifest is already present in the local cache of the CFS and does not store a second copy of the encrypted file manifest.

In one embodiment, the CFS client module generates an encrypted file system manifest 789 from file system manifest 788 at block 740. One method of generating the encrypted file system manifest 789 is to perform a user relative snapshot encryption on the file system manifest 788. Another method of generating the encrypted file system manifest 789 is to perform multi-user file system manifest encryption.

With the user relative snapshot encryption, the CFS encrypts the file system manifest 788 with an encryption key provided by, or unique to, a user or the client device. With this method, the user may share the encryption key in the case of symmetric encryption, or corresponding decryption key in the case asymmetric encryption, with other users or devices which should be given access to this CFS. Correspondingly, a copy of the encrypted file system manifest 789 may be stored in the cloud storage system but only those users and client devices with the corresponding encryption key would be able to decrypt the encrypted file system manifest 789. Thus, encrypted file system 789 can be stored in the CFS but only those user and client devices with requisite encryption key would be able to access the information needed to identify/decrypt the encrypted file manifests listed in the encrypted file system manifest 789. This method has the advantage of allowing the CFS client module to share a snapshot of a CFS with another user or client device. The CFS client module need only create an encrypted file system manifest 789 using an encryption key to be shared with the other user or client device. Then the CFS client module can upload the encrypted file system manifest 789 to the cloud storage system and share an ID for the encrypted file system manifest 789 and the encryption key with the other user. In another embodiment the CFS client module can transmit the encrypted file system manifest 789 and the encryption key directly to the other user or client device. The other user or client device would then have access to all files that were present in the CFS when the CFS client module generated the encrypted file system manifest 789. However any changes made by the other user or client device would only be reflected in a newly created file system manifest corresponding with the other user or client device and would not impact the user or client device that initially generated the encrypted file system manifest 789. Therefore, a user can share a snapshot of an entire CFS with another user or client device by merely transmitting the encryption key and encrypted file system manifest 789 or encrypted file system manifest ID.

With multi-user file system manifest encryption, a user can share a CFS with another user or client device in a live manner. A live manner means that changes made by the user would be reflected to the other user or client device, further any changes made by the other user or client device would be reflected to the user.

Multi-user file system manifest encryption starts with the CFS client module generating a universally unique identifier ("UUID"). The CFS client module determines whether that UUID exists in the cloud storage system and continues to generate a new UUID until an unused UUID is generated. Once a new UUID is generated, the cloud storage system generates a multi-user file system manifest collection identified by the UUID. In one embodiment of the invention, the cloud storage system further creates a set of access permissions associated with the multi-user file system manifest collection and grants a user associated with the CFS client module access to the multi-user file system manifest collection. The multi-user file system manifest collection is a versioned bucket of encrypted file system manifests for this CFS. Now the CFS client encrypts the file system manifest 788 with the UUID as the encryption key and transmits the encrypted file system manifest 789 to the cloud storage system for storage in the multi-user file system manifest collection. Subsequent changes to the CFS are generated as patch changes against the version of the CFS utilized by the CFS client module that generated the changes. The file system manifest 788 and the subsequent patch changes are all stored in the multi-user file manifest collection such that subsequent users and client devices, which have been granted access to the multi-user file system manifest, can download each entry in the multi-user file manifest collection to reconstruct the current state of the cloud file system. Furthermore, users and client devices, which have been granted access, can subscribe with the cloud storage system to receive updates to the CFS. Thus as users change information the CFS, those changes are seamlessly pushed to subscribed users and client devices.

In one embodiment of the invention, the cloud storage system can present a user interface to the client device, such as a web interface, that allows the user to manage that user's file system manifests. For example, the user can choose to create a shareable snapshot of a file system manifest and perform user relative snapshot encryption to make the copy of the file system manifest that is sharable with another user. For example, the cloud storage system can be instructed to email a link to the snapshot. Further, the email may comprise the information needed to decrypt the shared file system manifest. In another example, the cloud storage system could make the snapshot available to other users of the cloud storage system through a menu in the user interface presented to the client devices.

This same user interface allows users to manage multi-user file systems. For example, a user on a client device can decide to generate a multi-user file system from an existing cloud file system and manage the access permissions on the multi-user file system. For users that have been granted access to the multi-user file system, the cloud storage system could make the multi-user file system manifest accessible to those users via email or through the user interface. If an owner wishes to prevent a user from having access to the multi-user file system, the owner can change the access permissions of the multi-user file system manifest such that the user will no longer be granted access to download entries from the multi-user file system manifest collection identified by the corresponding UUID. Further, read-only permissions for users or client devices can be enabled through the same user interface.

When writing to just a portion of a file stored in a cloud file system, the file chunk corresponding to the portion being written to is copied into memory. The updates to the file chunk are performed on the portion in memory and that updated file chunk is encrypted. This, as described above, results in a new chunk ID and encryption key for that chunk that is used to update the corresponding file manifest. In the case of adding data to the middle of a file, multiple chunks may require updating as the data will shift to accommodate the new data. This requires retrieving each file chunk corresponding with each portion of the file and performing updates, encryptions, and file manifest updates for those portions that changed. In the case of appending data to the end of the file, the process is either an update to an existing chunk as previous described, a combination of an update to an existing chunk and an addition of a new chunk, or just the addition of a new chunk.

Figure 8:
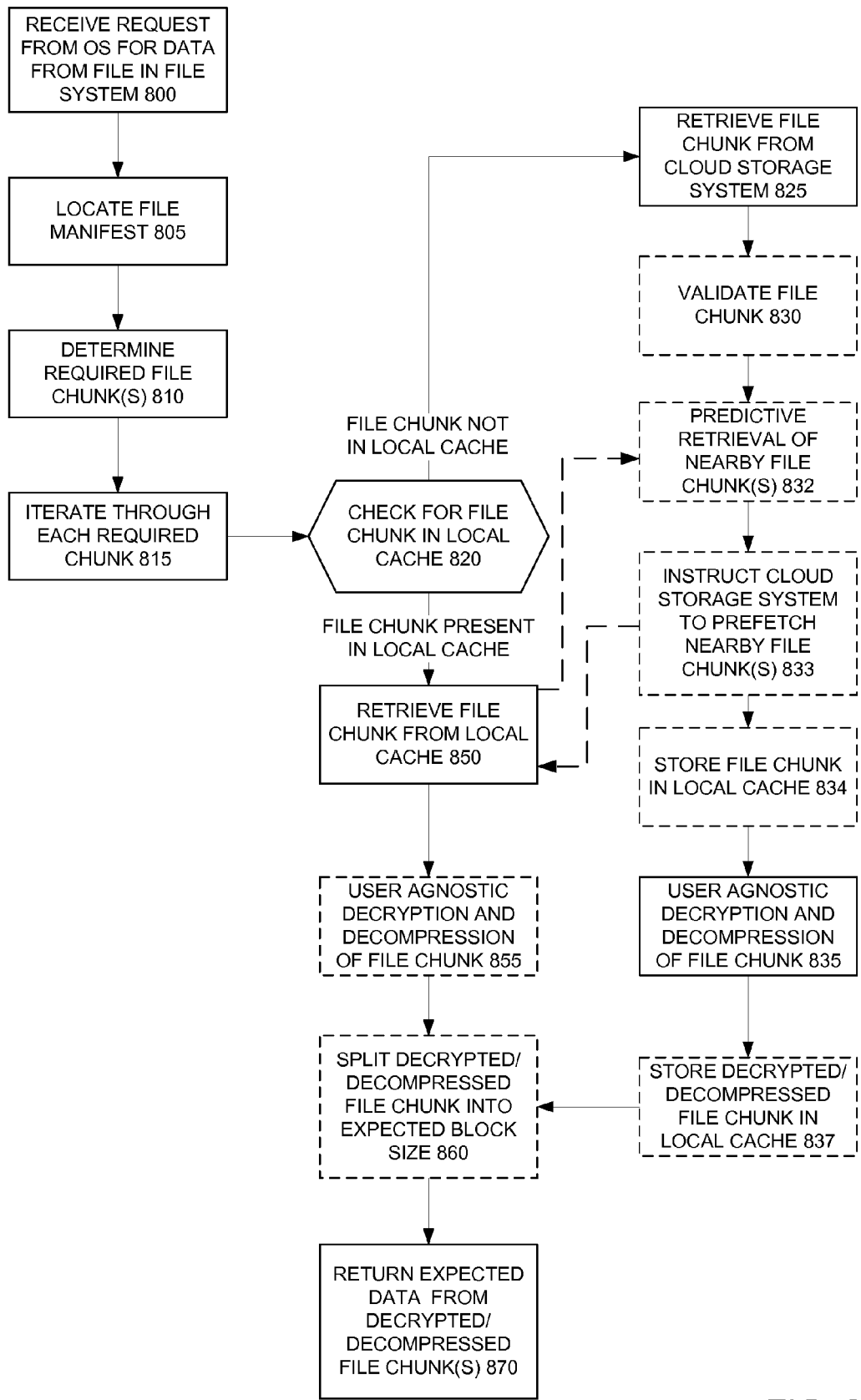
FIG. 8 illustrates a flow chart of a method for reading data from a file in a cloud file system in accordance with embodiments of the invention.

FIG. 8 illustrates a flow chart of a method for reading data from a file in a cloud file system in accordance with embodiments of the invention. In FIG. 8, a client device is running a CFS client module.

The CFS client module mounts a CFS as a drive or directory on client directory using a file system manifest for that CFS. As described above, a file system manifest comprises information including a list of file manifests along with a path under which each file in the file system manifest is located. To the user of the client device, the CFS client module shows the CFS as a part of the client devices storage hierarchy. For example, a CFS may be mounted at a mount point in the client devices storage system. A mount point may be as a drive (e.g. E: Drive) or as a folder in an existing drive or storage system. This allows the CFS client module to present the CFS to the client device and, in turn, a user as any other storage system. Another way of describing this is that the CFS client module emulates a block storage device to the operating system of the client device.

The CFS client module receives a request for data from a file in the CFS at block 800. The request for data includes information identifying a set of data the CFS client module should return. For example, the request may include a path to the file in which data resides. Further the request may include a seek position and byte count to indicate where and how much data to be read. The CFS client module locates a file manifest corresponding to the file at block 805. A file manifest is located in the CFS as follows. The CFS client module locates a file manifest ID corresponding to the file from the file system manifest. In one embodiment, the CFS client module determines whether a decrypted file system manifest is present in a local cache of the CFS. In another embodiment, the CFS client module determines whether the encrypted file system manifest is present in the local cache of the CFS. In yet another embodiment CFS client module determines whether the local cache of the CFS contains the encrypted or decrypted file manifest. If neither the encrypted or decrypted file manifest resides in the local cache of the CFS, then the CFS client module retrieves the encrypted file manifest from a cloud storage system using the file manifest ID to identify the encrypted data. Once the CFS client module has the encrypted file manifest, or in the case that the encrypted file manifest is in the local cache but the decrypted file manifest is not, the CFS client module decrypts the encrypted file manifest using an encryption key associated with the file manifest in the file system manifest. Further, the CFS client module may store the encrypted file manifest, the decrypted file manifest, or both in the local cache of the CFS for future access.

At block 810, the CFS client module determines one or more file chunks needed to retrieve the requested data. In one embodiment, the CFS client module uses the seek position byte count to determine which file chunks are required to retrieve the requested data from the CFS. For example, if CFS client module split the file into 64 byte chunks when saving a file to the CFS, then the CFS client module can determine the first chunk required by performing an integer divide on the seek position with the 64 byte chunk size. As described above, the file manifest includes an ordered list of chunk IDs and encryption keys for decoding the file chunks. Further, the CFS client module can determine the last chunk required by adding the byte count to the seek position and performing an integer divide on the result with the 64 byte chunk size. As such, the CFS client module can determine that it needs the first chunk, last chunk, and all chunks in between to derive the requested data. One of skill in the art would recognize that a 64 byte chunk size may not be optimal for storing data in the CFS. A chunk size of 512 kilobytes may be optimal in some configurations; other configurations may be better served with chunk sizes of other amounts such as 64 kilobytes, 128 kilobytes, or 256 kilobytes. One of skill in the art would understand that the invention is not limited to any particular chunk size and the chunk sizes listed are exemplary and not limiting.

At block 815, the CFS client module iterates over each required filed chunk. At block 820, the CFS client module determines whether the current file chunk is present in the local cache of the CFS. If the current file chunk is not present in the local cache of the CFS then the CFS client module retrieves that file chunk from the cloud storage system in block 825. For example, when the CFS client module requires the first file chunk listed in the file manifest, the CFS client module issues a request to the cloud storage system to transmit the file chunk associated with the first chunk ID. Once the CFS client module receives the file chunk requested, CFS client module can further process that file chunk.

In one embodiment, the CFS client module validates a received file chunk 830. A file chunk can be validated by generating a retrieved chunk ID from the file chunk that was received. Since chunk IDs are generated from the contents of encrypted data, the chunk ID request should match the generated chunk ID if the retrieved data is valid.

In some embodiment of the invention, the CFS client module uses predictive retrieval for file chunks nearby to the requested file chunk. For example, it is advantageous to anticipate other file chunks that might be needed from the cloud storage system. As such the CFS client module may look in the file manifest for file chunks listed in the file manifest near the requested chunk. For example, if the requested file chunk is the first file chunk listed in the file manifest, the CFS client module can queue and retrieve the next file chunk listed in the file manifest so that the next file chunk will be in the local cache of the CFS if and when that chunk is needed to retrieve the requested data. One of skill in the art will recognize that it may be advantageous to queue and download the next 8 file chunks (for example), or the CFS client module may queue and download 4 file chunks before and 4 file chunks after. Other embodiments of the invention retrieve more or less or different sets of file chunks depending on the logic used for the predictive retrieval. For example, the CFS client module may queue the next two chunks that are not present in the local cache of the CFS such that if the first next chunk and third next chunk are present but the second and fourth next chunks are not present, then the CFS client module will retrieve the second and fourth next chunks.

In other embodiments, the CFS client module uses analytical determinations for the predictive retrieval of file chunks. For example, the CFS client module can generate a database of chunk access to model how chunks are accessed. The CFS client module can keep track of the previous chunk ID that is accessed and then when the next chunk ID is accessed the CFS client module can generate an entry indicating a first chunk ID, a second chunk ID, and a count. Each time a chunk ID is accessed, the CFS client module can use the previous chunk ID and the current chunk ID to update this tracking. As such, the previous chunk ID is used as a first chunk ID and the current chunk ID is the second chunk ID; the count starts at 1 and each time the same combination of previous chunk ID and current chunk ID is accessed the count is incremented. The CFS client module can use this analytical model to determine which chunks have the greatest likelihood of being accessed based on a chunk that is being accessed. For simplicity sake, let's take three file chunks (that may be part of the same of different file chunks) Chunk A, Chunk G, and Chunk P. We may find that when Chunk G is accessed on 4 occasions, Chunk A was accessed previously. We may also determine that when Chunk P is accessed on 18 occasions, Chunk A was accessed previously. This can be represented as Chunk A->Chunk G=4; Chunk A->Chunk P=18. Therefore, the next time that Chunk A is accessed the CFS client module can determine that Chunk P has a higher likelihood of being accessed. Thus, the CFS client module can predictively retrieve Chunk P when Chunk A is accessed. One of skill in the art will recognize that it may be advantageous to queue and download multiple chunks in a chain based on the analytical model. For example, if Chunk B is being accessed and the model predicates access to Chunk C, but Chunk C is present in the local cache, then the CFS client module will predict a chunk that is likely to be accessed after Chunk C. The CFS client module may further determine to follow the chain until two chunks are retrieved for the local cache, or until four chunks are retrieved. Those skilled in the art would recognize that different numbers of chunks may be more or less advantageous and tailor the CFS client module to take advantage of the number of chunks to predictively cache. Further, the CFS client module may recognize that for one chunk, many chunks have a likely chance of being accessed next and predictively cache one or more of those chunks in a chain with those chunks.

Still other embodiments may use other approaches for analytically determining a next chunk to retrieve based on user and/or client device behavior. For example, the CFS client module may associate user interface queues with chunk access and generate the local cache on that module. In other embodiments, the CFS client module may keep track of file chunk accesses based on models of network activity or models of applications running, such that when a user accesses information at certain network locations, the CFS client module may associate that with accessing certain file chunks and cache those file chunks when those network locations are accessed. The CFS client module may associate the access of file chunks to when a certain application is accessed and then cache those file chunks in the local cache when that application is accessed in the future.

In support of the predictive retrieval of file chunks, the CFS client module employs a queue of chunk IDs that should be retrieved and a plurality of download threads to service said queue. It is advantageous to prioritize the retrieval of file chunks based on a determination of whether the file chunk is likely to be used sooner than other file chunks in the queue. As such, when the CFS client module determines it should retrieve a file chunk, either a retrieval associated with access to data in the file chunk or a predictive retrieval, the CFS client module will add the requested chunk ID to the download queue and associate that chunk ID with a priority value. The priority value for each chunk ID is chosen in a manner such that the download threads choose chunk IDs from the download queue that require more immediate access first. As such, the CFS client module can associate chunk IDs that were requested for retrieval in block 825 as part of the file access with a higher degree of priority while chunks added to the download queue as part of the predictive retrieval of nearby file chunks in block 832 are associated with lower degrees of priority.

One particular implementation is to determine how close a chunk being retrieved is to a chunk being accessed. In this way, a chunk ID in the download queue being retrieved as part of the chunk access in block 825 would have a distance of 0 as it is the ID of the chunk being accessed. When the CFS client module determines it should predictively retrieve the first next chunk in the FM and fourth next chunk in the FM, then the corresponding chunk IDs would receive a distance of 1 and 4 respectively as reflective of those chunks' distance from the accessed chunk. This same principal may be employed when using a chain of chunk accesses with the chunk analytical method. As the CFS client module follows the chain to find the next chunk not in local cache that should be retrieved from the cloud storage system, the CFS client module can track how far down the chain it travelled and use that as a distance from the chunk being accessed. Thus, chunk IDs with a smaller distance from the chunk being accessed will be prioritized over chunks with a farther distance in the download queue by the download threads. One implementation is further described with reference to FIG. 40.

Further, in embodiments of the invention in which the cloud storage system supports remote caching of the CFS, the CFS client module may instruct the cloud storage system to prefetch nearby file chunks in block 833. For example, in one embodiment of the invention the cloud storage system comprises a cloud storage gateway and a cloud storage pool. As such it is advantageous to instruct the cloud storage gateway to place file chunks that will need to be transmitted to the client device in the cloud storage gateway's remote cache of the cloud storage pool; in other words, instruct the cloud storage gateway to prefetch the file chunks. This way the cloud storage gateway will have the file chunk in its remote cache when the CFS client module retrieves the file chunk from the cloud storage system thereby eliminating latency that would otherwise occur if the cloud storage gateway had to retrieve the requested file chunk from the cloud storage pool. Further, the CFS client module may instruct the cloud storage gateway to prefetch the next two file chunks that are not present in the local cache of the CFS that the CFS client module predicts access to. As such, if the first next and third next chunks are present in the local cache but the second and fourth next chunks are not present in the local cache, then the CFS client module will instruct the cloud storage gateway to prefetch the second and fourth next chunks for storage in the remote cache so that the cloud storage gateway does not have to retrieve those chunks from the cloud storage pool when the CFS client module request those chunks.

In block 834, the CFS client module optionally stores the retrieved file chunk in the local cache of the CFS at a location associated with that file chunk's ID. At block 835, the CFS client module performs user agnostic decryption and decompression of the file chunk. As discussed above, the file manifest has an encryption key, or decryption key in the case of asymmetric encryption algorithms, associated with each file chunk by that chunk's ID. Therefore, the CFS client module can retrieve the encryption key/decryption key from the file manifest to perform the file chunk decryption. Further, as discussed above, some file chunks may benefit from compression and be compressed; thus the CFS client module will decompress the file chunk if that is the case. In block 837, the CFS client module optionally stores the decrypted/decompressed file chunk in the local cache of the CFS at a location associated with that file chunk's ID. Once the decrypted/decompressed chunk is available, the CFS client module continues at block 860 as described later.

It should be noted that one embodiment of the invention will cache the encrypted file chunk in block 834 while another embodiment of the invention will cache the decrypted/decompressed file chunk in block 837. Still further embodiments may cache both the encrypted file chunk in block 834 and the decrypted/decompressed block 837; however, in at least one embodiment, the decrypted/decompressed file chunk is cached in a portion of the local cache that is volatile such that the decrypted/decompressed file chunk would not be present upon a power down or would even be removed after a determined period of time. This presents the added security that all though the encrypted file chunk may be present in the local cache, the data would not be available to a user of the client device if the CFS client module was not properly activated to decrypt said data. For example, it could be that the CFS client module stores the decrypted file system manifest in a volatile portion of local cache as well and requires a user to login on the client device in order to decrypt the file system manifest. Thus, all the encryption keys for the file manifests and subsequent file chunks of each file would be protected from an authorized user of the client device.

Referring back to block 820, if the CFS client module determines that the file chunk is present in the local cache of the CFS, then the CFS client module continues on to block 850 by retrieving the file chunk from the local cache. It will be evident from the previous discussion that the file chunk may be stored in the local cache as an encrypted file chunk or decrypted/decompressed file chunk or both. If the encrypted file chunk is the only file chunk available, then the CFS client module will perform user agnostic decryption and decompression on encrypted file chunk in block 855. Otherwise, the CFS client module retrieves the decrypted/decompressed file chunk from the local cache in block 850. Furthermore, the CFS client module may determine to predictively retrieve nearby file chunks in block 832 and/or instruct the cloud storage system to prefetch nearby file chunks in block 833 as described above.

In one embodiment of the invention, it is necessary to split the decrypted/decompressed file chunk into clusters the size of which the client device expects to receive from the CFS client module in block 860. For example, if the file chunks are stored in chunk sizes of 256 kilobytes but the client device expects data to be stored in blocks of 4 kilobytes, then the CFS client module would split the decrypted/decompressed file chunk in to 64 blocks to return the data to the client device. This is especially relevant when the CFS client module is emulating a block device to the client device and specifies a block size that is smaller than chunk size used by the cloud storage system.

In block 870, the CFS client module has the requested data from the decrypted/decompressed file chunk and returns the requested data to the operating system of the client device.

Figure 9:
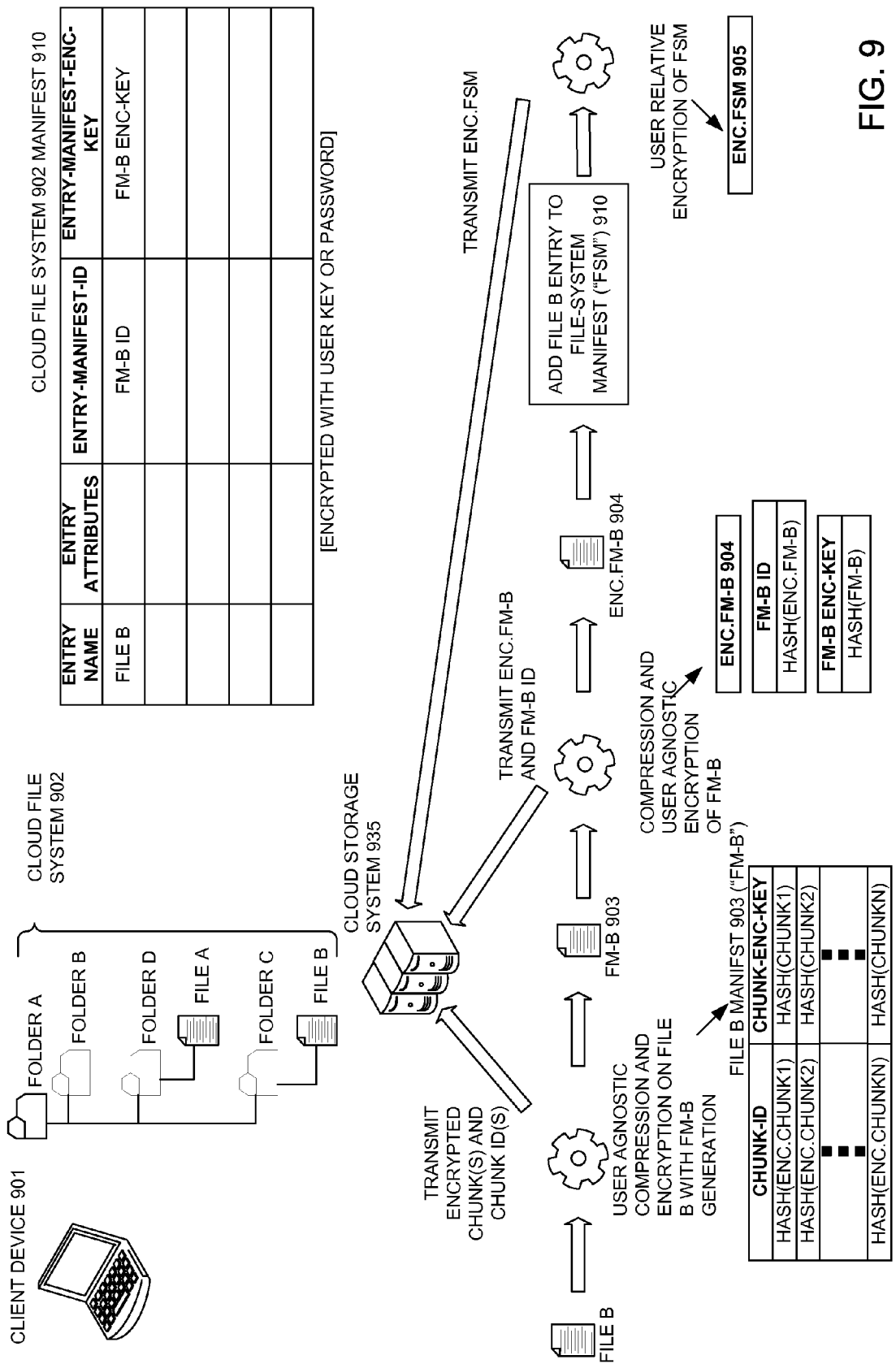
FIG. 9 illustrates a visualization of a cloud file system and storing a file in the cloud file system in accordance with embodiments of the invention.

FIG. 9 illustrates a visualization of a cloud file system and storing a file in the cloud file system in accordance with embodiments of the invention. In FIG. 9, a client device 901 has mounted a cloud file system 902 for use on the client device. The cloud file system 902 is within the cloud file system 902 manifest 910. The cloud file system 902 manifest 910 comprises a list of entries that indicate files and folders that exist in that particular cloud file system 902. The cloud file system 902 manifest 910 includes an entry name, entry attributes, an entry-manifest-ID, and an entry-manifest-encryption-key.

A user has many ways of using a cloud file system such as cloud file system 902. A user may initiate the generation of a new cloud file system to be used on the client device 901. For example, the use can direct a CFS client module running on the client device to create a new storage location, e.g. a new drive or new folder, that is stored in the cloud storage system 935. Another way of using the cloud file system is to convert a folder stored on the client device to a folder stored in the cloud storage system 935; i.e. to virtualize a folder or drive. A user on the client device can instruct the CFS client module to convert a specified folder and then the CFS client module could assume management of the files and sub-folders in the specified folder. Further, this conversion can take place in a non-obtrusive, seemingly transparent fashion. This is particularly advantageous for a user that is running out of space in a local storage system and would like to recover storage space without changing many configuration settings because files have moved from an expected location. The CFS client module can transition files from the local storage system to the cloud storage system but present the files to the client device at the same logical path where they existed prior to the conversion.

For example, the CFS client module will move all the data in the specified folder to a temporary storage location on the client device. Then the CFS client module can create a new CFS associated with the specified folder and mount the new CFS at the location (i.e. mount point) previously containing the specified folder. The CFS client module can then begin the process of transitioning files and subfolders from the temporary storage location to storage in the cloud storage system 935. During the transition period, the client device can access data in the specified folder by issuing requests with the CFS client module. The CFS client module will determine whether the requested data is stored in the temporary storage location or if it has already been transitioned into the cloud storage system 935. If the data is located in the temporary storage location then the CFS client module retrieves the data from the temporary storage location, e.g. accessing the file or folder in the temporary storage location. However, if the data is located in the cloud storage system 935, then the CFS client module will access the data from the cloud storage system 935 in the manner prescribed in FIG. 8. During the transition period, the CFS client module will periodically determine a file or subfolder in the specified folder that has not yet been stored in the cloud storage system 935 and process that folder for storage in the cloud storage system 935.

This conversion can be made available to a user on the client device through user interface commands. For example, the user can select a folder from a file system browser on the client device and invoke a context menu that includes a command to convert the selected folder; e.g. virtualize or "Cloudify" this folder. From there the CFS client module can replace the folder with a perceptively identical folder that includes the same data to the user or the CFS client module can replace the folder with a folder that is named the same but presents an indication to the user that the folder is stored in the cloud storage system 935. Further the CFS client module can create an indication that the folder is in the transition from local storage to storage in the cloud storage system 935 and further present an indication once the transition is complete that the folder is fully stored in the cloud storage system 935.

Once a CFS is mounted for use on the client device 901, the CFS client module stores subfolders and files in the CFS as follows. Subfolders are stored in the CFS 902 manifest 910 as entries and designated as folders rather than files. The entry in the CFS 902 manifest 910 includes the path of the folder so that when a user on the client device navigates to a location in the CFS, the CFS client module can determine all the folders that are located at that location from the CFS 902 manifest 910. The storage of files in the cloud storage system is described with reference to FIG. 7. Further, entries in the CFS 902 manifest 910 for files include a path for that file so that when a user on the client device navigates to a location in the CFS, the CFS client module can determine all the files that are located at that location from the CFS 902 manifest 910. Therefore, one of skill in the art would appreciate that files and subfolders in a CFS can be presented to the user from the data in the CFS 902 manifest 910 without having the client device store the file chunks that comprise each file in the CFS.

The process of adding a file to the CFS 902 is visualized along the bottom of FIG. 9. In FIG. 9, the client device instructs the CFS client module to save File B to a location in the CFS 902. The CFS client module performs user agnostic compression and encryption on File B and generates a File B manifest 903 ("FM-B"). Further, the CFS client module transmits each encrypted chunk generated by the user agnostic compression and encryption to the cloud storage system 935 when it determines that encrypted chunk is not already present in the cloud storage system 935.

Since encrypted chunks can be determined to already be present, bandwidth utilization is reduced when File B contains blocks of data identical to other blocks of data in other files that have been stored in the cloud storage system 935. This same deduplication allows the CFS client module to reduce bandwidth when a single file stored in the cloud storage system 935 comprises multiple chunks of data that are identical since only the first chunk uploaded will need to be transmitted. One skilled in the art would appreciate that since the encryption is user agnostic, two users with the same file, or two files with the same chunk of data, will create one or more identical encrypted chunks and only the first transmission of an encrypted chunk is required. Thereby, bandwidth is reduced with storing duplicative data in the cloud storage system 935.

An exemplary FM-B 903 is shown in FIG. 9. FM-B 903 contains a listing of chunk IDs and chunk encryption keys as described with reference to FIG. 4. In FIG. 9 each chunk's ID is the hash of the data in the encrypted chunk (e.g. HASH (ENC.CHUNK1)-HASH(ENC.CHUNKN)). Further, the encryption key is the hash of the data in the chunk (e.g., HASH(CHUNK1)-HASH(CHUNK2)). As described in FIG. 5, these chunk IDs and encryption keys are exemplary while other embodiments of the invention utilize other user agnostic data that is deterministic from each chunk as the chunk ID and encryption key.

The CFS client module utilizes the same user agnostic encryption employed on each block on the FM-B 903 to generate an encrypted FM-B, ENC.FM-B 904 and a FM-B ID that is the hash of ENC.FM-B 904. Again the CFS client module uses a user agnostic deterministic encryption key ("FM-B ENC-KEY") to encrypt FM-B 903 such as the hash of the data in FM-B 903. The CFS client module stores the ENC.FM-B 904 locally and in the cloud storage system 935 so that it is available for later retrieval using the FM-B ID.

The CFS client module adds an entry to CFS 902 manifest 910 corresponding to File B that includes the location at which File B is presented in a folder hierarchy in CFS 902. The File B entry also contains the FM-B ID and FM-B ENC-KEY. This way, once a user or client device has a CFS manifest that contains an entry with the FM-B ID and corresponding FM-B ENC-KEY then the user can retrieve and decrypt the ENC.FM-B 904 even though that user or client device did not previously have a copy of File B.

The cloud file system 902 manifest 910 is encrypted with a user generated key or password. For example, the cloud file system 902 manifest 910 may be encrypted using user relative snapshot encryption or multi-user file system manifest encryption as described later with reference to FIG. 7. The encrypted file system manifest ("ENC-FSM") is transmitted to the cloud storage system 935 to be stored for retrieval by this user or other users.

The addition of files to a CFS has been described with reference to generating a CFS that takes the place of an existing folder or is added to a client device as another storage location. However, the same principles may be employed to allow the CFS client module to manage automatic backups of some or all data in local storage on a client device. For example, upon loading of the CFS client module on a client device, the CFS client module can start generating backups of the local storage system that are stored in a CFS labeled as a backup for the client device on which the CFS client module is running. Thus, the CFS client module can work in the background identifying files in the local storage system, adding those files to the cloud storage system and generating a file system manifest listing all the backed up files that comprise a backup of that client device's local storage system. The files on the local storage system are not necessarily removed from the local storage system, but the files are listed in the backup file system manifest for future disaster recovery.

Throughout the life of a client device executing the CFS client module, the CFS client module can maintain backups of files as they are updated regardless of the underlying folder being virtualized into the cloud storage system. Further, the CFS client module can maintain a listing of all versions of each file that are stored in the cloud storage system along with identifying information; i.e., version number or modification date. In this way, the CFS client module can present a user on the client device with a listing of all available versions of a file when the user indicates a desire to restore a file from the backups maintained by the CFS client module. Further, the CFS client module can track a unique identifier for the client device on which it resides and label the file manifests of each backed up file within the backup file system manifest or label the file system manifest itself according to the client device's unique identifier. Using the unique identifier, the CFS client module can present the user with an option to restore files from backups of this client device or allow the user to select another client device from which to restore backed up files.

In one embodiment, the backup of a local storage system is automatically managed by the CFS client module. In another embodiment, the CFS client module presents configuration options to a user regarding which files should be backed up to the cloud storage system or whether backups should be performed at all.

In the case that the entire local storage system is backed up in the cloud storage system, a "Cloudify" operation can be equated as generating a file system manifest with the contents of a selected folder, removing the local copy of the folder, and mounting the generated file system manifest at the location of the folder. This operation need not re-upload all the encrypted blocks for each file since the encrypted blocks are already in the cloud storage system from the backup procedure, though the "Cloudify" operation would determine any updates that must occur between the backed up files and the files currently in the selected file.

In another embodiment, the CFS client module is configured to automatically virtualize files, folders, and drives in the local storage system of the client device. As described above, the automatic backup of a local storage system does not remove a file from the local storage system. However, the automatic virtualization of a file, folder, or drive will remove the files and folders within from the local storage system and store said files and folders in the cloud storage system. Essentially, the CFS client module will automatically Cloudify the files, folders, and/or drives that it determines are candidates for automatic virtualization. The CFS client module can determine which files, folders, or drives are candidates for automatic virtualization with a plurality of techniques. The CFS client module can look at a modification date or an access date of the file or the files within a folder or drive to determine whether a user has used the files recently. Since this virtualization is automatic, the CFS client module can favor files that have not been used recently as the user is less impacted by any delays in future access if the file must be retrieved from the cloud storage system. Other techniques for determining candidates for virtualization include tracking file usage patterns over time and generating list of files, folders, and drives that make good candidates for virtualization.

The CFS client module may further be configured to provide a hybrid folder of files/folders contained within a CFS and files/folders contained in the local storage system. For example, if the user instructed the CFS client module to mount a CFS at a mount point in the local storage system that contains files and folders, then the CFS client module can merge the files in the local storage system and the CFS being mounted. The CFS client module would assume management of the file in the local storage and move the files to a managed section of the local storage system. The CFS client module would then mount a virtual folder at the location of the selected folder and take responsibility for presenting the user with the contents of that folder. The CFS client module would provide the client device with a listing of the files/sub-folders in the local storage system now in a managed section of the local storage system and a listing file/sub-folders from the CFS that was mounted anytime a directory listing was performed on the hybrid/virtual folder. Read operations would be handle in the way described above with reference to pass through reads during the virtualization transition. The CFS client module would have the option of saving new files and/or modifications of old files to either the managed section of the location storage system or to the cloud storage system. This option may be pre-configured by the CFS client module through a setting presented to the user or the option may be presented to the user upon a write operation by the CFS client module to the hybrid folder. The CFS client module may further inform the user that a conflict exists if the user elects to mount a CFS at a location in the local storage system that contains files or folder and allow the user to elect a resolution procedure; e.g. choose to move all files in the CFS, choose a hybrid folder approach, or choose to do nothing so the user can manage the conflict themselves.

Figure 10:
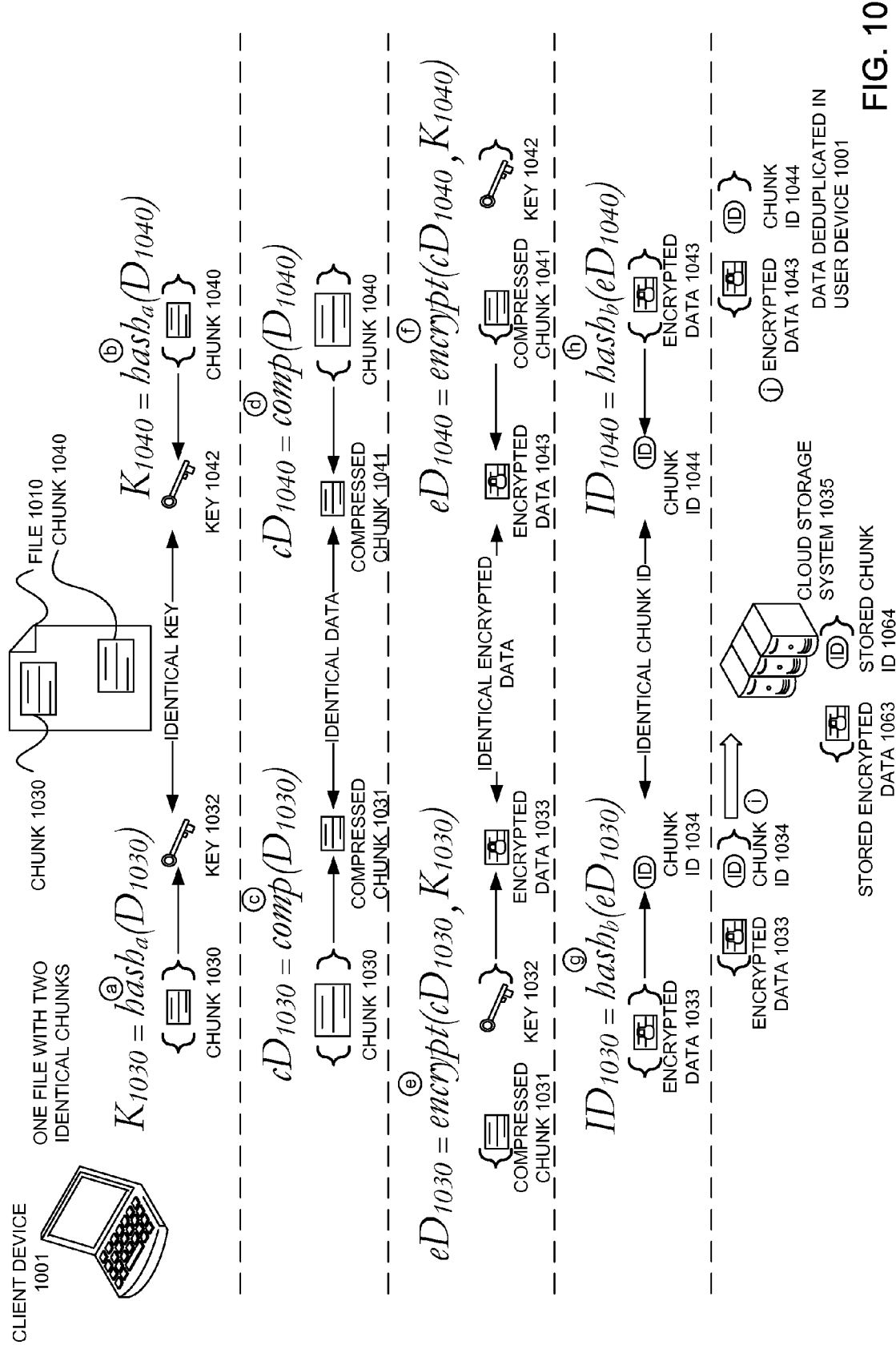
FIG. 10 illustrates a visualization of user agnostic encryption and compression of a file in accordance with embodiments of the invention.

FIG. 10 illustrates a visualization of user agnostic encryption and compression of a file in accordance with embodiments of the invention. In FIG. 10, a client device 1001 is encrypting a single file 1010 that happens to contain two chunks of data 1030 and 1040 which happen to comprise identical data. In one embodiment of the invention, the client device begins processing each chunk at step a and step b respectively by generating encryption keys 1032 and 1042 ("$K_{1030}$" and "$K_{1040}$") from the data of each corresponding chunk 1030 and 1040 ("$D_{1030}$" and "$D_{1040}$"). Therefore in embodiments utilizing a hash function of the data to generate the encryption key, $K_{1040}$=hash($D_{1040}$). Further since $D_{1030}$ is identical to $D_{1040}$, then $K_{1030}$ will be identical to $K_{1040}$. In step c and step d, the client device, optionally, compresses chunks 1030 and 1040 to generate compressed chunks 1031 and 1041 ("$cD_{1030}$" and "$cD_{1040}$"); i.e. $cD_{1040}$=comp($D_{1040}$). Compressed chunks 1031 and 1041 are identical again since the client device 1001 is using the identical data and the same compression algorithm, or no compression if the case may be.

At step e and step f, the client device 1001 encrypts the compressed chunks 1031 and 1041 using the respective encryption keys 1032 and 1042 to generate encrypted chunks 1033 and 1043 ("$eD_{1030}$" and "$eD_{1040}$"); i.e. $eD_{1030}$=encrypt($cD_{1030}$, $K_{1030}$). Encrypted chunk 1033 will be identical to encrypted data 1043 since the compressed chunks 1031 and 1041 are identical as are the encryptions keys 1032 and 1042. Furthermore, the client device is utilizing the same encryption algorithm on each chunk.

At step g and step h, the client device 1001 derives chunk ID 1034 and chunk ID 1044 ("$ID_{1030}$" and "$ID_{1040}$") from the encrypted data 1033 and 1043; i.e. $ID_{1030}$=hash($eD_{1030}$). Since the hash function used in each step is the same algorithm and the encrypted data 1033 and 1044 are identical, the chunk IDs 1034 and 1044 will also be identical.

At step i and step j, the client device 1001 will attempt to store the encrypted data 1033 and 1043 in the cloud storage system 1035 based on the chunk IDs 1034 and 1044. Assuming that step i occurs prior to step j, encrypted data 1033 will be uploaded in association with chunk ID 1034 to cloud storage system 1035. The cloud storage system will store the encrypted data 1033 in a location corresponding to chunk ID 1034; thus the cloud storage system will contain stored encrypted data 1063 and stored chunk ID 1064. When the client device 1001 attempts to store encrypted data 1043, the client device will determine that the cloud storage system 1035 already has identical encrypted data since it contains the identical stored chunk ID 1064. The client device 1001 will not need to transmit encrypted data 1043 in association with chunk ID 1044; thus, the client device 1001 will reduce the utilization of upload bandwidth by not transmitting data that already exists in the cloud storage system 1035.

Figure 11:
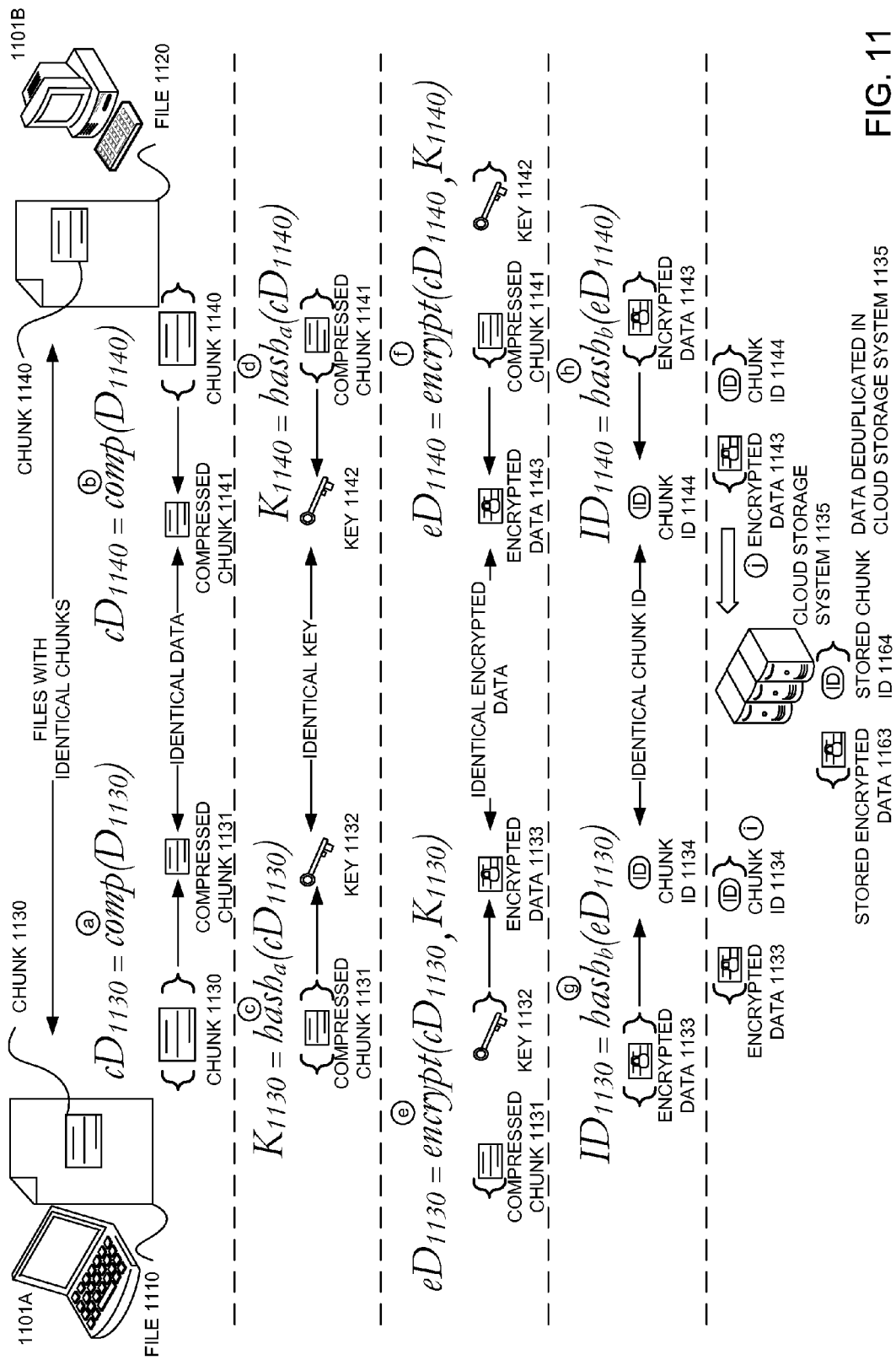
FIG. 11 illustrates a visualization of user agnostic encryption and compression of two files in accordance with embodiments of the invention.

FIG. 11 illustrates a visualization of user agnostic encryption and compression of two files in accordance with embodiments of the invention. In FIG. 11, a first client device 1101A is encrypting a file 1110 while a second client device 11016 is encrypting a file 1120. As that happens, files 1110 and 1120 contain two chunks of data 1130 and 1140 which comprise identical data. It may even be that all files 1110 and 1120 comprise entirely identical data, as in the files are copies of one another.

In one embodiment of the invention, each client device 1101A and 11016 begins processing each chunk 1130 and 1140 by compressing the corresponding chunk. Thus, in step a and step b, the corresponding client device, optionally, compresses chunk 1130 or 1140 to generate a compressed chunk 1131 or 1141 ("$cD_{1130}$" or "$cD_{1140}$"); i.e. $cD_{1140}=comp(D_{1140})$. Compressed chunks 1131 and 1141 are identical since the client devices 1101A and 11016 are using the identical data and the same compression algorithm, or no compression if the case may be.

The client devices 1101A and 11016 continue at step c and step d respectively by generating encryption keys 1132 and 1142 ("$K_{1130}$" and "$K_{1140}$") from the data of each corresponding chunk 1130 and 1140 ("$D_{1130}$" and "$D_{1140}$"). Therefore in embodiments utilizing a hash function of the data to generate the encryption key, $K_{1140}=hash(D_{1140})$. Further since $D_{1130}$ is identical to $D_{1140}$ and the client devices 1101A and 11016 are using the same algorithm to generate the encryption keys, then $K_{1130}$ will be identical to $K_{1140}$.

At step e and step f, the client devices 1101A and 11016 encrypt the compressed chunks 1131 and 1141 using the respective encryption keys 1132 and 1142 to generate encrypted data 1133 and 1143 ("$eD_{1130}$" and "$eD_{1140}$"); i.e. $eD_{1130}=encrypt(cD_{1130}, K_{1130})$. Encrypted data 1133 will be identical to encrypted data 1143 since the compressed chunks 1131 and 1141 are identical as are the encryptions keys 1132 and 1142. Furthermore, the client devices are utilizing the same encryption algorithm on each corresponding chunk.

At step g and step h, the client devices 1101A and 1101B derive chunk ID 1134 and chunk ID 1144 ("$ID_{1130}$" and "$ID_{1140}$") from the encrypted data 1133 and 1143; i.e. $ID_{1130}=hash(eD_{1130})$. Since the hash function used in each step is the same algorithm and the encrypted data 1133 and 1144 is identical, the chunk IDs 1134 and 1144 will also be identical.

At step i and step j, the client devices 1101A and 1101B will attempt to store the encrypted data 1133 and 1143 in the cloud storage system 1135 based on the chunk IDs 1134 and 1144. Assuming that step j occurs prior to step i, encrypted data 1143 will be uploaded in association with chunk ID 1144 to cloud storage system 1135. The cloud storage system will store the encrypted data 1143 in a location corresponding to chunk ID 1144; thus the cloud storage system will contain stored encrypted data 1163 and stored chunk ID 1164. When the client device 1101A attempts to store encrypted data 1133, the client device 1101A will determine that the cloud storage system 1135 already has identical encrypted data since it contains the identical stored chunk ID 1164. The client device 1101A will not need to transmit encrypted data 1133 in association with chunk ID 1134; thus, the client device 1101A will reduce the utilization of upload bandwidth by not transmitting data that already exists in the cloud storage system 1135.

With reference to FIGS. 12, 13, 14, and 15, a cloud storage gateway is coupled with a cloud storage pool and communicates with one or more client devices through a communication network as described in FIG. 2.

Figure 12:
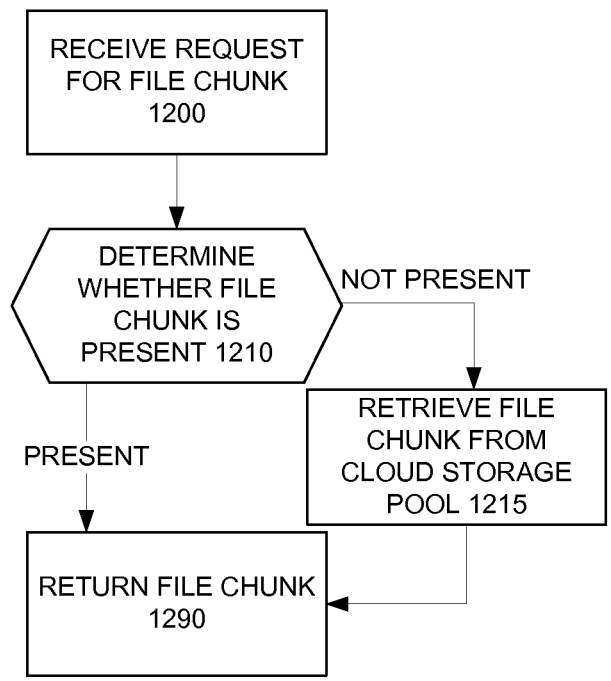
FIG. 12 illustrates a flow chart of a method for a cloud storage gateway to return a file chunk from a cloud file pool in accordance with embodiments of the invention.

FIG. 12 illustrates a flow chart of a method for a cloud storage gateway to return a file chunk from a cloud file pool in accordance with embodiments of the invention. In block 1200, the cloud storage gateway receives a request for a file chunk. For example, the cloud storage gateway may receive a message from the client device with a GET command and a chunk ID; furthermore, the GET command could be accompanied by a list of chunk IDs. With reference to a single chunk ID, the cloud storage gateway determines, at block 1210, whether that file chunk is present in a remote cache of the cloud storage pool located in the cloud storage gateway. In one embodiment, the cloud storage gateway looks in a database of chunk IDs to determine if the file chunk is present in the remote cache. The database could be a bloom filter, a hash table, a linked list, a relational database, or any other appropriate database. In another embodiment, the cloud storage gateway checks whether the file chunk is located in a location associated with the chunk ID. If the file chunk is not present in the remote cache, then the cloud storage gateway retrieves the file chunk from the storage cluster at block 1215. At block 1290, the cloud storage gateway returns the file chunk to the client device. One possible scenario is that the cloud storage gateway does not have the requested chunk ID. In this scenario, the cloud storage gateway would return a message to the client device indicating that chunk ID does not exist in the cloud storage system.

Figure 13:
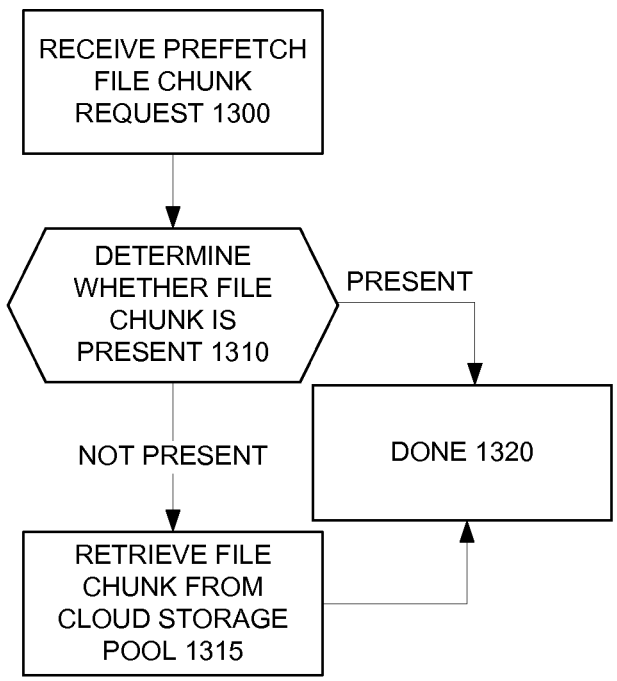
FIG. 13 illustrates a flow chart of a method for a cloud storage gateway to prefetch a file chunk from a cloud storage pool in accordance with embodiments of the invention.

FIG. 13 illustrates a flow chart of a method for a cloud storage gateway to prefetch a file chunk from a cloud storage pool in accordance with embodiments of the invention. In block 1300, the cloud storage gateway receives a prefetch command. For example, the cloud storage gateway may receive a message from the client device with a PRE command and a chunk ID; furthermore, the PRE command could be accompanied by a list of chunk IDs. With reference to a single chunk ID, the cloud storage gateway determines, at block 1310, whether that file chunk is present in a remote cache of the cloud storage pool located in the cloud storage gateway. If the file chunk is present in the remote cache, then the method is done in block 1320. If the file chunk is not present in the remote cache, then the cloud storage gateway retrieves the file chunk from the storage cluster at block 1315. One possible scenario is that the cloud storage gateway does not have the chunk ID. In this scenario, the cloud storage gateway could return a message to the client device indicating that chunk ID does not exist in the cloud storage system.

Figure 14:
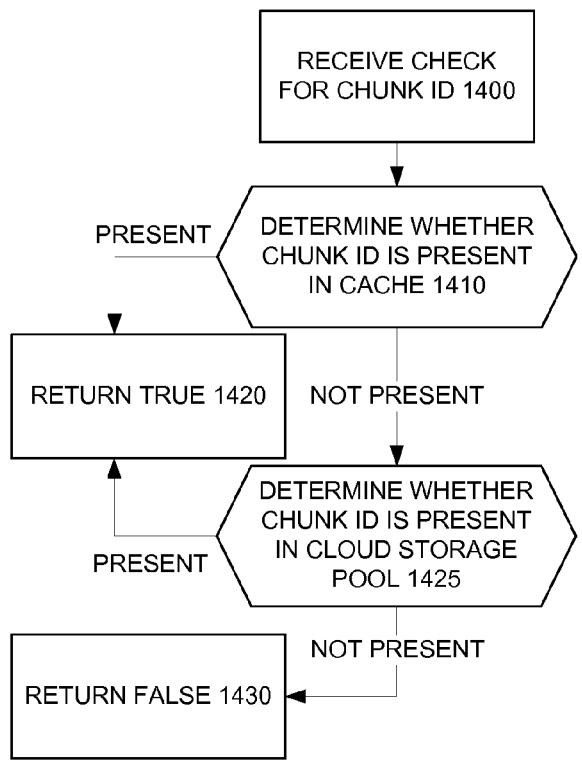
FIG. 14 illustrates a flow chart of a method for a cloud storage gateway to check for a file chunk in a cloud storage system in accordance with embodiments of the invention.

FIG. 14 illustrates a flow chart of a method for a cloud storage gateway to check for a file chunk in a cloud storage system in accordance with embodiments of the invention. In block 1400, the cloud storage gateway receives a command to check whether a chunk ID is present in the cloud storage system. For example, the cloud storage gateway may receive a message from the client device with a HAS command and a chunk ID; furthermore, the HAS command could be accompanied by a list of chunk IDs. With reference to a single chunk ID, the cloud storage gateway determines, at block 1410, whether that file chunk is present in a remote cache of the cloud storage pool located in the cloud storage gateway. If the file chunk is present in the remote cache, then the method continues to block 1420 and indicates to the client device that the chunk ID is present in the cloud storage system. If the file chunk is not present in the remote cache, then the method continues to block 1425 and determines whether the chunk ID is present in the cloud storage pool. For example, in one embodiment the cloud storage gateway maintains a listing of all chunk IDs present in the cloud storage pool while another in another embodiment the cloud storage gateway queries the cloud storage pool to determine whether the cloud storage pool contains the requested chunk ID. If the chunk ID is present, then the cloud storage gateway continues to block 1420 and indicates to the client device that the chunk ID is present in the cloud storage system. If the chunk ID is not present, then the cloud storage gateway continues to block 1430 and indicates to the client device that the chunk ID is not present in the cloud storage system.

Figure 15:
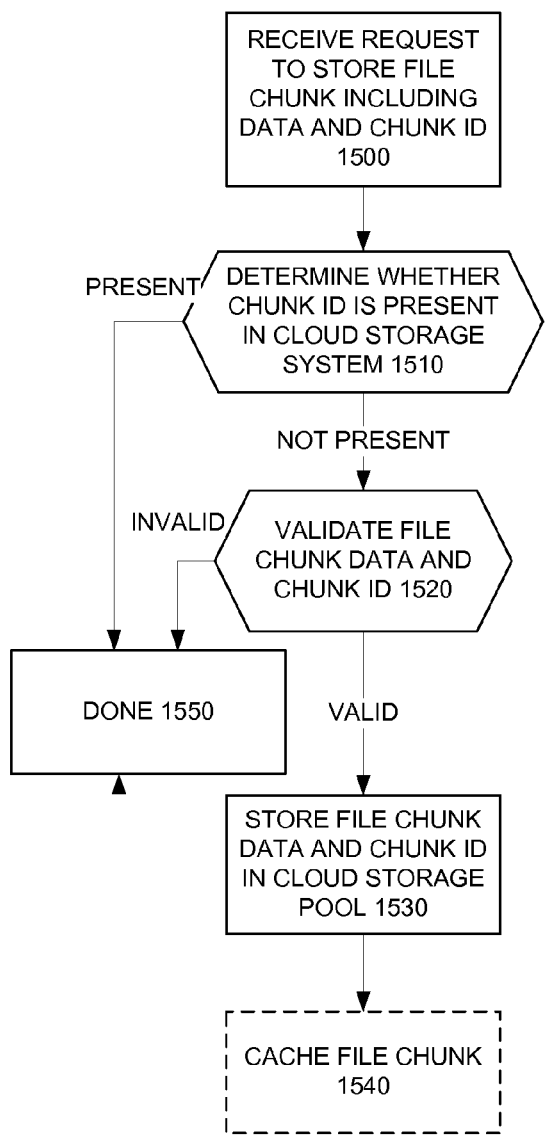
FIG. 15 illustrates a flow chart of a method for a cloud storage gateway to adding a file chunk to a cloud storage system in accordance with embodiments of the invention.

FIG. 15 illustrates a flow chart of a method for a cloud storage gateway adding a file chunk to a cloud storage system in accordance with embodiments of the invention. In block

1500, the cloud storage gateway receives a request to store a file chunk in the cloud storage system, the request including both the file chunk and the chunk ID. For example, the cloud storage gateway may receive a message from the client device with a PUT command, a file chunk, a chunk ID; furthermore, the PUT command could be accompanied by a list of file chunks and chunk IDs. With reference to a single file chunk and chunk ID pair, the cloud storage gateway determines, at block 1510, whether that file chunk is present in the cloud storage system. If the file chunk is already present in the cloud storage system the method is done at block 1550. If the file chunk is not present in the cloud storage system, the method continues on to block 1520 and validates the file chunk. Since the file chunk will be available to all client devices requesting a file chunk with the corresponding chunk ID, it is important to ensure that the data in the file chunk is valid. Therefore, the cloud storage gateway generates a chunk ID from the file chunk and compares the generated chunk ID with the received chunk ID. If the generated chunk ID matches the received chunk ID then the file chunk is valid and the method continues to block 1530 otherwise the method is done and returns to block 1550. In block 1530, the cloud storage gateway stores the data in the cloud storage pool. The data is stored at a location associated with the chunk ID. For example, the file chunk may be stored in a database of file chunks or may be stored in a file system of file chunks. In one embodiment, the cloud storage system copies the file chunk into a remote cache of the cloud storage pool at block 1540 so that the file chunk will be available more quickly to service future request for that file chunk. In some embodiments, the method returns an indication to the client device of whether the data was or was not stored.

Figure 16:
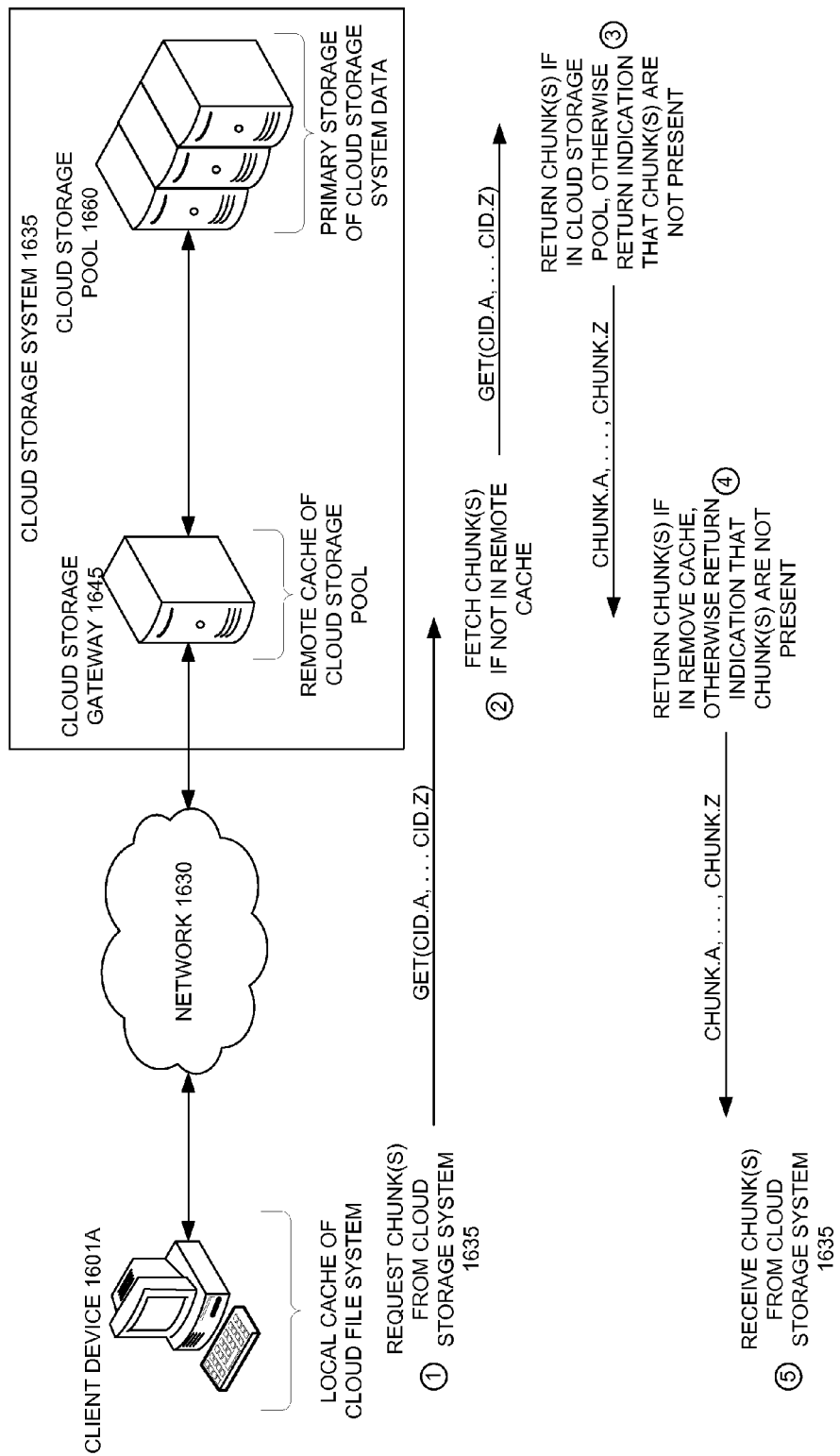
FIG. 16 illustrates a data flow diagram to request a file chunk from a cloud storage system in accordance with embodiments of the invention.

FIG. 16 illustrates a data flow diagram to request a file chunk from a cloud storage system in accordance with embodiments of the invention. A client device 1601A is coupled with a cloud storage system 1635 through a network 1630. The cloud storage system 1635 comprises a cloud storage gateway 1645 coupled with a cloud storage pool 1660. The cloud storage gateway 1645 acts as a remote cache of the cloud storage pool and the cloud storage pool acts as the primary storage of cloud storage system data. At step 1, the client device 1601A transmits a message to the cloud storage gateway 1645 to request one or more file chunks. For example, the message is a GET message with one or more chunk IDs. At step 2, the cloud storage gateway 1645 fetches the file chunks from the cloud storage pool 1660 if the file chunks are not present in the remote cache. For example, the cloud storage gateway 1645 issues a GET message to the cloud storage pool 1660 accompanied by a list of chunk IDs to return. At step 3, the cloud storage pool 1660 returns each requested file chunk that is present in the cloud storage pool 1660. Otherwise, the cloud storage pool 1660 returns an indication for those chunks that were not present in the cloud storage pool 1660. At step 4, the cloud storage gateway 1645 returns the request file chunks to the client device 1601A if those file chunks were present in the cloud storage system 1635, otherwise the cloud storage gateway 1645 returns an indication for those file chunks that were not present in the cloud storage system 1635. At step 5, the client device 1601A receives the file chunks or indications from the cloud storage system 1635.

Figure 17:
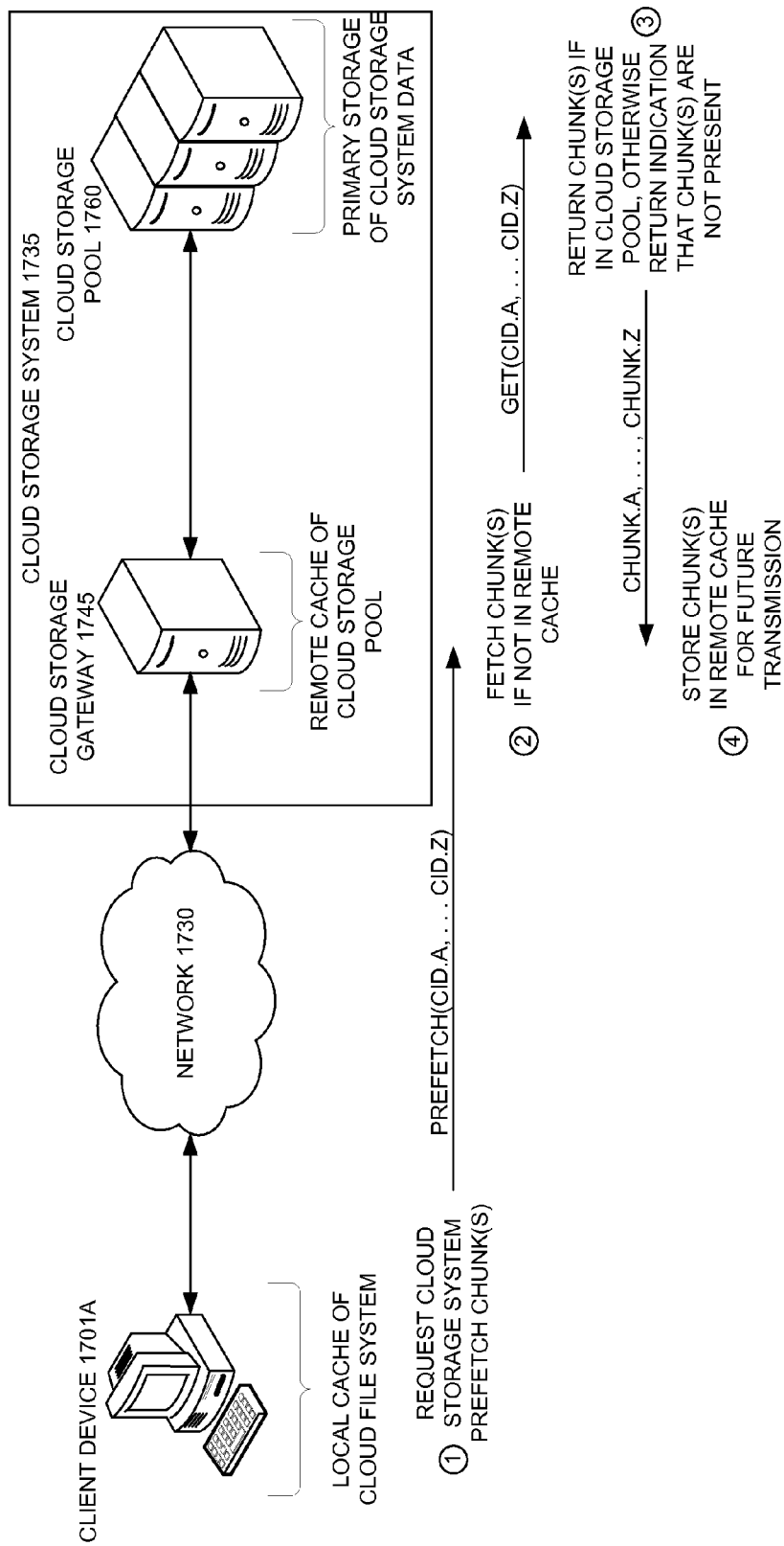
FIG. 17 illustrates a data flow diagram to request a cloud storage pool to prefetch a file chunk in accordance with embodiments of the invention.

FIG. 17 illustrates a data flow diagram to request a cloud storage pool to prefetch a file chunk in accordance with embodiments of the invention. A client device 1701A is coupled with a cloud storage system 1735 through a network 1730. The cloud storage system 1735 comprises a cloud storage gateway 1745 coupled with a cloud storage pool 1760. The cloud storage gateway 1745 acts as a remote cache of the cloud storage pool and the cloud storage pool acts as the primary storage of cloud storage system data. At step 1, the client device 1701A transmits a message to the cloud storage gateway 1745 to request one or more file chunks be prefetched by the cloud storage gateway 1745 from the cloud storage pool 1760. At step 2, the cloud storage gateway 1745 fetches the file chunks with a GET command and the list of chunk IDs for those chunks not already present in a remote cache of the cloud storage pool 1760 that resides on the cloud storage gateway 1745. At step 3, the cloud storage pool 1760 returns each requested file chunk that is present in the cloud storage pool 1760. Otherwise, the cloud storage pool 1760 returns an indication for those chunks that were not present in the cloud storage pool 1760. At step 4, the cloud storage gateway 1745 stores the returned chunks in the remote cache of the cloud storage pool so that the file chunks will be available for quicker access for future requests.

Figure 18:
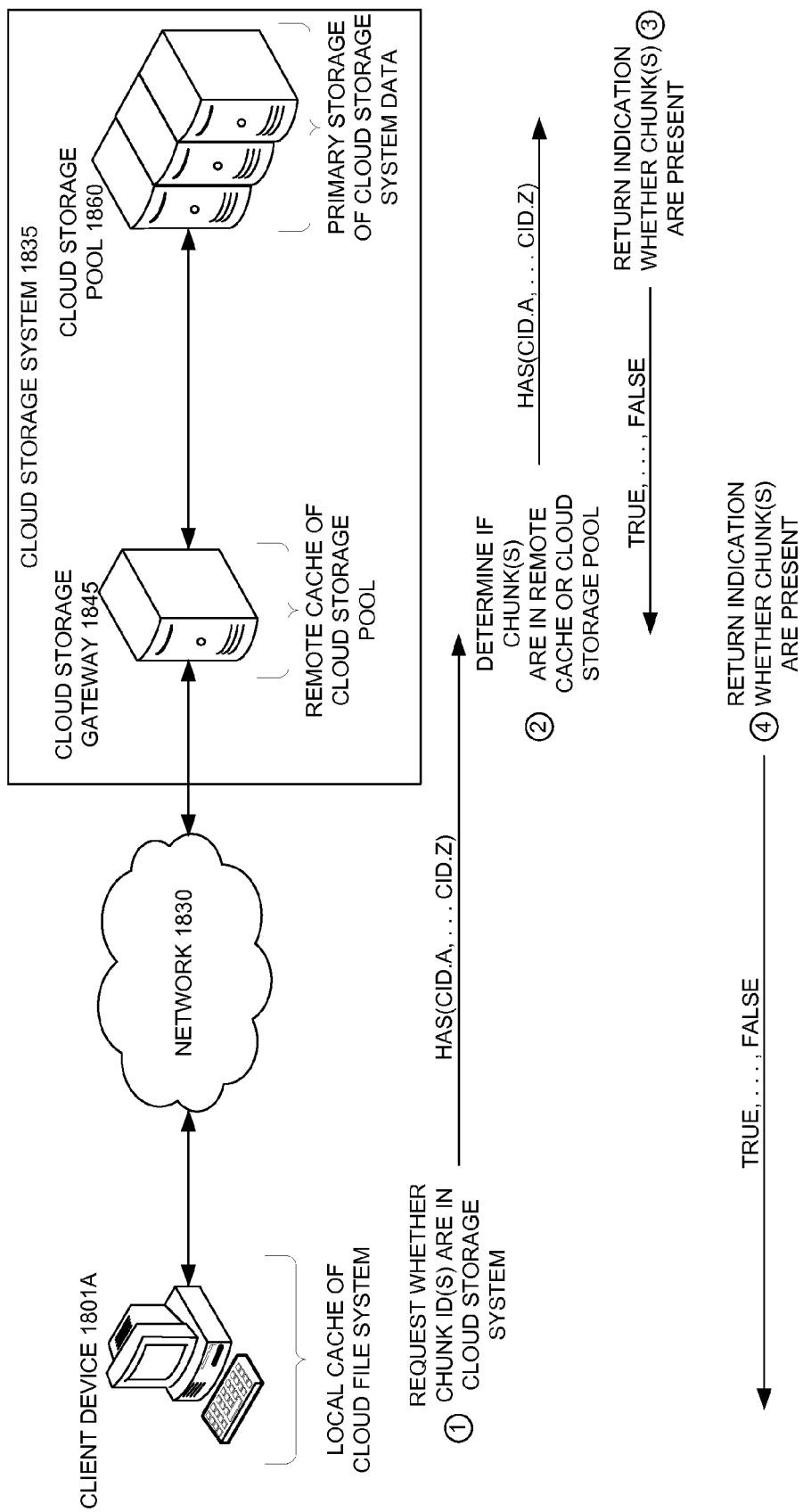
FIG. 18 illustrates a data flow diagram to request an indication of whether a cloud storage system has one or more file chunks in accordance with embodiments of the invention.

FIG. 18 illustrates a data flow diagram to request an indication of whether a cloud storage system has one or more file chunks in accordance with embodiments of the invention. A client device 1801A is coupled with a cloud storage system 1835 through a network 1830. The cloud storage system 1835 comprises a cloud storage gateway 1845 coupled with a cloud storage pool 1860. The cloud storage gateway 1845 acts as a remote cache of a cloud storage pool and the cloud storage pool 1860 acts as the primary storage of cloud storage system 1835 data. At step 1, the client device 1801A transmits a message to the cloud storage gateway 1845 to request an indication of whether one or more file chunks are in the cloud storage system 1835. At step 2, the cloud storage gateway 1845 determines whether the chunks are present in a remote cache of the cloud storage pool or in the cloud storage pool 1860 itself. At step 3, for those chunks which the cloud storage gateway 1845 queried the cloud storage pool 1860 of whether the cloud storage pool 1860 had the chunk, the cloud storage pool 1860 returns an indication of whether the chunks are present in the cloud storage pool 1860. At step 4, the cloud storage gateway 1845 returns an indication of whether each file chunk is present in the cloud storage system 1835.

Figure 19:
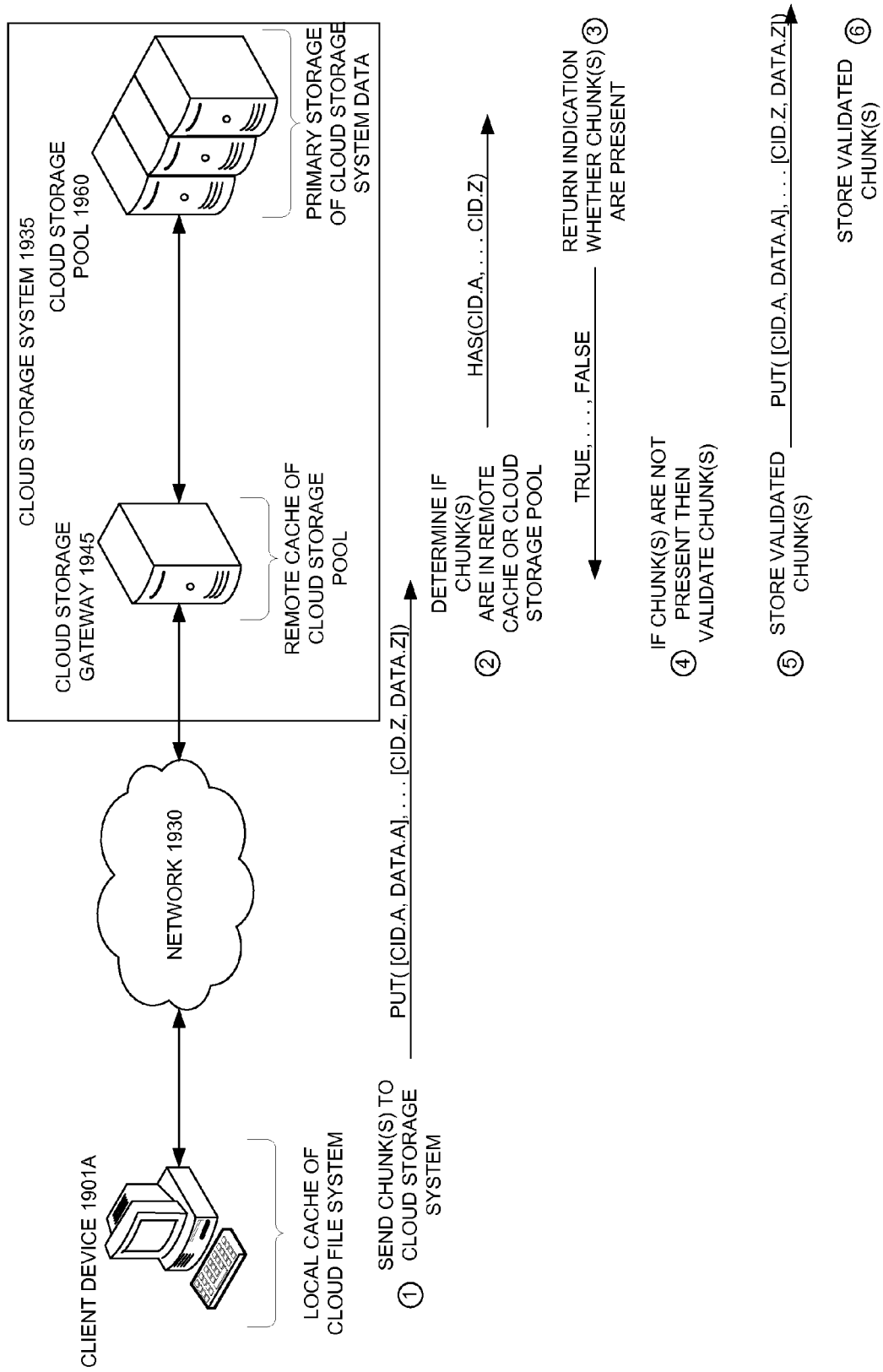
FIG. 19 illustrates a data flow diagram to store one or more file chunks in a cloud storage system in accordance with embodiments of the invention.

FIG. 19 illustrates a data flow diagram to store one or more file chunks in a cloud storage system in accordance with embodiments of the invention. A client device 1901A is coupled with a cloud storage system 1935 through a network 1930. The cloud storage system 1935 comprises a cloud storage gateway 1945 coupled with a cloud storage pool 1960. The cloud storage gateway 1945 acts as a remote cache of the cloud storage pool and the cloud storage pool 1960 acts as the primary storage of cloud storage system 1935 data. At step 1, the client device 1901A transmits a message to the cloud storage gateway 1945 to store one or more file chunks in the cloud storage system 1935. At step 2, the cloud storage gateway 1945 determines whether the chunks are present in a remote cache of the cloud storage pool or in the cloud storage pool 1960 itself. At step 3, for those chunks which the cloud storage gateway 1945 queried the cloud storage pool 1960 of whether the cloud storage pool 1960 had the chunk, the cloud storage pool 1960 returns an indication of whether the chunks are present in the cloud storage pool 1960. At step 4, the cloud storage gateway 1945 validates those chunks that are not present in the cloud storage system 1935. At step 5, the cloud storage gateway 1945 stores the validated chunks by transmitting the chunks to the cloud storage pool 1960. At step 6, the cloud storage pool 1960 saves the chunks in a data store at a location based on each chunk's ID.

With reference to FIGS. 20-24, each figure is a screenshot showing element(s) of a user interface provided by a CFS client module according to one embodiment. These screenshots are from a client device running the Mac OS X operating system. It will be appreciated by those skilled in the art that similar interfaces are provided by client devices running operating systems different than Mac OS X.

Figure 20:
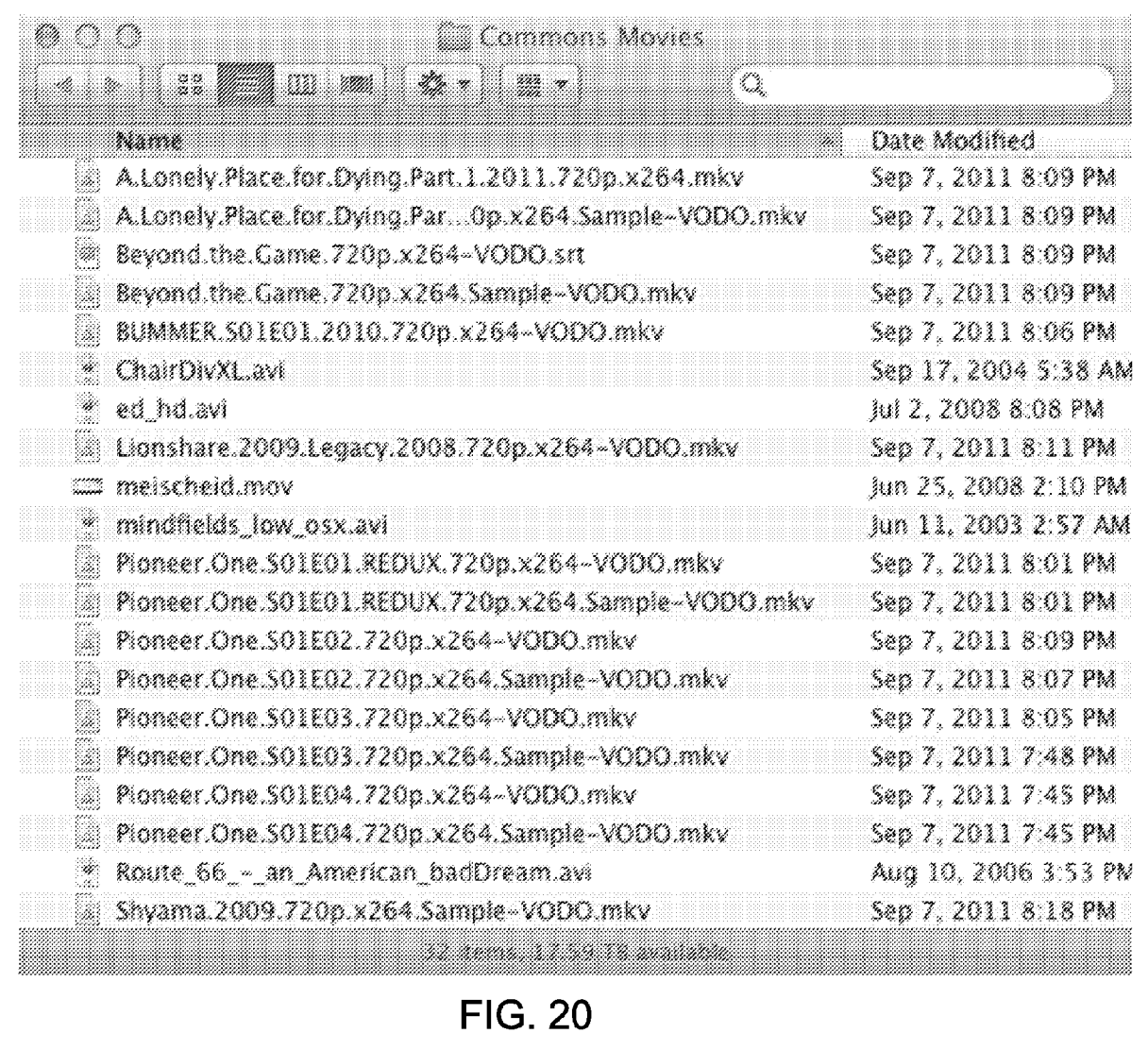

FIG. 20 illustrates a user interface listing files stored in a cloud file system in accordance with embodiments of the invention. FIG. 20 is a screen shot of a file browser window, e.g., Mac OSX Finder Window or Windows File Explorer, displaying the contents of a folder, e.g. "Common Movies." The folder "Common Windows" is a cloud file system mounted at the mount point /Users/bitcasacommon/Bitcasa/commons. The user interface shows a set of files that are stored in the cloud file system and available for access on the client device. A particularly interesting aspect of FIG. 20 is the display of the amount of space available in the folder. At the bottom of FIG. 20, the file browser interface indicates that the folders free space with "17.59 TB available." When browsing to the folder, the operating system on the client device requests the available space for the file system at which that folder is located. Since the "Common Movies" folder resides in a CFS, i.e. is a mounted CFS, the CFS client module handles the interface between the CFS and the operating system. As such, the operating system requests the available space from the CFS client module. The CFS client module returns an indication of free space as the largest number available to the CFS client module to return to the operating system based on the request. As such, in FIG. 20 the CFS client module has not returned an amount of space available based on how much space is left in the cloud storage system but has instead returned the largest value available to the operating system to display which happens to be $2^{44}$ or 17.59 terabytes. As a user adds files to the CFS, the amount of available space presented to the user and client device for the CFS stays constant.

Figure 21:
FIG. 21 illustrates a user interface for accessing features provided by a cloud file system client module in accordance with embodiments of the invention.

FIG. 21 illustrates a user interface for accessing features provided by a cloud file system client module in accordance with embodiments of the invention. FIG. 21 is a screen shot of a context menu provided by a CFS client module. The user interface provides shortcuts to two cloud file systems that are mounted on the client device, e.g. "Common Movies" and "My Files." When a user clicks on this shortcut, a file browser will open and navigate to the show the contents of that CFS. Further options are provided in the context menu, specifically "Manage Mounted Files," "Configure Bitcasa," "Bitcasa Website," "Open Bitcasa Folder," "About Bitcasa," and "Exit Bitcasa." The "Manage Mounted Files" command opens a user interface element such as described with reference to FIG. 22. The "Configure Bitcasa" command opens a user interface element such as described with reference to FIG. 23. The "Open Bitcasa Folder" command allows the user to view a list of one or more cloud file systems that are available to that user to mount at a mount point. The user can then select a CFS to mount and a mount point at which to mount the CFS. This way, a user may have a plurality of cloud file systems available to access without having each CFS mounted at all times. In one embodiment, this command opens a web interface providing links to the cloud file systems available. In another embodiment, this command opens a user interface application for the selection. The "About Bitcasa" command displays information about the CFS client module which is named "Bitcasa" in one embodiment. The "Exit Bitcasa" command directs the CFS client module to exit the CFS client module. Prior to exiting, the CFS client module may perform a number of cleanup functions such as completing the upload of any file chunks which have yet to be uploaded and unmounting all mounted cloud file systems.

Figure 22:
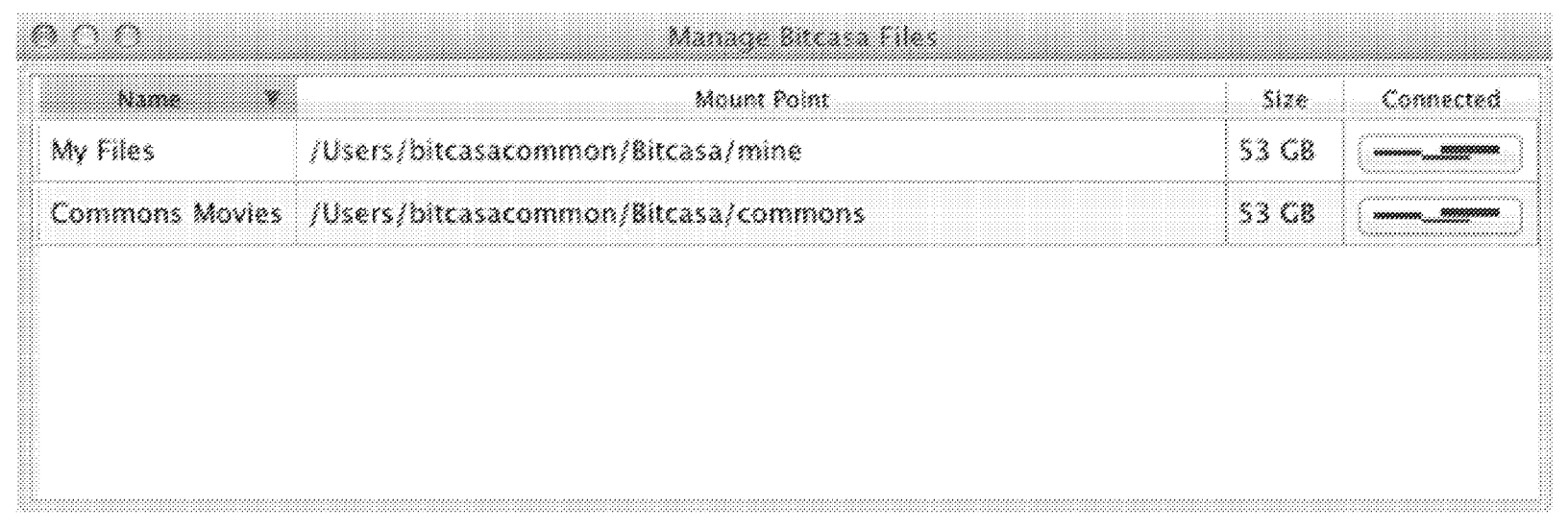

FIG. 22 illustrates a user interface provided by a cloud file system client module for managing cloud file system access on a client device in accordance with embodiments of the invention. The user interface shows a list of known, i.e. currently mounted or previously mounted cloud file systems, to the client device. The user interface further provides a button element in the connected column that indicates which cloud file systems are currently mounted and which are not. This bottom provides the user of the client device with a mechanism to quickly toggle the mounting of each CFS.

Figure 23:
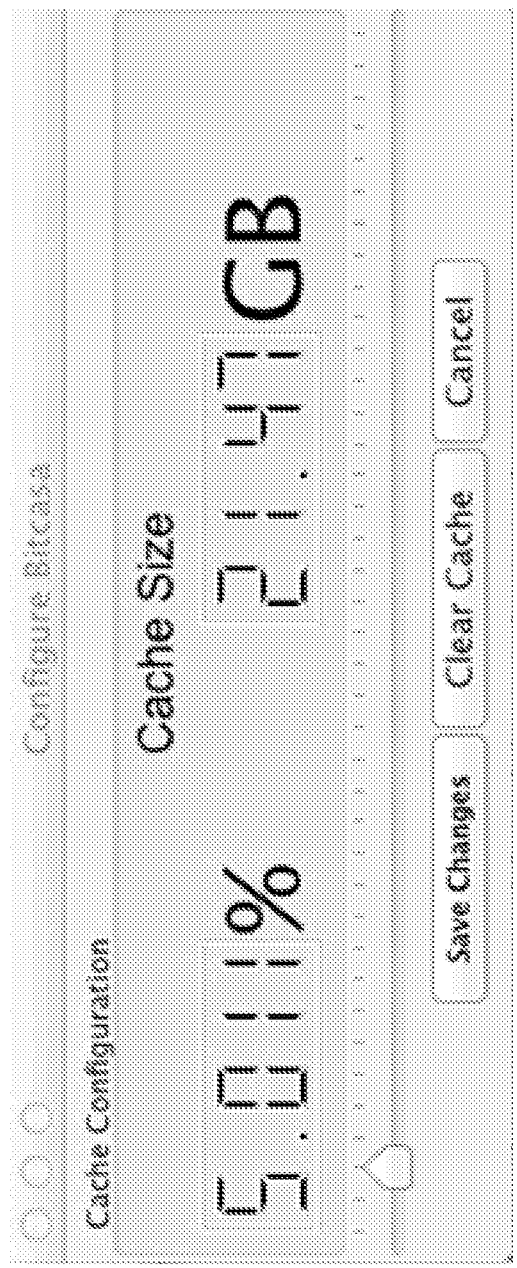
FIG. 23 illustrates a user interface provided by a cloud file system client module for managing a local cache on a client device in accordance with embodiments of the invention.

FIG. 23 illustrates a user interface provided by a cloud file system client module for managing a local cache on a client device in accordance with embodiments of the invention. The user interface provides a mechanism for a user on the client device to set how much of the client device's storage system should be allocated for the local cache of the cloud storage system. Specifically, the user interface provides a slider to set the local cache storage threshold as a percentage, which is translated to an amount of storage, of the client device's storage system. The user is further provided a button to save changes; clear the cache, i.e. remove file chunks from the local cache; or cancel changes.

Figure 24:
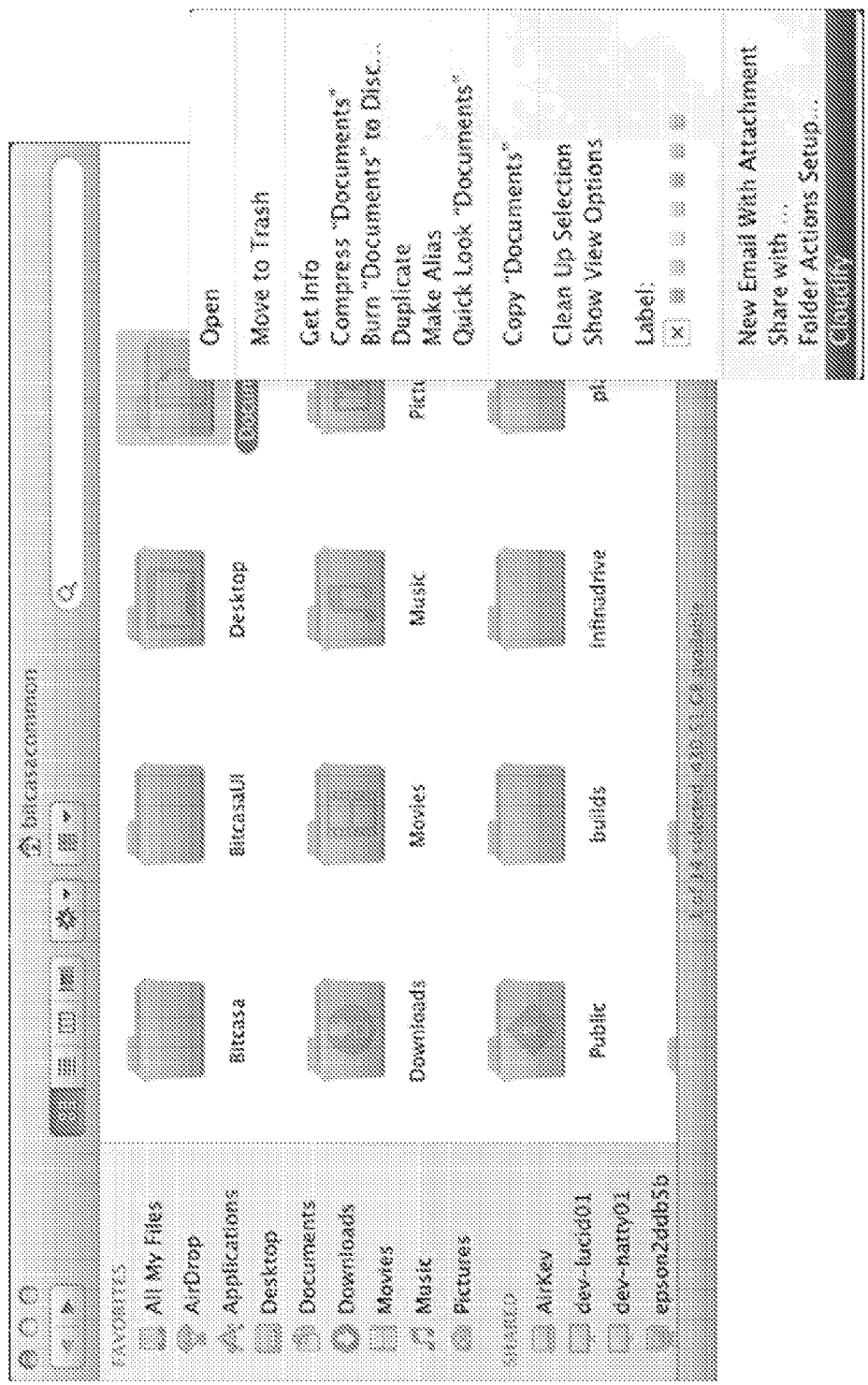
FIG. 24 illustrates a user interface provided by a cloud file system client module for converting a folder in a local file system to a folder in a cloud file system in accordance with embodiments of the invention.

FIG. 24 illustrates a user interface provided by a cloud file system client module for converting a folder in a local file system to a folder in a cloud file system in accordance with embodiments of the invention. FIG. 24 is a screen shot of a file browser window, e.g., Finder Window, displaying the contents of a folder, e.g. "bitcasacommon." A user has selected a folder called "Documents" and invoked a context menu on that folder. At present, the user has hovered over a command called "Cloudify" which, when activated, will cause the CFS client module to convert the Documents folder from a folder in the local storage system to a folder in the cloud storage system as described above.

Figure 25:
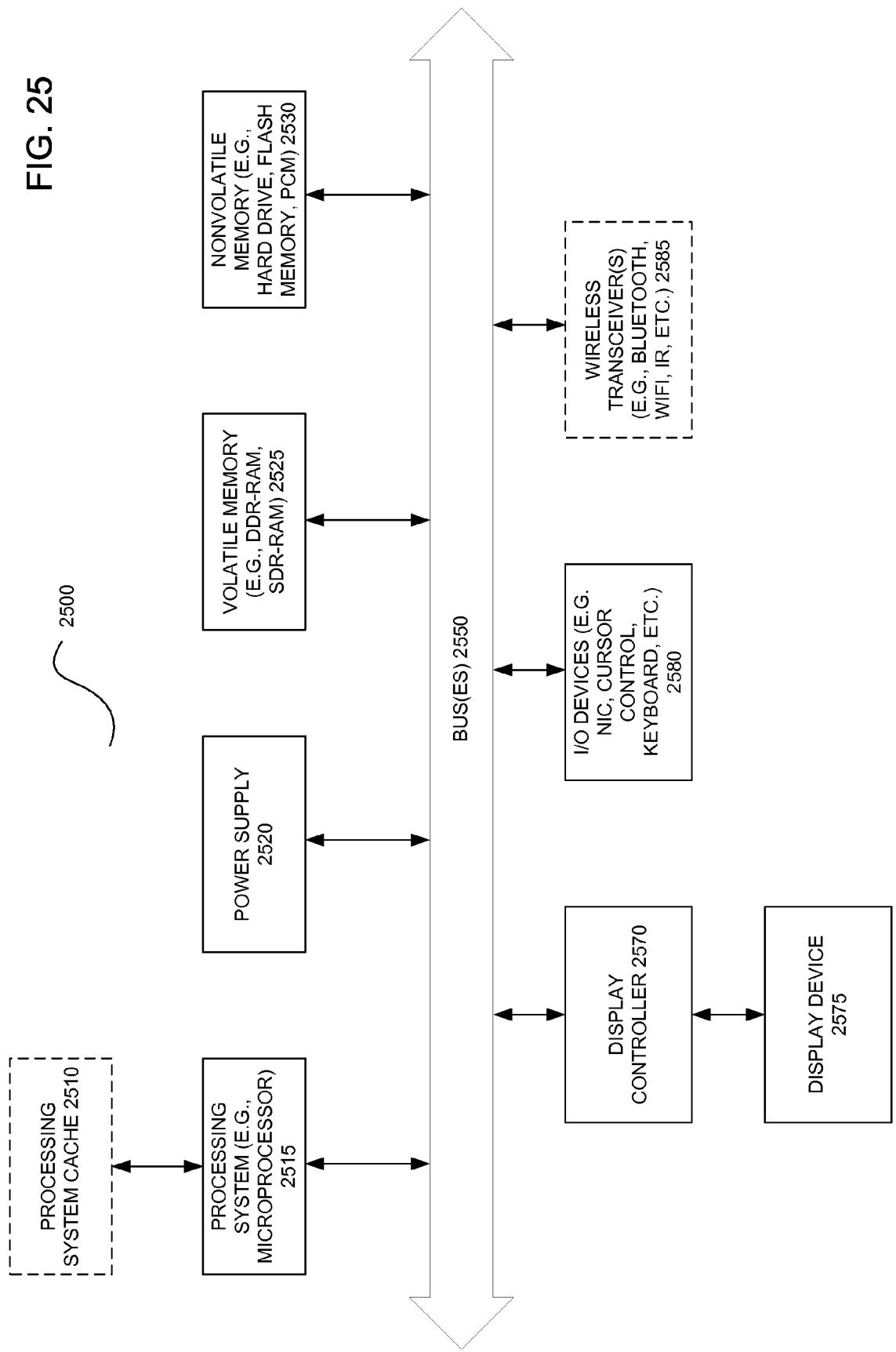
FIG. 25 illustrates a block diagram of an exemplary computer system according to embodiments of the invention.

FIG. 25 illustrates a block diagram of an exemplary computer system according to embodiments of the invention. The exemplary computer system 2500 in FIG. 25 can be used to implement the client devices 101A-101D, the cloud storage gateway 245, or an entity in the cloud storage pool 260. Those skilled in the art would recognize that other computer systems used to implement these devices may have more or less components and may be used to in embodiments of the invention.

The computer system 2500 includes bus(es) 2550 which is coupled with a processing system 2515, a power supply 2520, volatile memory 2525 (e.g., double data rate random access memory (DDR-RAM), single data rate (SDR) RAM), non-volatile memory 2530 (e.g., hard drive, flash memory, Phase-Change Memory (PCM). The processing system 2515 may be further coupled to a processing system cache 2510. The processing system 2515 may retrieve instruction(s) from the volatile memory 2525 and/or the nonvolatile memory 2530, and execute the instruction to perform operations described above. The bus(es) 2550 couples the above components together and further couples a display controller 2570, one or more input/output devices 2580 (e.g., a network interface card, a cursor control (e.g., a mouse, trackball, touchscreen, touchpad, etc.), a keyboard, etc.), and, optionally, one or more wireless transceivers (e.g., Bluetooth, WiFi, Infrared, etc.). In one embodiment, the display controller 2570 is further coupled to a display device 2575.

FIG. 26 illustrates a user interface showing a sub-set of file system elements before and after conversion to storage in a cloud file system according to embodiments of the invention. The figure shows the same sub-set of file system elements (e.g., folders) in block 2600 and block 2650. The distinction being that in block 2600 all of the file system elements are being stored in the local storage system of the client device being operated. In block 2650, five of the folders have been "Cloudified" as described with reference to FIG. 9. These folders (e.g., Documents, Movies, Music, Pictures, and Source Code) have been converted from storage in the local storage system to storage in a cloud storage system. As described, the user is presented with an indication that these folders are in the cloud storage system (e.g., the icon has been modified to present the indication to the user). Further, the folders exist in the same logical path to the operating system of the client device and to the user. Therefore, any programs requiring this information access the files by requesting data from files at the same location as before but now a CFS client module acts as an intermediary for access to files being stored in the cloud storage system.

Figure 27:
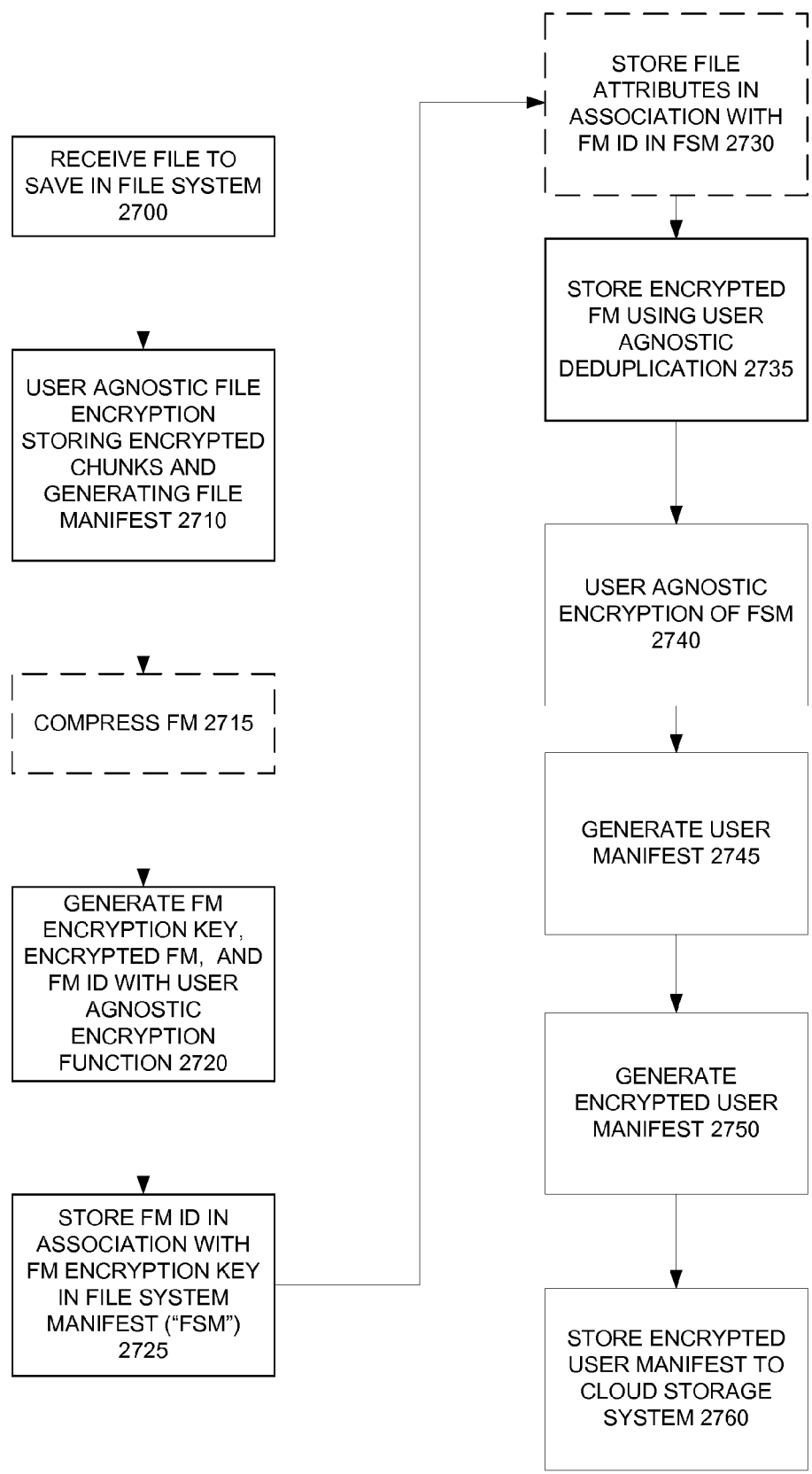
FIG. 27 illustrates a flow chart of a method for saving a file in a cloud file system including generating a file system manifest in accordance with embodiments of the invention.

FIG. 27 illustrates a flow chart of a method for saving a file in a cloud file system including generating a file system manifest in accordance with embodiments of the invention. The embodiment of FIG. 27 is similar to the embodiment of FIG. 7. The user agnostic encryption of chunks and the generation of a file manifest is performed in blocks 2700, 2710, 2715, and 2720 as described with respect to FIG. 7. Furthermore, the storage of a file manifest ID and file manifest encryption key in a file system manifest is performed in blocks 2725 and 2730 in accordance to the method described in FIG. 7. Furthermore, the file manifest is stored in cloud storage system in block 2735 in the same way as described with reference to FIG. 7.

In block 2740, the CFS client module generates a file system manifest encryption key, an encrypted file system manifest, and a file system manifest ID. In one embodiment, these are generated with a user agnostic encryption method such as described with reference to FIG. 5. Furthermore, the CFS client module stores the encrypted file system manifest in the cloud storage system with user agnostic deduplication. At block 2745, the CFS client module generates a user manifest, or if a user manifest already exists adds to the user manifest. The CFS client module adds the file system manifest encryption key and the file system manifest ID to the user manifest.

In one embodiment, the CFS client module further adds metadata information associated with the file system manifest to the user manifest. The metadata information may be stored as plaintext or as encrypted text in the user manifest. The metadata includes any information used by the CFS client module for enabling the usage of cloud file systems. For example, a file system manifest that includes file manifests generated by a CFS client module for backup purposes may include the unique identifier for the computer from which a file was generated. Furthermore, the metadata may include index information or information identifying an index that is stored in the cloud storage system for that file system manifest. The metadata may further include information identifying the mount point at which the user has mounted the cloud file system. The metadata allows another CFS client module to have an understanding of how and where the cloud file system was generated so that when a user logs into another client device the CFS client module on that client device will understand how to mount the cloud file systems listed in the user manifest.

At block 2750, the CFS client module generates an encrypted user manifest for storage in the cloud storage system. The CFS client module encrypts the user manifest with a user specific key or password. The CFS client module stores the encrypted user manifest in the cloud storage system at block 2760. The encrypted user manifest is stored in association with the user in the cloud storage system.

Figure 28:
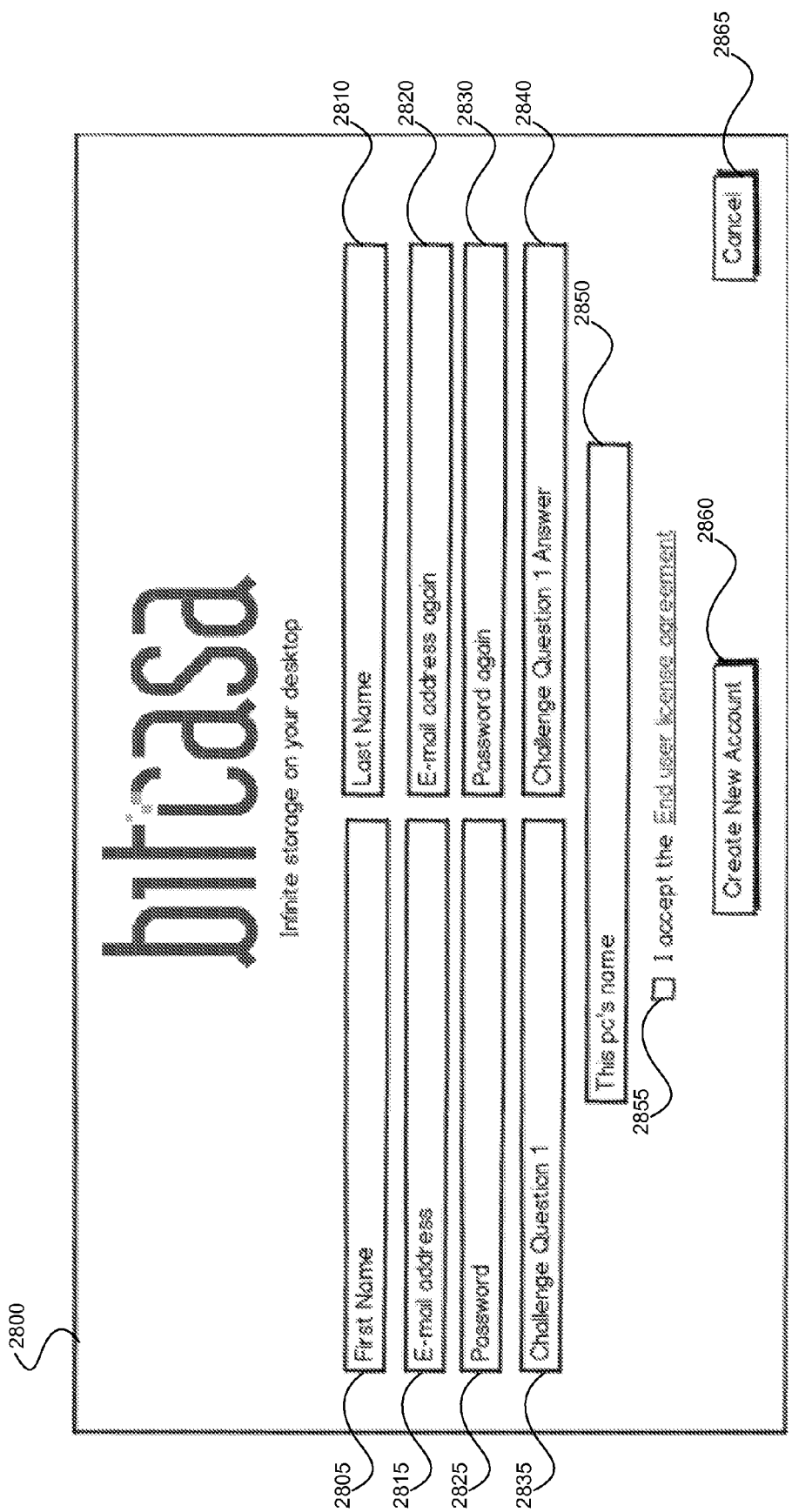
FIG. 28 illustrates a user interface provided by a cloud file system client module for generating a new user in a cloud storage system in accordance with embodiments of the invention.

FIG. 28 illustrates a user interface provided by a cloud file system client module for generating a new user in a cloud storage system in accordance with embodiments of the invention. The user interface 2800 is shown with a plurality of information fields to be filled in by a user. For example, the user interface 2800 presents the following fields: first name 2805, last name 2810, e-mail address 2815, and confirmation e-mail address 2820, password 2825, and confirmation password 2830, a challenge question 2835, a challenge question answer 2840, a name for the client device 2850, and a license agreement checkbox 2855. In another embodiment, the user interface 2800 presents one or more addition challenge question and challenge question answer field pairs. Furthermore, the user interface 2800 presents a "Create New Account" button 2860 and "Cancel" button 2865.

Upon a the user filling in the presented fields in the user interface 2800 and the user clicking the "Create New Account" button 2860, the CFS client module generates a new user with the cloud storage system. The CFS client module generates a user key to associate with the new user. For example, the CFS client module may use the date and time, user interface input, file system information, or other data or combinations of these inputs to generate a random user key. The user key is encrypted by the user's password for storage in the cloud storage system. The user key is further encrypted by one or more challenge answers for storage in the cloud storage system. The CFS client module transmits the new user information to the cloud storage system to generate the new user. As such, the plurality of encrypted user keys, the one or more challenge questions, and the user's information (email, first name, and last name) is transmitted to the cloud storage system. In another embodiment, a hash of the user's password is further transmitted.

Upon generation of the new user, the cloud storage system can transmit a common file system manifest and an encryption key for the common file system manifest. For example, the cloud storage system may comprise a plurality of public domain movies, music files, pictures, books, or websites that can be added to the common file system manifest. The CFS client module receives the common file system manifest and common file system manifest encryption key and adds that information to a new user manifest generated for that user. The CFS client module encrypts the user manifest with the user's key and uploads the information to the cloud storage system.

As the user creates new cloud file systems, virtualizes folders, or changes data in existing cloud file systems, the user manifest will change. The user manifest is encrypted with the user's key prior to upload by the CFS client module as the user manifest changes. Furthermore if a user wishes to share a file system with another user, the CFS client module can generate a temporary user manifest with the file system manifest entry and encrypt the temporary user manifest with a key known to, or a key that will be provided to, the other user.

Figure 29:
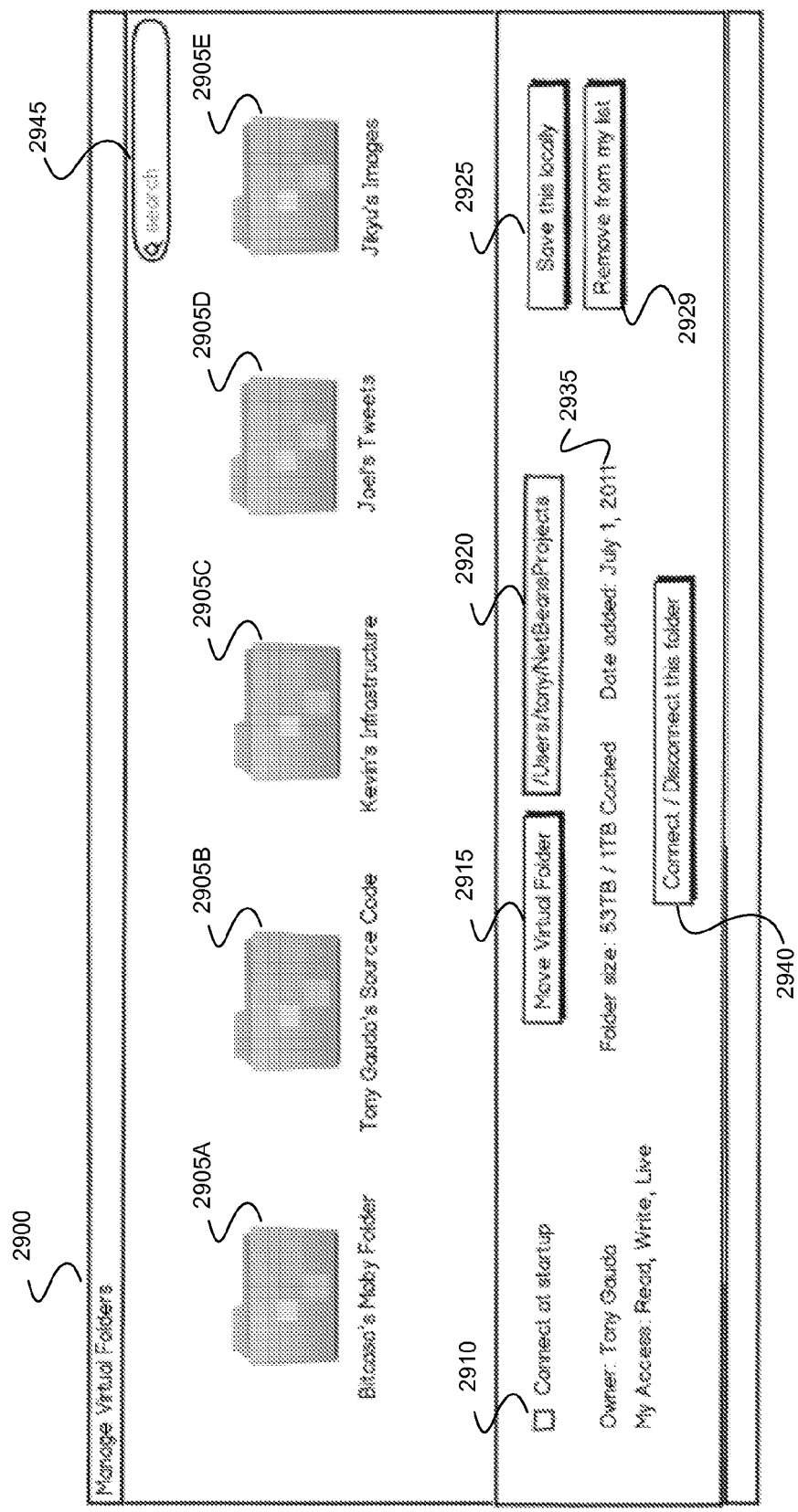
FIG. 29 illustrates a user interface provided by a cloud file system client module for managing virtual folders in accordance with embodiments of the invention.

FIG. 29 illustrates a user interface provided by a cloud file system client module for managing virtual folders in accordance with embodiments of the invention. FIG. 29 has a user interface 2900 that lists five virtual folders 2905A-E. Each virtual folder is a folder that is based on data stored in a cloud storage system, e.g., a FSM. When a user logs into the CFS client module, the cloud storage system provides the CFS client module with that user's user manifest which resides in the cloud storage system in encrypted form. As described above, the user manifest is encrypted with the user's key which is available to the CFS client module after the user logs into the CFS client module. Therefore, the CFS client module decrypts the user manifest with the user's key and retrieves the listing of the user's cloud file system, e.g., the FSMs included in the user manifest. In one embodiment, each FSM is associated with metadata that includes a mount point or mount points specified for that FSM and a name associated with the FSM. For a user with multiple client devices that each mount the same FSM, that FSM may have one mount point listed that is common for each client device or may contain a specific mount point for each client device.

Furthermore, the metadata associated with each FSM may indicate whether to mount the FSM at startup. Upon initiating the mounting of a FSM, the CFS client module may determine that the mount point is not available because data resides at the location of the mount point. The CFS client module can reconcile this conflict in a plurality of ways. First the CFS client module can mount the FSM at a different location determined either automatically or selected by the user. Further, the CFS client module may automatically add the contents at the conflicting location to the FSM and the cloud storage system then remove the data from the conflicting location. After which, the CFS client module can mount the FSM to the conflicting location that is now fully available. Furthermore with reference to the techniques described above, the CFS client module can take over management of the folder and provide the folder as a hybrid folder of files/folders contained within a CFS and files/folders contained in the local storage system.

The user interface 2900 allows the user to manage these virtual folders and the corresponding configuration options. The user can select one of the virtual folders 2905A-E and manage the options for that virtual folder. The user can check box 2910 to choose to mount that selected virtual folder at startup. Button 2915 allows the user to move the mount point of a folder while textbox 2920 shows the mount point at which the selected virtual folder is to be mounted. Button 2925 allows the user to mark a virtual folder for local storage. As described above, the CFS client module will mark files within the virtual folder for local caching when this button is pressed; i.e. ensure the file chunks that make up the files in that virtual folder are cached locally and pin the files to prevent cache eviction. Button 2929 allows the user to remove the selected virtual folder from his user manifest. The text area 2935 displays a plurality of information associated with the selected FSM, such as owner, access permissions, folder size (amount of data within virtual folder), amount of data from virtual folder in the local cache, and the data added to the user's manifest. Button 2940 allows a user to connect and disconnect a virtual folder, i.e. mount and unmount an FSM.

Figure 30:
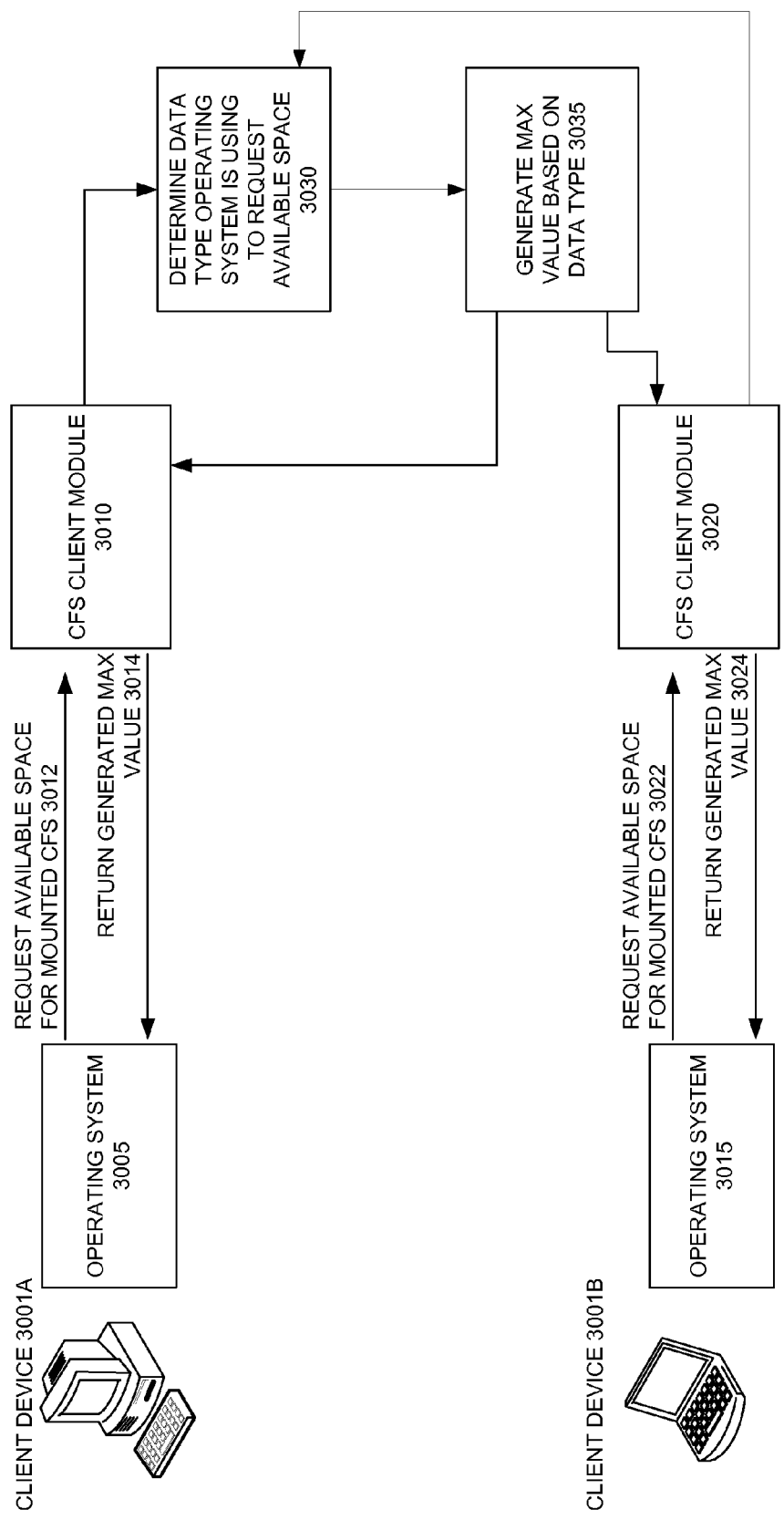
FIG. 30 illustrates a method performed by cloud file system client modules for providing an amount of available space to a client device's operating system in accordance with embodiments of the invention.

FIG. 30 illustrates a method performed by cloud file system client modules for providing an amount of available space to a client device's operating system in accordance with embodiments of the invention. FIG. 30 shows two client devices 3001A and 3001B. Each client device 3001A and 3001B are running an operating system 3005 and 3015. Depending on the client device 3001A and 3001B, these operating systems may be the same operating system, different versions of the same operating system, or different operating systems. FIG. 30 illustrates each operating system 3001A and 3001B determining the amount of available space in a mounted CFS. Operating system 3005 issues a request 3012 for the amount of available space in a CFS mounted on client device 3001A. The request is handled by the CFS client module 3010 running on client device 3001A. The CFS client module 3010 determines what data type the operating system is using to request the available space at block 3030. For example, the operating system may use an unsigned 32-bit integer (sometimes referred to as a long integer) to request the amount of space available. In that case the CFS client module 3035 would generate, in block 3035, a 32-bit integer in which all bits were set to 1, indicating the max 32-bit unsigned value of 4,295,967,295 bytes available. In one embodiment, the CFS client module 3010 has been compiled specifically for the operating system 3005 and therefore the CFS client module 3010 knows the expected data type based on the compilation targeted for that operating system. In other embodiments of the invention, the CFS client module 3010 can determine the data type from the request 3012. Once the max value is generated in block 3035, this value is returned 3024 to the operating system 3005.

Assuming that client device 3001B is running an operating system 3015 corresponding to the file browser shown in FIG. 20, then the operating system has issued a request for the available space 3022 for the "Common Movies" CFS. A client module 3020 running on the client device 3001B has determined the data type and generated the max value in blocks 3030 and 3035. In FIG. 20, the available space shown (at the bottom of FIG. 20) is 17.59 terabytes which is 17,592, 186,044,416 bytes or 2 to the 44th power. Therefore, CFS client module 3020 has returned 3024 a max value of at least 17.59 terabytes. For example, the CFS client module may have returned a max value of 17.59 terabytes which is shown to the user by the operating or the CFS client model may have generated a max value greater than 17.59 terabytes which was truncated by the operating system prior to display to the user.

Another such method for providing an amount of available space to a client device's operating system in accordance with embodiments of the invention is to determine the maximum block size and the maximum number of available blocks that the CFS client module can return to the operating system. Thus, upon a request to determine the amount of space available, the CFS client module returns an indication of the maximum number of blocks allowed with the maximum block size to indicate the available space.

Figure 31:
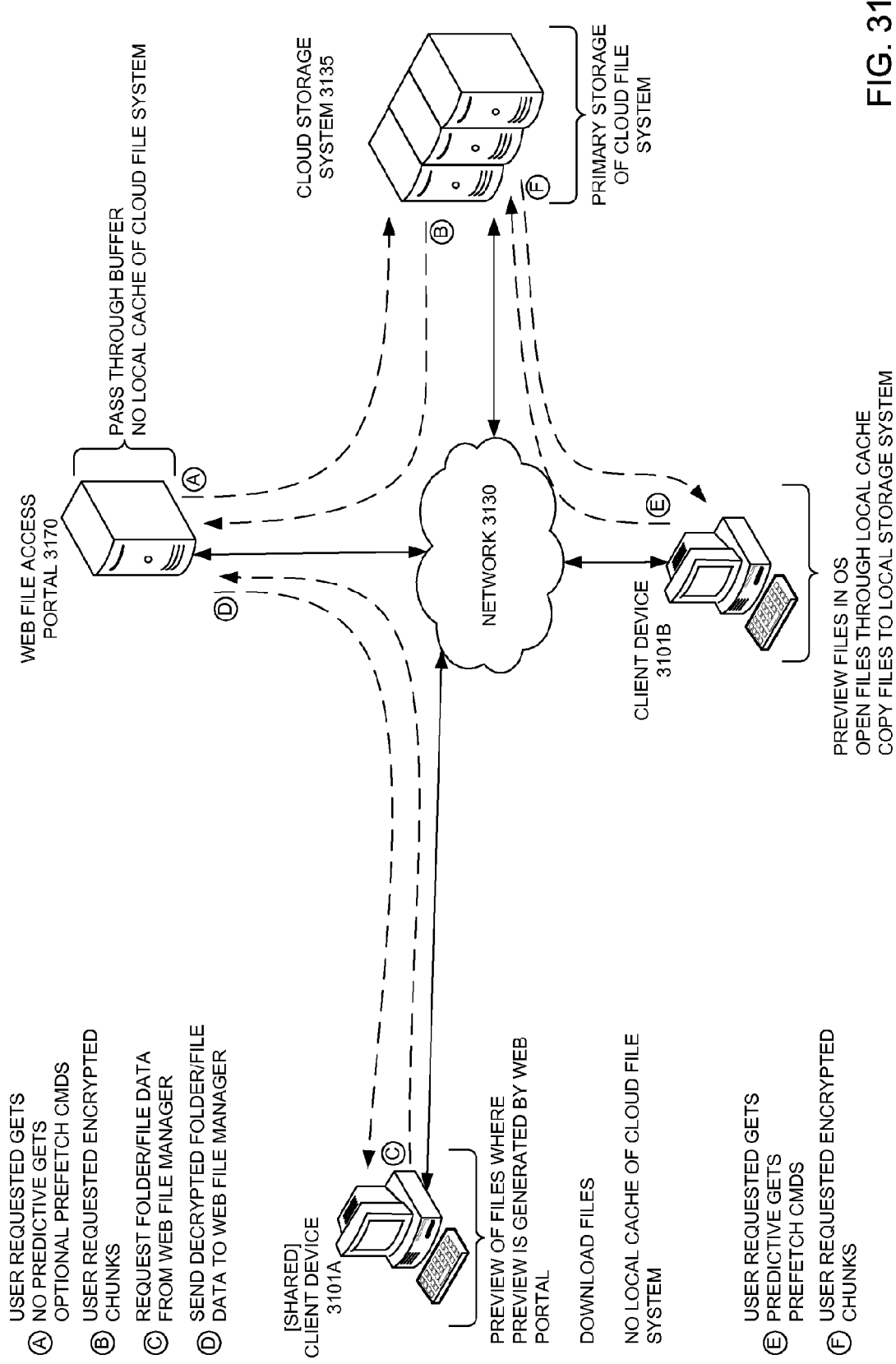
FIG. 31 illustrated a cloud storage system being accessed by a web file access portal and a client device in accordance with embodiments of the invention.

Server based data decryption and access can be temporarily allowed if the user enters their password into a secure web form and the server decrypts the required data on the fly to display during a web session. FIG. 31 illustrated a cloud storage system being accessed by a web file access portal and a client device in accordance with embodiments of the invention. In FIG. 31, a cloud storage system 3135 is coupled with a network 3130. The network 3130 provides connectivity to the cloud storage system with a plurality of devices such as client devices 3101A-3101B and web file access portal 3170.

Client device 3101B is shown running a CFS client module as described herein. The client device 3101B is able to preview files stored in a CFS mounted on the client device 3101B presuming the client device's operating system provides a preview function. Further, the client device 3101B can open files from the mounted CFS and copy files to the local storage system from the CFS. As described above, the CFS client module provides this functionality to the client device 3101B by issuing a series of commands to the cloud storage system 3135 shown as messages E. Messages E comprise user requested gets, i.e. commands issued to get a chunk from the cloud storage system based on data being accessed by said user. The CFS client module running on the client device 3101B may further issue predictive get commands, i.e. commands issued to get a chunk from the cloud storage system based on data the CFS client module is predicating the user will access soon. The CFS client module may further issue prefetch commands to the cloud storage system that inform the cloud storage system that it should be prepared to send a particular chunk or chunks to the client device 3101B. Messages F are shown from the cloud storage system to the client device that comprise encrypted chunks requested by a get command (user requested or predictive) issued by the CFS client module running on client device 3101B.

The web file access portal 3170 provides a mechanism for a user to access files in his cloud file systems on a client device 3101A with or without installing the CFS client module. For example, a user may arrive at a public terminal or shared computer and wish to access a file or files from his CFSs without logging into or perhaps without install the CFS client module. The web file access portal 3170 provides the user with the option of accessing his data through a web file manage presented through a web interface at the cost of exposing his password and user key to the web file access portal 3170.

As such a user starts a web browser session on client device 3101A and navigates to a login page provided by the web file access portal 3170. The user is presented with an authentication page to login with his login information, i.e. username/email and password. Further, the user may be presented with service terms with which they must agree such as agreeing that usage of the web portal requires exposing their user key and password to the web file access portal 3170 to allow the web file access portal 3170 to access the user's encrypted user manifest.

Upon authenticating with the web file access portal 3170, the web file access portal 3170 retrieves the user's user manifest and the user's encrypted user key from the cloud storage system 3135. The web file access portal 3170 uses the user's password to decrypt the user's key. The web file access portal 3170 can now decrypt the user's user manifest with the user's key. As described above, the user manifest comprise listings of available cloud file systems, e.g. a listing of FSMs and corresponding metadata along with corresponding encryption keys to decrypt each FSM. Using the listing of CFSs, the web file access portal 3170 can generate a web based user interface that allows the user to explore his CFSs and locate files which the user wishes to access.

The web file access portal 3170 provides security to the user by acting as a pass through buffer, an intermediary, but does not maintain an unencrypted local cache of the cloud storage system 3135. Depending on the security concerns present, the web file access portal 3170 may not even provide a local cache of encrypted chunks from the cloud storage system 3135. Therefore, the web file access portal 3170 runs a CFS web access module that is in many ways a modified CFS client module. The CFS web access module issues messages A to the cloud storage system 3135 comprising user requested gets and optional prefetch commands. Depending on the security model, the CFS web access module does not even issue predictive gets to the cloud storage system in an effort to minimize the amount of user data located on the web file access portal 3170. As with communication to client device 3101B, the cloud storage system 3135 communicates encrypted chunks to the web file access portal 3170.

As a user browses the folders within a CFS, eventually the user will come to a file he wishes to access or download. When selecting a file in the web file browser, the web file access portal will retrieve the corresponding file manifest from that CFS's FSM and decrypt the FM with the encryption key stored in the FSM. As described above, this will give the web file access portal 3170 a listing of file chunks that comprise that file, corresponding metadata, and encryption keys. Using this information, the web file access portal 3170 generates a decrypted version of the file on the web file access portal 3170 and generates an information screen which may include an embedded preview depending on the type of file being accessed. The information screen further provides a user with the opportunity to download the file. Thus, client device 3101A issues a number of messages C to the web file access portal 3170 with requests for folder and file data. The web file access portal 3170 sends messages D that include decrypted folder and file information to the web file manager. It is important to note that the references to decrypted folder and file information in messages D refer to the fact that the information transmitted from the web file access portal 3170 to the client device 3101A is not encrypted in accordance with the encryption principles described in embodiments of the invention. However, web browsers and servers employ traditional technologies, e.g. Hypertext Transfer Protocol Secure ("HTTPS"), that provide secure communication in accordance to those technologies.

Figure 32:
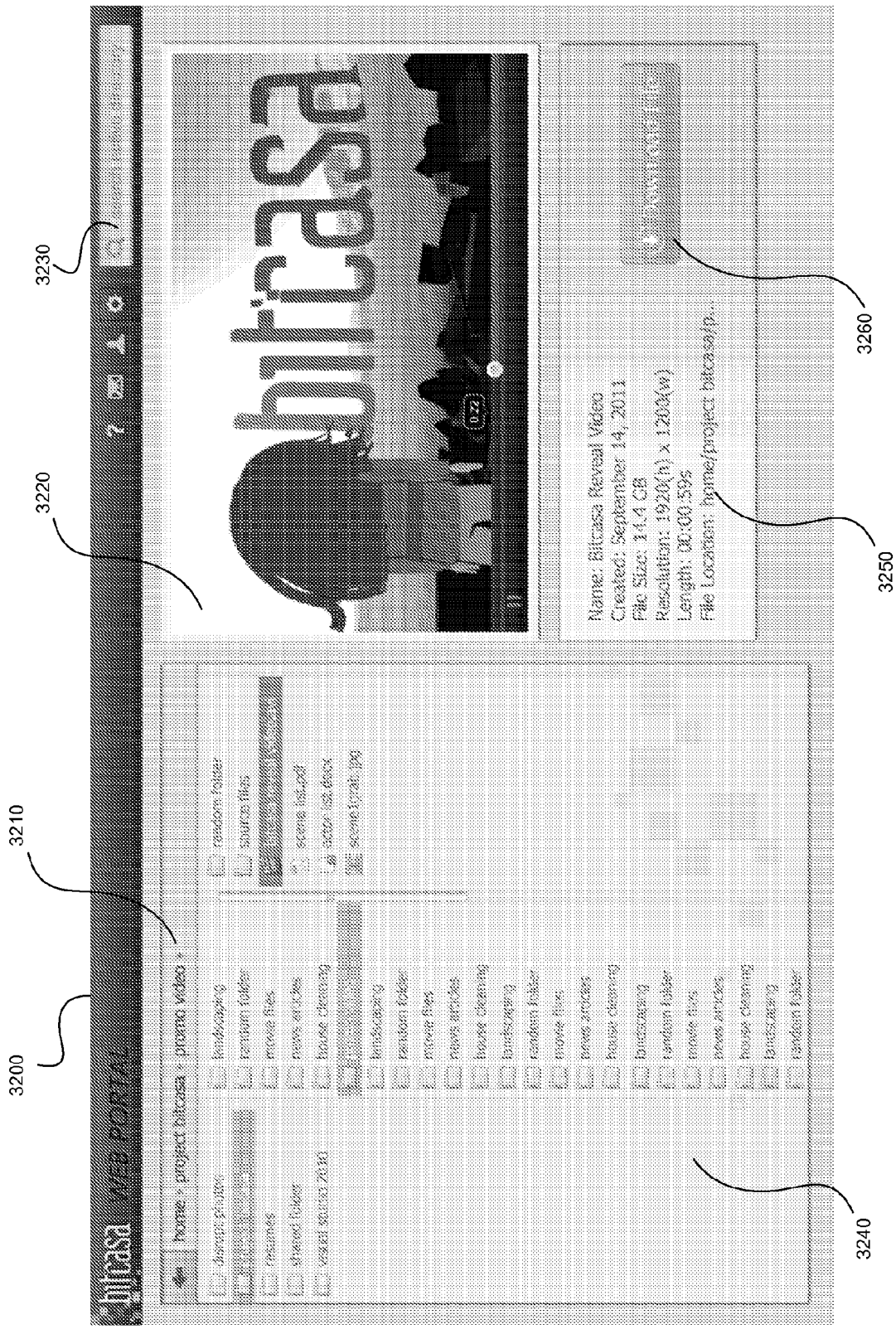
FIG. 32 illustrates a web file browser interface provided by a web file access portal accessing a cloud storage system in accordance with embodiments of the invention.

FIG. 32 illustrates a web file browser interface provided by a web file access portal accessing a cloud storage system in accordance with embodiments of the invention. The web file access portal presents a user with an interface 3200. The user interface 3200 is presented to a user upon the successful authentication of the user by the web file access portal with the cloud storage system. As described with reference to FIG. 31, the web file access portal uses a user's user key to retrieve and decrypt information contained within a user's user manifest. The interface 3200 comprises a plurality of user interface elements such as a help icon, a mail icon, a user management icon, and a settings icon. Further, the web file access portal presents the user with a search box 3230. Upon entering text in the search box 3230, the web file access portal recursively iterates through files and sub-folders to find files that match the search criteria entered in box 3230. The search results are presented to the user as a web file browser 3240. When a user logs into the user interface 3200, the user is presented with a listing of cloud file systems in the web file browser 3240. As the user selects a CFS, the web file access portal determines the files and folders contained within the CFS and presents those to the user in a hierarchical fashion in the web file browser 3240. When the user selects a file in the web file browser 3240, the web file access portal retrieves the corresponding FM from the cloud storage system and decrypts the FM using the encryption key located within the FSM. Using the information within the FM, the web file access portal is able to retrieve the encrypted file chunks from the cloud storage system that make up the selected file and decrypt those chunks using the encryption keys located in the FM. Using this information the web file access portal reconstructs the file, generates a preview area 3220 corresponding to the file type, a file information area 3250, and a download button 3260.

Figure 33:
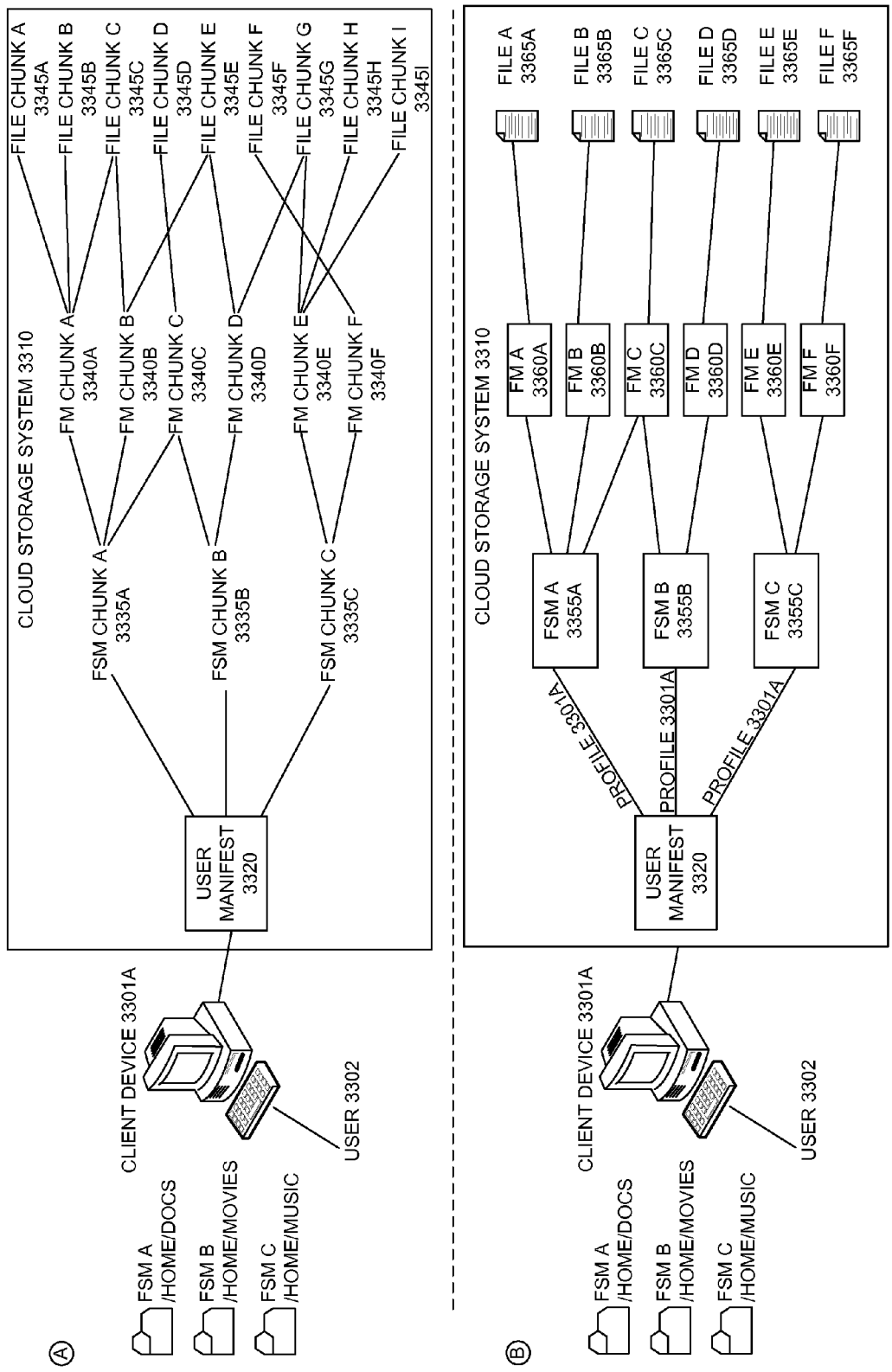
FIG. 33 illustrates a block diagram showing the relationship between data structures in accordance with embodiments of the invention.

FIG. 33 illustrates a block diagram showing the relationship between data structures in accordance with embodiments of the invention. FIG. 33 is shown in two sections separated by a horizontal dashed line. The top half of FIG. 33, the A half, shows the exemplary chunks of data stored on a cloud storage system 3310, while the bottom half of FIG. 33, the B half shows the data structures those chunks comprises and the relationship of those data structures.

In the A half, client device 3301A is running a CFS client module with a user 3302 logged and with three CFSs mounted. The first CFS is shown as FSM A mounted at a mount point of /home/docs. The second CFS is shown as FSM B mounted at a mount point of /home/movies. The third CFS is shown as FSM C mounted at a mount point of /home/music. The user manifest 3320 is shown related to three FSM chunks: FSM CHUNK A 3335A, FSM CHUNK B 3335B, and FSM CHUNK C 3335C. FSM CHUNK A 3335A is related to three FM chunks: FM CHUNK A 3340A, FM CHUNK B 3340C, and FM CHUNK B 3340C. FSM CHUNK B 3335B is related to two FM chunks: FM CHUNK B 3340C and FM CHUNK D 3340D. FSM CHUNK C 3335C is related to two FM chunks: FM CHUNK E 3340E and FM CHUNK F 3340F. FM CHUNK A 3340A is related to three file chunks: FILE CHUNK A 3345A, FILE CHUNK B 3345B, and FILE CHUNK C 3345C. FM CHUNK B 3340B is related to two file chunks: FILE CHUNK C 3345C and FILE CHUNK E 3345E. FM CHUNK C 3340C is related to one file chunk, FILE CHUNK D 3345D. FM CHUNK D 3340D is related to two file chunks: FILE CHUNK E 3345E and FILE CHUNK G 3345G. FM CHUNK E 3340E is related to three file chunks: FILE CHUNK G 3345G, FILE CHUNK H 3345H, and FILE CHUNK I 3345I. FM CHUNK F 3340F is related to one file chunk, FILE CHUNK F 3345F.

As shown in half A of FIG. 33, some FM chunks, e.g. FM CHUNK C 3340C, are related to more than one FSM. Further, some file chunks, e.g. FILE CHUNK C, FILE CHUNK E, and FILE CHUNK G, are related to more than one FM chunk. This can be explained in that a CFS, represented by a FSM, may contain the same file, represented by a FM in the FSM, as another CFS. In this case CFSs A and B both contain the file represented by FM C. In the same one, more than one file can contain the same file chunk if those files comprise a common data chunk. In FIG. 33, the files represented by FM CHUNK A 3340A and FM CHUNK B 3340B comprise a common data chunk represented by FILE CHUNK C 3345C. The files represented by FM CHUNK B 3340B and FM CHUNK D 3340D comprise a common data chunk represented by FILE CHUNK E 3345E. The files represented by FM CHUNK D 3340D and FM CHUNK E 3340E comprise a common data chunk represented by FILE CHUNK G 3345G.

While half A shows the chunks stored in the cloud storage system and how those chunks relate to one another, half B shows the data structures those chunks comprise and the relationship of those data structures. In half B, the same client device 3301A with the same user 3302 logged into a CFS client module and the same CFSs mounted at the same locations are shown. The user manifest 3320 comprises a profile associated with the client device 3301A that indicates how the CFS, represented by FSMs, should be handled by the CFS client module on that particular client device 3301A. In this case, indicating that FSM A is mounted at /home/docs, FSM B is mounted at /home/movies, and FSM C is mounted at /home/music.

Half B of FIG. 33 shoes the user manifest 3320 in relation to three FSMs: FSM A 3355A, FSM B 3355B, and FSM C 3355C. FSM A 3355A is related to three FMs: FM A 3360A, FM B 3360B, and FM C 3360C. FSM B 3355B is related to two FMs: FM C 3360C and FM D 3360D. FSM C 3355C is related to two FMs: FM E 3360E and FM F 3360F. Each FM A-F 3360A-F is related to a file A-F 3365A-F.

Figure 34:
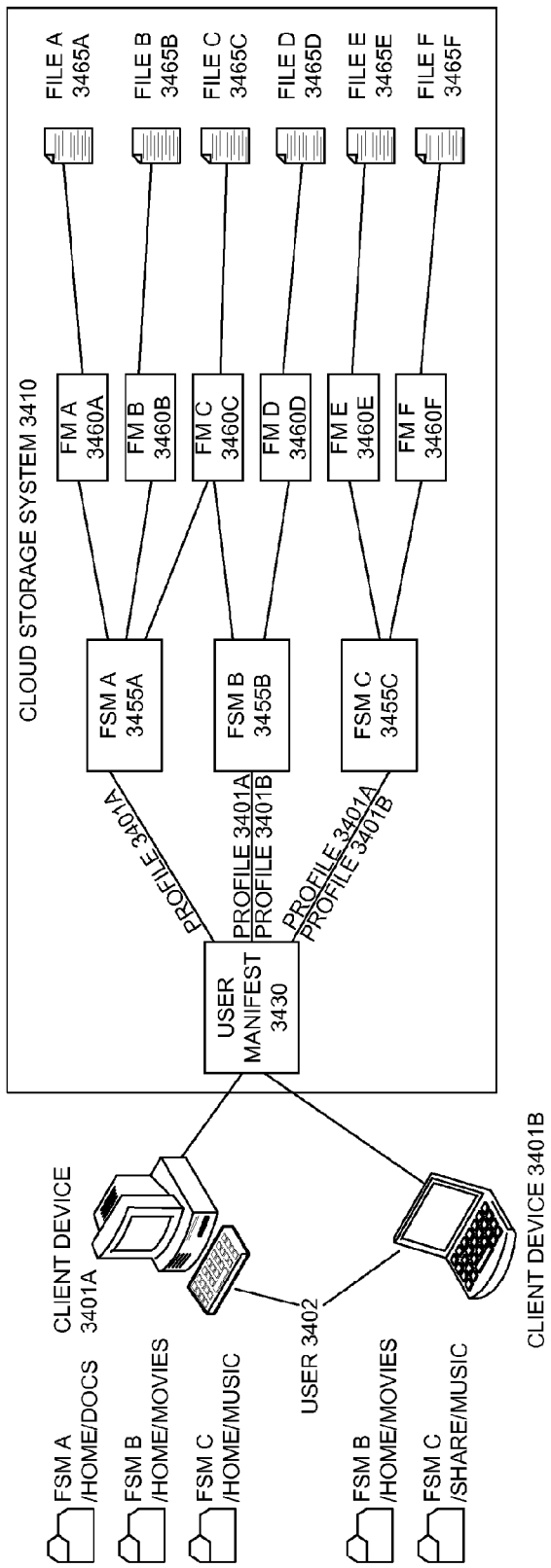
FIG. 34 illustrates a block diagram showing the relationship between data structures of a single user manifest used on two client devices in accordance with embodiments of the invention.

FIG. 34 illustrates a block diagram showing the relationship between data structures of a single user manifest used on two client devices in accordance with embodiments of the invention. As in FIG. 33, FIG. 34 shows the same client device 3401A with the same user 3402 logged into a CFS client module and the same CFSs mounted at the same locations is shown. The user manifest 3430 comprises a profile, PROFILE 3401A, associated with the client device 3401A that indicates how the CFS, represented by FSMs, should be handled by the CFS client module on that particular client device 3401A. In this case, indicating that FSM A is mounted at /home/docs, FSM B is mounted at /home/movies, and FSM C is mounted at /home/music. The same exemplary relationship between user manifest, FSMs, FMs, and Files is shown in FIG. 34 as was illustrated in FIG. 34.

Further FIG. 34 shows a second client device 3401B with the same user 3402 logged in. The user manifest 3430 further comprises profile information, PROFILE 3401B, that indicates how the client device 3401B is configured to utilize the user's 3402 user manifest 3430. In FIG. 34, the client device 3401B is shown as mounting FSM B at a similar mount point of /home/movies as used by client device 3401A. Client device 3401B is shown as mounting FSM C at a different mount point than client device 3401A; specifically, FSM C is mounted at a mount point of /share/music. As shown in FIG. 34, the user 3402 has chosen or configured the user manifest 3430 in such a way that FSM A is not mounted on client device 3401B. As shown with reference to FIG. 29, the user 3402 may utilize a management screen to mount FSM A at a desired mount point at a later time.

Figure 35:
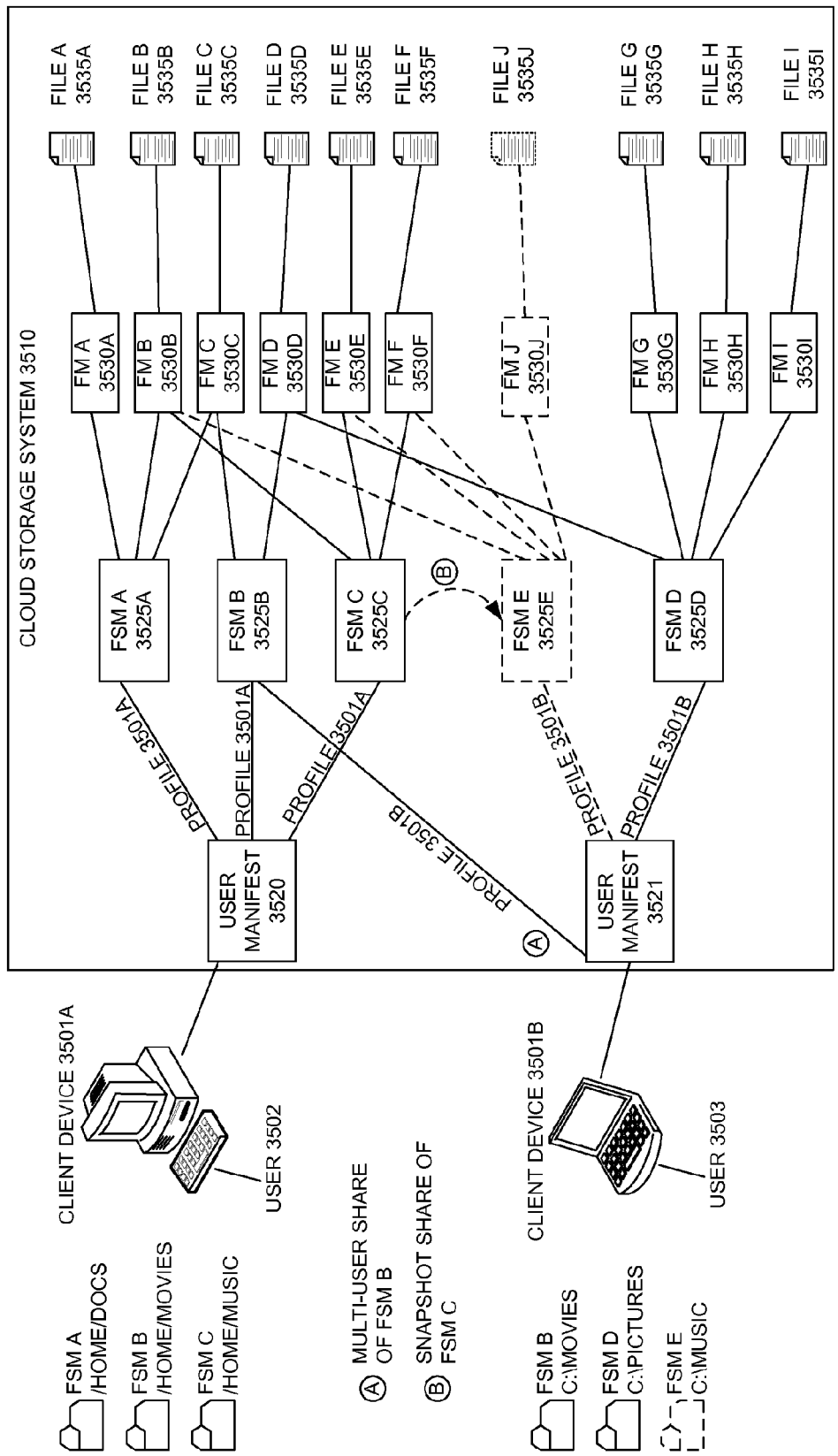
FIG. 35 illustrates a block diagram showing the relationship between data structures of a two user manifests used on two client devices in accordance with embodiments of the invention.

FIG. 35 illustrates a block diagram showing the relationship between data structures of two user manifests used on two client devices in accordance with embodiments of the invention.

As in FIG. 33, FIG. 35 shows the same client device 3501A with the same user 3502 logged into a CFS client module and the same CFSs mounted at the same locations is shown. The user manifest 3530 comprises a profile, PROFILE 3401A, associated with the client device 3501A that indicates how the CFS, represented by FSMs, should be handled by the CFS client module on that particular client device 3501A. In this case, indicating that FSM A is mounted at /home/docs, FSM B is mounted at /home/movies, and FSM C is mounted at /home/music. The same exemplary relationship between user manifest, FSMs, FMs, and Files is shown in FIG. 35 as was illustrated in FIG. 33.

FIG. 35 further illustrates a second client device 3501B on which user 3503 is logged in. User 3503 has a user manifest 3521 that indicates that user has a FSM D 3525D that should be mounted, based on PROFILE 3501B, at a mount point of C:\PICTURES. The FSM D 3525D is related to four FMs: FM D 3530D, FM G 3530G, FM H 3530H, and FM I 35301. The FM D,G-I 3530D,G-I are related to file D,G-I 3535D,G-I respectively. As shown in FIG. 35, user 3502 has a FSM B 3525B also associated with FMD 3530D. As such, it is evident that although two users may have independent FSMs, those FSMs may comprise identical files; e.g. if two users saved the same file from the same source or, as unlikely as it may be, generated the same identical file independently. It should be noted that the FM is based on the contents of a file and not the name or location of a file, thus two users could have the same files with different names and/or locations in their corresponding FSM but resolve to the same FM.

FIG. 35 illustrates, with point A, that FSM B 3525B has been shared by user 3502 with user 3503. User 3502 has elected to share FSM B 3525B as a multi-user, i.e. live, share in a similar manner to as described with reference to FIG. 7. Thus changes made by either user 3502 or 3503 in FSM B 3525B would be reflected in both client devices 3301A and 3301B. The user 3503 has added FSM B 3525B to his user manifest 3521 with PROFILE 3503 indicating that FSM B 3525B should be mounted at C:\MOVIES.

Point B shows user 3502 sharing a snapshot of FSM C 3525C with user 3503. If the FSM C 3525C is a Live FSM comprised of a base FSM and a plurality of changes that comprise the current version of the FSM, then the CFS client module on the client device 3501A generates a current copy of the FSM C 3525C and stores that copy in the cloud storage system. The CFS client module running on client device 3501A generates information comprising identifying information and encryption information for the CFS client module running on client device 3501B to utilize the copy of FSM C 3525C being shared with user 3503.

As such, the user 3503 receives information identifying the snapshot of FSM C 3525C and mounts the CFS at mount point of C:\MUSIC. Since the FSM is a snapshot of FSM C 3525C and not a Live share of the FSM, any changes made by user 3502 or user 3503 are not reflected on the other user's client device; i.e., changes create divergent FSMs. As such, the snapshot of FSM C 3525C is shown as FSM E 3525E with the addition of a FM J 3530J that is associated with FILE J 3535J. As previously mention, because this is a snapshot share the addition of FM J 3530J is not reflected in FSM C 3525C as the two FSMs C and E are divergent upon the change of any data within. It will be evident to one of skill in the art that additions of files, deletions of files, and modifications to files all result in divergent FSMs.

Snapshot sharing allows a user to easily share files with another cloud storage system user. For example, a user of an existing web service for sharing files requires a user to open a web browser session, or other client application. The user must then initiate the file upload process and navigate to the desired folder on the user's client device. The user then selects the desired files and initiates the upload. Once the upload is complete, the user can elect to share the files selected with another user who receives a link to navigate to the uploaded files and can choose to view and/or download those files.

With snapshot sharing, a user opens their operating system's file browser and navigates the folder containing files they wish to share. The user initiates a context menu on the desired folder and initiates a command to share the folder with another user; e.g. the "Share with . . ." command shown in the context menu illustrated in FIG. 24. The user then selects another user of the cloud storage system to share the folder with. If the folder is the mount point of a CFS, then the CFS client module shares the FSM ID and FSM encryption key with the other user. If the folder is not a mount point of a CFS, then the CFS client module can generate a FSM comprising the files and folders contained within the folder selected. In one embodiment, the CFS client module encrypts the FSM ID and FSM encryption key with a key known to, or that can be generated by, the user the folder is being shared with. Thus, the recipient of the shared folder receives a FSM ID and FSM encryption key which is added to that user's user manifest at his direction. The recipient can then choose to mount the shared FSM on their client device and access the shared files and folders through the normal means of accessing files and folders within their operating system.

Figure 36:
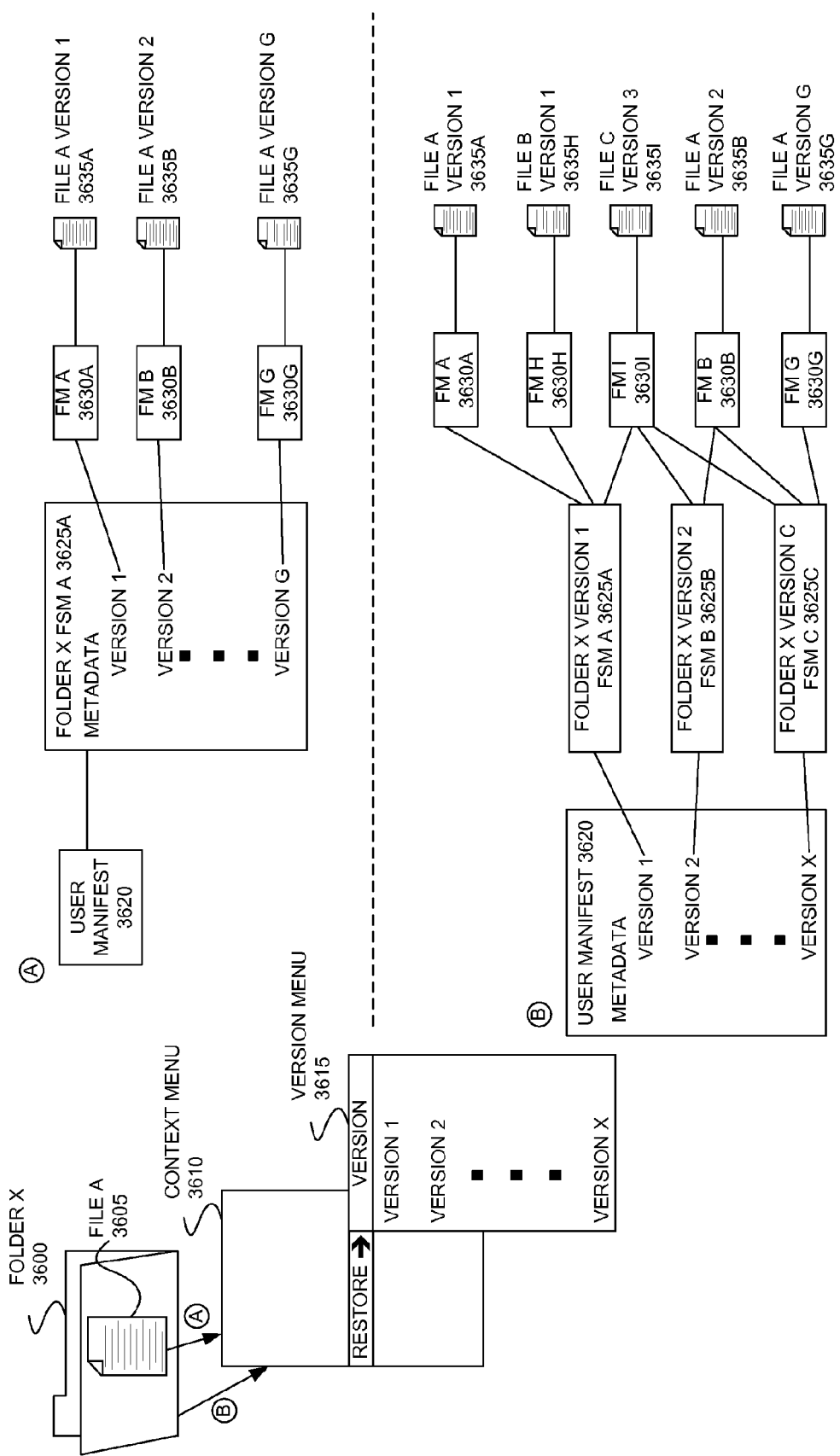
FIG. 36 illustrates an interface provided by a CFS client module for providing a user with restoration options of files, folder, and file system in accordance with embodiments of the invention.

FIG. 36 illustrates an interface provided by a CFS client module for providing a user with restoration options of files, folder, and file system in accordance with embodiments of the invention. FIG. 36 contains a folder X 3600 that comprises file A 3605 that resides in a client device with a user logged into a CFS client module. The CFS client module is configured to maintain backups of versions of folder X 3600 and versions of file A 3605 as the user of the client device saves changes to folder X and file A. The user initiates a context menu 3610 on the selection folder or file and chooses a restoration command. This restoration command may bring up a separate restoration command screen or present a version menu 3615. FIG. 36 is split in half with the top portion A showing the a set of versioned files according to embodiments of the invention and the bottom portion B showing a set of versioned folders according to embodiments of the invention.

In half A, FIG. 36 shows a user manifest 3620 associated with FOLDER X FSM A 3625A. The FSM A 3625A comprises an entry associated with file A and metadata linking file A with the save versions of that file. In FIG. 36, Versions 1-G are associated with FM A-FM G 3630A-G. Each FM A-G 3630A-G is associated with the version of the file as stored in the cloud storage system, i.e. File A Version 1-G 3635A-G.

In half B, FIG. 36 shows user manifest 3620 associated with FOLDER X 3600. FOLDER X is a CFS represented by a FSM that is linked in the user manifest 3620. User manifest 3620 comprises a link to FOLDER X 3600 and metadata associated with FOLDER X 3600 comprising a plurality of FSMs representing saved versions of FOLDER X. This is shown as FOLDER X VERSION 1-C FSM A-B 3625A-C. Each FSM 3625A-C is linked to the FMs that existed in FOLDER X 3600 at the time that the version of the FOLDER X was saved. FOLDER X VERSION 1 FSM A 3625A is linked to three files: FM A 3630A, FM H 3630H, and FM I 3630I; each associated with a corresponding File: FILE A VERSION 1 3635A, FILE B VERSION 1 3635H, and FILE C VERSION 3 3635I. FOLDER X VERSION 2 FSM B 3625B is linked to two files: FM I 3630I and FM B 3630B; each associated with a corresponding File: FILE C VERSION 3 3635I and FILE A VERSION 2 3635B. FOLDER X VERSION C FSM C 3625C is linked to three files: FM I 3630I, FM B 3630B, FM G 3630G; each associated with a corresponding File: FILE C VERSION 3 3635I, FILE A VERSION 2 3635B, FILE A VERSION G 3635G.

Thus, multiple versions of the same folder and file can be listed in a FSM and be associating a version with each saved file and folder; furthermore the CFS client module can associate an identifier for the client device from which the file or folder was saved for further restoration.

Figure 37:
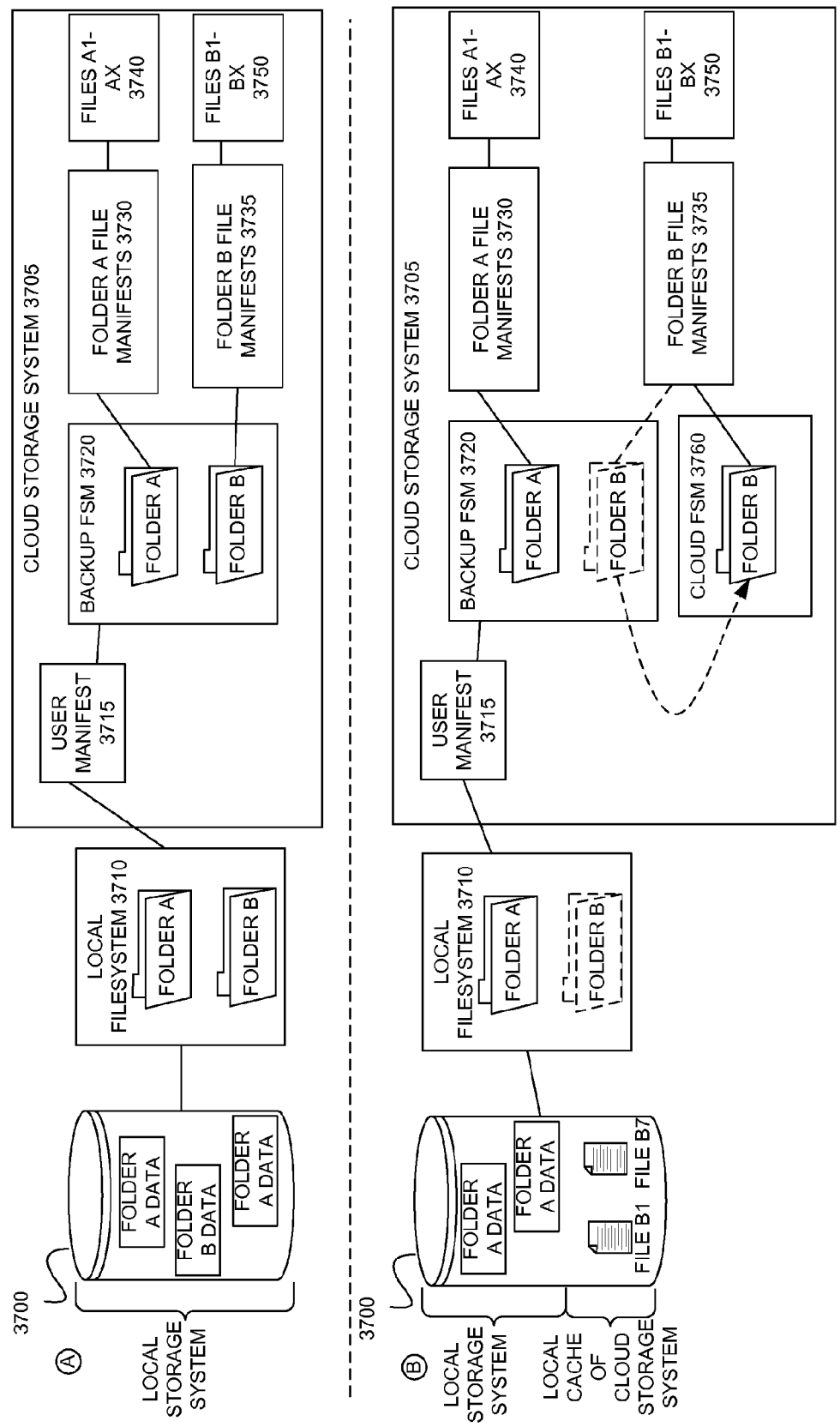
FIG. 37 illustrates a block diagram showing the transition of data stored in a local storage system to data stored in a cloud storage system.

FIG. 37 illustrates a block diagram showing the transition of data stored in a local storage system to data stored in a cloud storage system. This figure is split in two halves, the top half A showing two folders both stored in a local storage system and the bottom half B showing one folder stored in a local storage system and one folder stored in a cloud storage system.

In both halves, FIG. 37 shows a local drive 3700 that provides a local storage system on a client device and there exists a local file system 3710 that presents a user of a client device with folders and files that user can access. In both halves, the user has access to files in folder A and files in folder B.

In top half A, data from Folders A and B is stored in the local storage system on local drive 3700. A CFS client module on the client device is maintaining a user manifest 3715 including a backup FSM 3720. The CFS client module creates automatic backups of all files in the local storage system and therefore has added the files and folders of Folders A and B to the cloud storage system 3705. Thus the user manifest 3715 is associated with a backup FSM 3720 that is associated with a plurality of FMs, Folder A File Manifests 3730 and Folder B File Manifests 3735; each File Manifest is associated with a corresponding file FILES A1-AX 3740 and B1-BX 3750.

In the bottom half B, a CFS client module has transitioned Folder B from storage in the local storage system with an automatic backup to storage in the cloud storage system 3705 without local storage; the transition of Folder B may be automatic in response to a local drive 3700 running out of drive space or may be initiated by a user. The local drive 3700 has a section that comprises the local storage system and a section which comprises local cache of the cloud storage system. Since Folder A is still in the local storage system, all of Folder A's data resides on the local drive 3700. However, since Folder B is now stored in cloud storage system, only a portion of cached data comprising File B1 and File B7 reside in the local cache of the cloud storage system. The local copy of Folder B data has been removed and the CFS client module has mounted a cloud FSM 3760 comprises the folder B entries in its place. The cloud FSM 3760 comprises all the folder B file manifests 3735; which already resided in the cloud storage system. This transition is extremely quick and transparent to the user of the client device since the information comprising Folder B already resided in the cloud storage system 3705 as part of the automatic backups.

Figure 38:
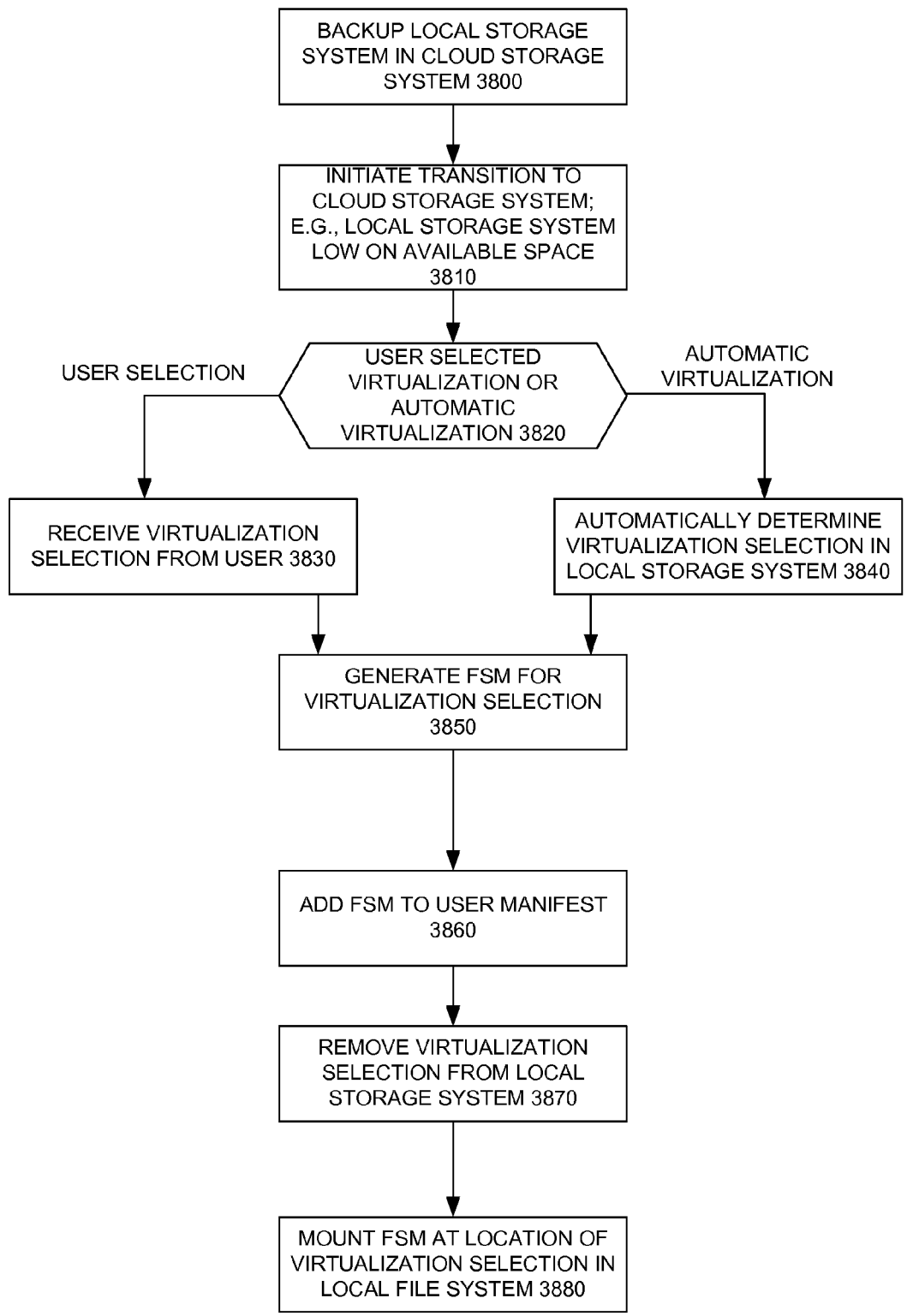
FIG. 38 illustrates a block diagram of a method of transition from storage in a local storage system to storage in a cloud storage system according to embodiments of the invention.

FIG. 38 illustrates a block diagram of a method of transition from storage in a local storage system to storage in a cloud storage system according to embodiments of the invention. In block 3800, a CFS client module backs up the local storage system in a cloud storage system. In block 3810, the CFS client module initiates transition of a folder to storage in the cloud storage system. For example, the CFS client module may recognize that the client device is running low on disk space or that certain files or some infrequently accessed that there is no reason to store them on the client device. In block 3820, the CFS client module determines to either allow the user to select a virtualization selection, i.e. a folder or drive to transition to the cloud storage system, or generates the virtualization selected itself. In block 3840, the CFS client module receives a virtualization selection from a browser user interface element provided to the user. In block 3840, the CFS client module automatically determines a virtualization selection for the folders and drives in the local storage system. In block 3850, the CFS client module generates a FSM for the virtualization selection and adds the FSM to the user's user manifest in block 3860. In block 3870, the CFS client module removes the virtualization selection from the local storage system and in block 3880 mounts the FSM at the location at the virtualization selection was located in the virtual file system.

Figure 39:
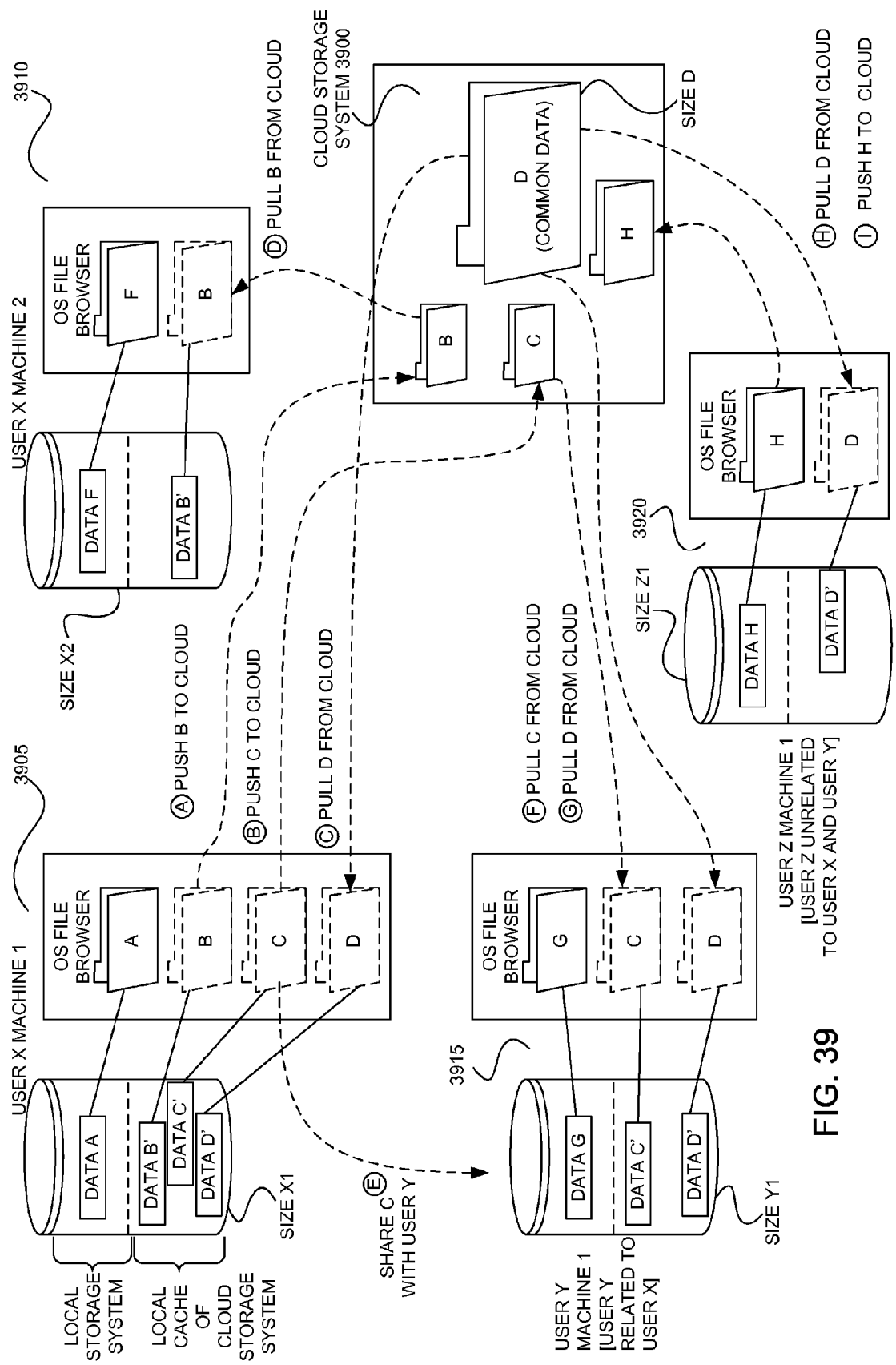
FIG. 39 illustrates a block diagram showing a plurality of users and machines accessing data from a cloud storage system according to embodiments of the invention.

FIG. 39 illustrates a block diagram showing a plurality of users and machines accessing data from a cloud storage system according to embodiments of the invention. FIG. 39 shows a cloud storage system 3900 comprising a plurality of cloud file systems. FIG. 39 shows a four client devices 3905, 3910, 3915, and 3920. Each client device comprises a local drive and an OS File Browser; each local drive comprises a portion for a local storage system and a portion for a local cache of the cloud storage system.

Client device 3905 is the first machine associated with user X, the OS File Browser shows four folders in the OS File Browser A-D. Folder A is not stored in the cloud storage system and all of that folder's data is shown in the local storage system. Folders B-D are stored in the cloud storage system 3900 and a portion of each, B', C', and D', is shown in the local cache of the cloud storage system. The Folder B and the Folder C originated at client device 3905 and were pushed in the cloud storage system from that device. The Folder D is common data provided by the service provider of the cloud storage system 3900 to all of that provider's users. Thus, Folder D was pulled from cloud storage system 3900, furthermore all of the data contained within Folder D amounts to SIZE D.

Client device 3910 is the second machine associated with user X, the OS File Browser shows two folders in the OS File Browser: Folder F and Folder B. Folder F is not stored in the cloud storage system and all of that folder's data is shown in the local storage system. Folder B originated at client device 3905 and thus is pulled from the cloud storage system 3900 and a portion of that data is located in the local cache of the cloud storage system. Client device 3910 may further add information to Folder B and thus would have to push that data to the cloud storage system 3900 which would push the changed FSM to the client device 3905. The local drive is capable of storing an amount SIZE X2 of data.

Client device 3915 is the only machine associated with user Y. User Y is somehow related to user X. The OS File Browser shows three folders in the OS File Browser: Folder G, Folder D, and Folder C. At point D in FIG. 39, user X has shared Folder C with user Y. Therefore Folder C has been pushed to client device 3915 from the cloud storage system 3900; of which only a portion C' resides in the local cache of the cloud storage system on the client device 3915. Folder G is comprised only in the local storage system of client device 3915 while Folder D is pushed from the cloud storage system 3900 as the common data available to all users. The local drive is capable of storing an amount SIZE Y1 of data.

Client device 3920 is the only machine associated with user Z. User Z is unrelated to user X and user Y. The OS File Browser shows two folders in the OS File Browser: Folder H, and Folder D. Folder H is stored in the local storage system of client device 3920 with a backup in the cloud storage system 3900. Folder D is pushed from the cloud storage system 3900 as the common data available to all users. Thus, client device 3920 pushes data for Folder H to the cloud storage system and pulls data for Folder D from the cloud. The local drive is capable of storing an amount SIZE Z1 of data.

The local drive of client device is capable of storing an amount specified data SIZE X1, SIZE X2, SIZE Y1, and SIZE Z1 of data. Since only a portion of data is needed at any given time from Folder D, Folder C, and Folder B, the client devices need not be capable of storing all of the data comprised within the cloud storage system. As such, SIZE D can be larger that SIZE X1 even though the user X can access all the data in Folder D without manually removing files to make room for additional data. In fact, SIZE D can be 100 hundred times larger than SIZE X1, 1000 time larger than SIZE X1, or even 1,000,000 times larger than SIZE X1. SIZE D can be greater than what the operating system on client device 3905 supports.

Figure 40:
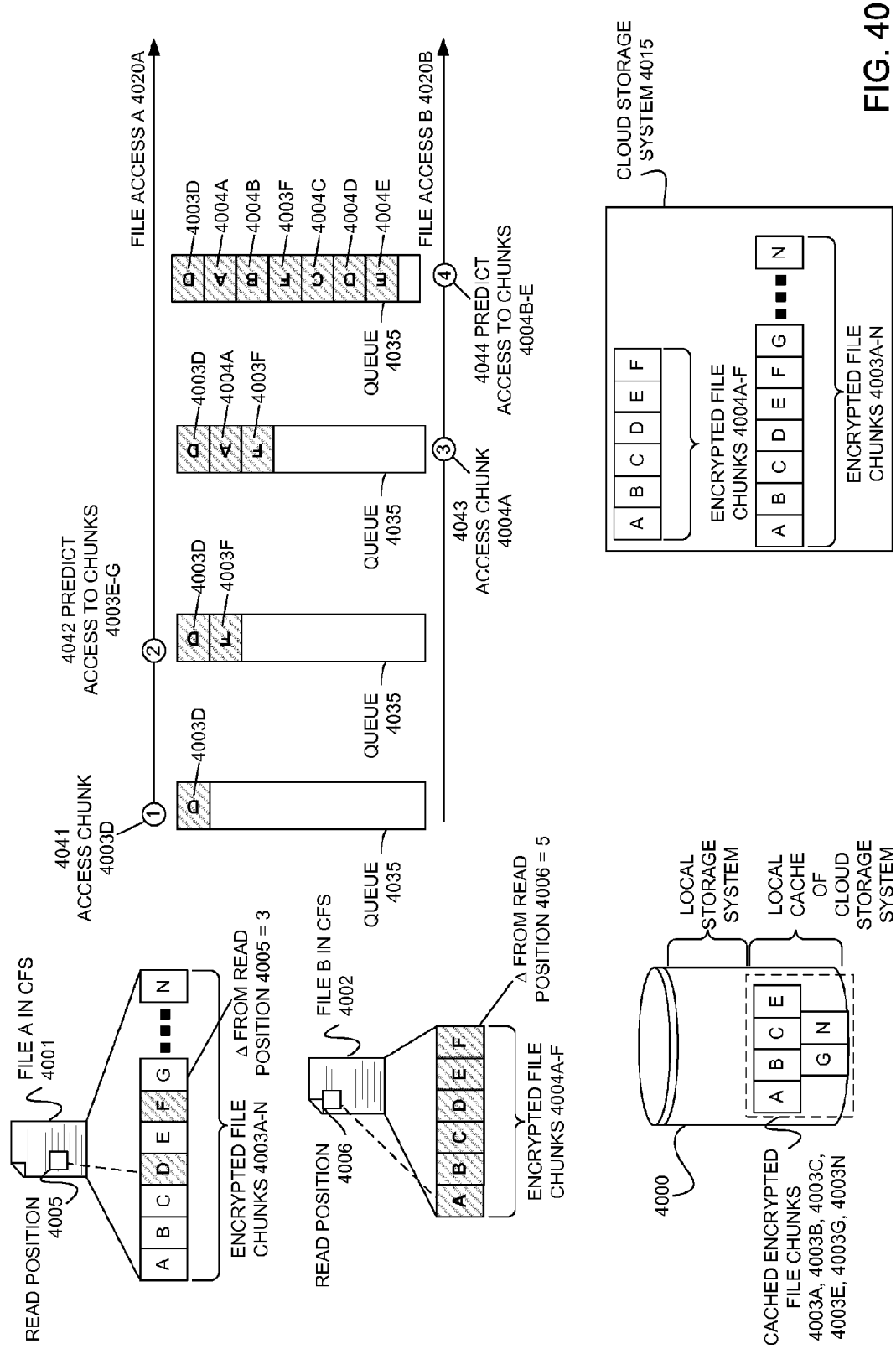
FIG. 40 illustrates a block diagram showing priority queuing of file chunks to be retrieved according to embodiments of the invention.

FIG. 40 illustrates a block diagram showing priority queuing of file chunks to be retrieved according to embodiments of the invention. In FIG. 40, a client device coupled with a cloud storage system 4015. The client device is accessing two files stored in a CFS, File A 4001 and File B 4002. File A 4001 is comprised of a set of encrypted file chunks 4003A-4003N. While File B 4002 is comprised of a set of encrypted file chunks 4004A-4004F. In FIG. 40, the client device has a local drive 4000 that comprises a portion for a local storage system and a portion for a local cache of a cloud storage system. The local cache of the cloud storage system has cached encrypted file chunks from 4001, specifically chunks 4003A, 4003B, 4003C, 4003E, 4003G, and 4003N.

File A's 4001 set of encrypted file chunks 4003A-4003N is illustrated in a condensed form showing chunks 4003A-4003G and 4003N, however, chunks 4003D and 4003F are shaded to indicate those chunks are not present in the local cache of the cloud storage system. File B's 4002 set of encrypted file chunks 4004A-400F are each illustrated as shaded block to indicate all of those chunks are not present in the local cache of the cloud storage system. The cloud storage system is illustrated as comprising File A 4001 and File B's 4002 set of encrypted file chunks 4003A-4003N and 4004A-4004F.

FIG. 40 illustrates two file access timelines, File Access A 4020A and File Access B 4020B. In between the two timelines, an encrypted file chunk retrieval queue 4035 is shown with the queues contents corresponding to time points on the time lines. Point 1 4041 is illustrated on File Access A 4020A as an access of encrypted chunk 4003D. Because the local cache of the cloud storage system does not contain encrypted chunk 4003D, a CFS client module executing on the client device will queue retrieval of encrypted chunk 4003D in the encrypted file chunk retrieval queue 4035. As part of the queuing, the CFS client module will determine a priority level for the encryption chunk 4003D as described above with reference to FIG. 8. For example, as illustrated in FIG. 40, a distance Δ between an encrypted chunk being queued and an encrypted chunk being accessed can be determined and that distance can be used to determine a priority level. In this case, the chunk being accessed 4003D is the same as the chunk being queued 4003D and therefore the Δ is zero and encrypted chunk 4003D is given a high priority.

Point 2 4042 is illustrated on File Access A 4020A as a prediction that access of chunks 4003E-4003G will occur at some time in the future and as such the CFS client module determines to cache those encrypted chunks. Since encrypted chunks 4003E and 4003G are already in the local cache of the cloud storage system, the CFS client module need only place a retrieval for encrypted file chunk 4003F in the encrypted file chunk retrieval queue 4035. The priority level of chunk 4003F is based on its Δ of two away from the chunk being accessed 4003D.

Point 3 4043 is illustrated on File Access B 4020B as an access of encrypted chunk 4004A. Because the local cache of the cloud storage system does not contain encrypted chunk 4004A, a CFS client module executing on the client device will queue retrieval of encrypted chunk 4004A in the encrypted file chunk retrieval queue 4035. The retrieval of encrypted chunk 4004A is given a higher priority level than the priority level of chunk 4003F since the Δ of 4004A is zero while the Δ of 4003F is two.

Point 4 4044 is illustrated on File Access B 4020B as a prediction that access of chunks 4004B-4004E will occur at some time in the future and as such the CFS client module determines to cache those encrypted chunks. Since none of the encrypted file chunks 4004B-4004E are in the local cache of the cloud storage system, the CFS client module places a retrieval of each encrypted chunk 4004B-4004E in the encrypted file chunk retrieval queue 4035 according to those chunks' priority levels in comparison to the rest of the chunks' priority levels. Thus, the encrypted file chunk retrieval queue 4035 has the following chunks listed in order of retrieval priority: 4003D (Δ=0), 4004A (Δ=0), 4004B (Δ=1), 4003F (Δ=2), 4004C (Δ=2), 4004D (Δ=3), and 4004E (Δ=4).

Prioritizing the retrieval of encrypted file chunks while at the same time as predictively retrieving encrypted file chunks has the advantage of allowing the CFS client module to get data that is likely to be accessed soon while at the same time ensuring that data that is needed sooner will be available prior to data needed later. As described above with reference to FIG. 8, other priority systems may be implemented such as basing priority on a tracking of next file chunk access based on prior file chunk access.

Figure 41:
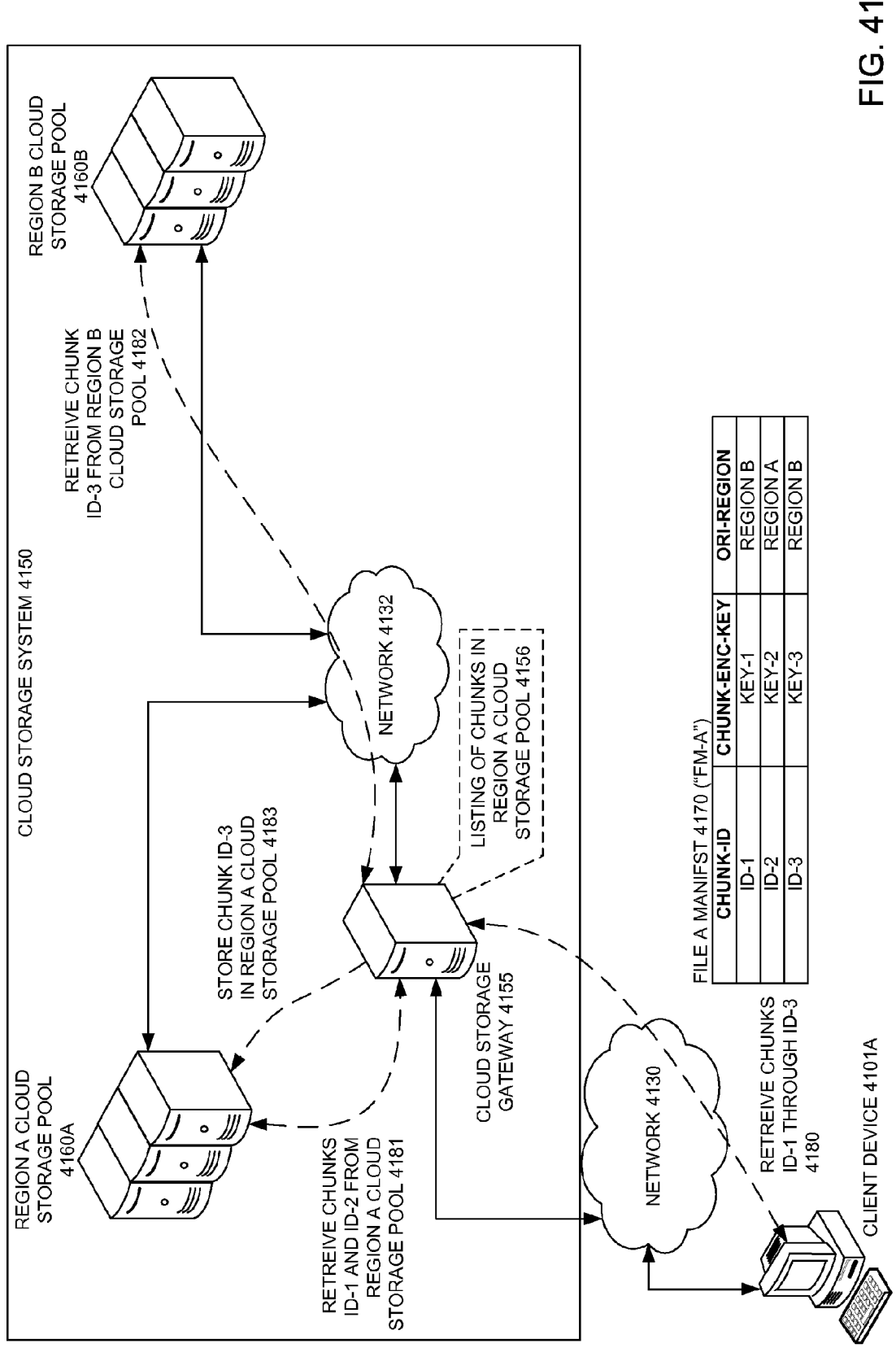
FIG. 41 illustrates a geographically distributed cloud storage pools according to embodiments of the invention.

FIG. 41 illustrates a geographically distributed cloud storage pools according to embodiments of the invention. FIG. 41 illustrates a client device 4101A coupled with a cloud storage system 4150 through a network 4130. The cloud storage system 4150 comprises a cloud storage gateway 4155 coupled with two cloud storage pools 4160A and 4160B through a network 4132, network 410 and network 4132 way both be a public network such as the internet or some collection of private networks. Each cloud storage pool 4160A and 4160B is designed to primarily serve a specific geographic region, in this case region A is served by cloud storage pool 4160A while region B is served by cloud storage pool 4160B. In FIG. 41, client device 4101A can be thought of as located in region A with cloud storage gateway 4155 being an access point for region A client devices to access the cloud storage system 4150. Thus, as client devices save data into the cloud storage system 4150, the cloud storage gateway 4155 will save that data to region A cloud storage pool 4160A.

In FIG. 41, client device 4101A is accessing a set of encrypted file chunks corresponding to a File A. File A is comprised of three file chunks listed in a File A manifest (FM-A) 4170. FM-A 4170 maintain a listing of chunk identifiers (CHUNK-ID column), chunk encryption keys (CHUNK-ENC-KEY column), and originating region (ORI-REGION) for each encrypted file chunk that is part of File A. The CHUNK-ID and CHUNK-ENC-KEY fields maintain data as described in previous figures. The ORI-REGION field maintain an identifier of the region in which the corresponding file chunk was stored in the cloud storage system, thus as client device 4101A adds data to the cloud storage system 4150 that does not already exists in the cloud storage system 4150 the ORI-REGION for that data will be region A while data from another client device located in region B will be marked with an ORI-REGION of region B.

In this case, client device 4101A is retrieving chunks ID-1 through ID-3 at step 4180. This is essential a request from cloud storage gateway 4155 to return those chunks ID-1 through ID-3, this request includes the ORI-REGION of each chunk. Cloud storage gateway 4155 has a listing of chunk in the region A cloud storage pool 4156. Thus, the cloud storage gateway 4155 can determine that chunks ID-1 and ID-2 are in the region A cloud storage pool 4160A, while chunk ID-3 is not. The cloud storage gateway 4155 can then retrieve chunks ID-1 and ID2 from region A cloud storage pool 4160A in step 4181. Using the ORI-REGION included in the request for chunk ID-3, the cloud storage gateway 4155 can then retrieve chunk ID-3 from region B cloud storage pool 4160B in step 4182. Chunk ID-3 can then be stored in region A cloud storage pool 4160A in step 4183. Chunks ID-1 through ID-3 can be returned to the client device 4101A although not all chunks were original present in the regional cloud storage pool for that client device. This presents the advantage of storing data for client devices in different regions in separate storage pools so that data that is likely to be accessed, data added by a client device in that region, is located near to the cloud storage gateway for a region. At the same time, a cloud storage gateway is enabled to retrieve chunks from other regions should those chunks be requested by a client device in that cloud storage gateways regions. As such, the cloud storage pools for various regions need not constantly synchronize the data between one another.

Figure 42:
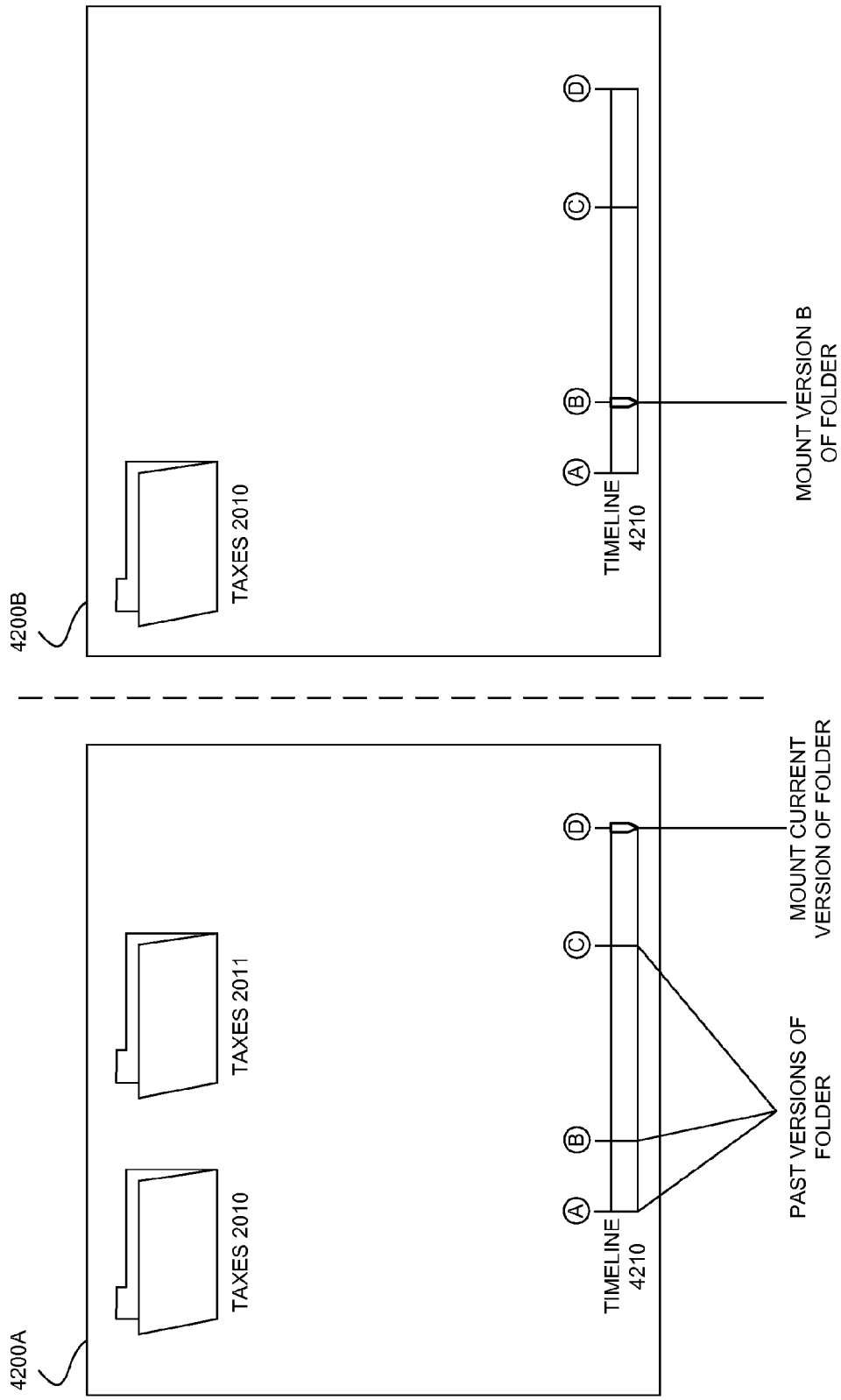
FIG. 42 illustrates a user interface provided by a cloud file system client module for accessing snapshots of a virtual folder in accordance with embodiments of the invention.

FIG. 42 illustrates a user interface provided by a cloud file system client module for accessing snapshots of a virtual folder in accordance with embodiments of the invention. FIG. 42 shows two displays of the same user interface window 4200A and 4200B for displaying the contents of a virtual folder. In 4200A, the user interface window is showing the most current snapshot (D) of the virtual folder including exemplary contents of the virtual folder, namely two sub-folders named Taxes 2010 and Taxes 2011. Along the bottom of user interface 4200A, is a timeline 4210 that presents four snapshots (A-D) of the virtual folder that the user may select to be mounted and accessed. For example, the CFS client module may periodically create a snapshot of a virtual folder as described above. In another embodiment, the virtual folder may be shared amongst a plurality of users and changes by one user creates a snapshot accessible by all other users. The second display of the user interface, 4200B, shows when user has selected snapshot B of the virtual folder. In this case, the CFS client module mounts the FSM of the virtual folder corresponding with snapshot B and informs the operating system that a modification to virtual folder has occurred such that contents of the virtual folder are updated to the user. In this case, snapshot B of the virtual folder did not contain the sub-folder Taxes 2011 so only the sub-folder Taxes 2010 is shown with regard to snapshot B. This feature allows a user to easily navigate between snapshots of a virtual folder to access past versions of files and folders.

Figure 43:
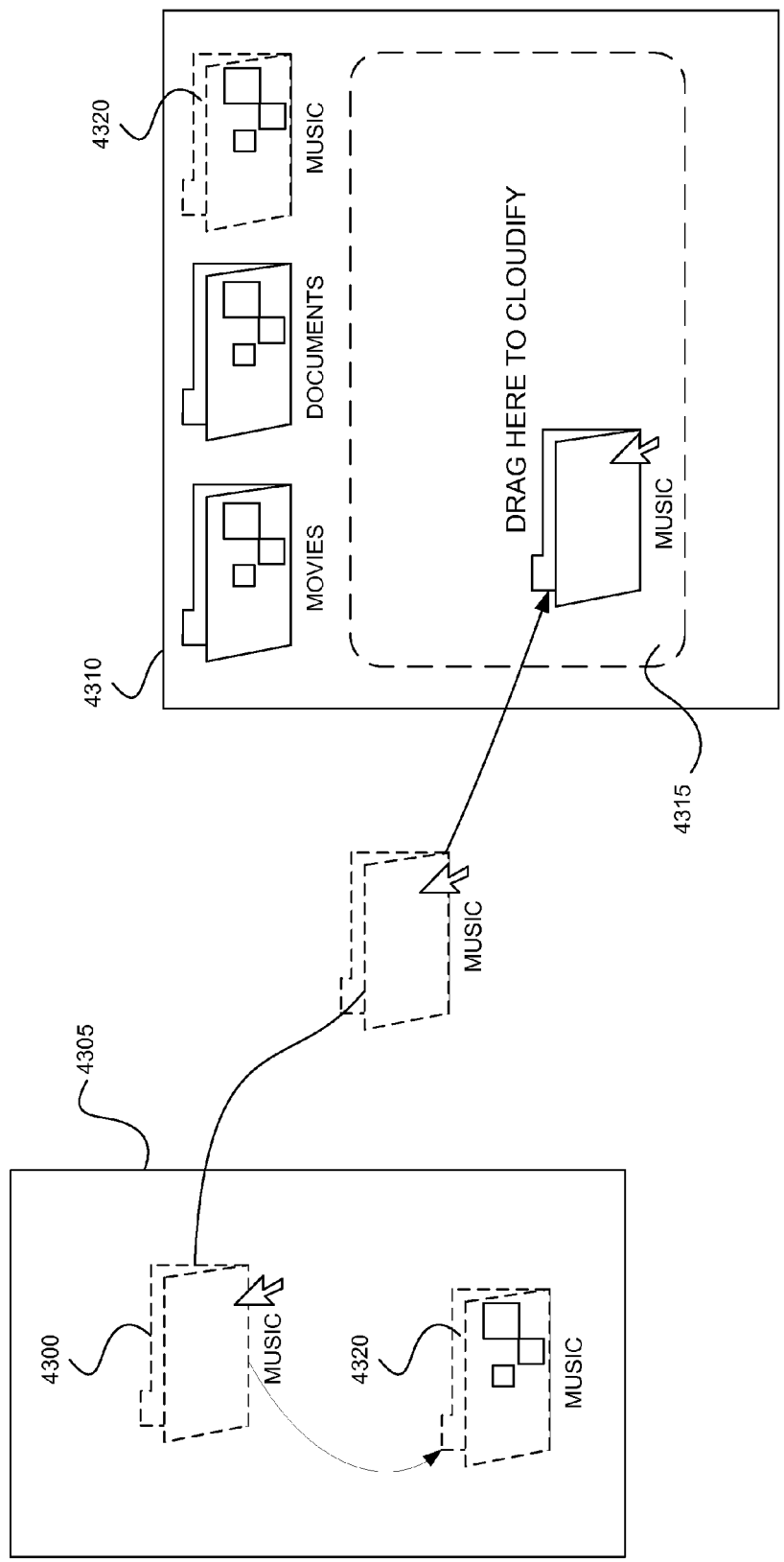
FIG. 43 illustrates a user interface provided by a cloud file system client module for converting a folder in a local file system to a folder in a cloud file system in accordance with embodiments of the invention.

FIG. 43 illustrates a user interface provided by a cloud file system client module for converting a folder in a local file system to a folder in a cloud file system in accordance with embodiments of the invention. User interface window 4305 is a file browser window, i.e. Finder Window, displaying the contents of a folder, including the sub-folder "Music" 4300. User interface window 4310 is a CFS client module interface window showing a listing of virtual folders and, "Movies" and "Documents," along with instructions 4315 to drag a folder located in the local storage system to the 4310 interface window to cloudify that folder. FIG. 43 illustrates a user dragging sub-folder 4300 from user interface window 4305 to CFS client module interface window 4310. Upon releasing the sub-folder 4300 on the user interface window 4305, the CFS client module cloudifies sub-folder 4300 creating a "Music" virtual folder 4320 mounted in the same location from which the sub-folder 4300 was located. Thus, the "Music" virtual folder 4320 is shown in the user interface window 4305 and CFS client module interface window 4310 indicating its presence in those interface windows after sub-folder 4300 is cloudified.

Figure 44:
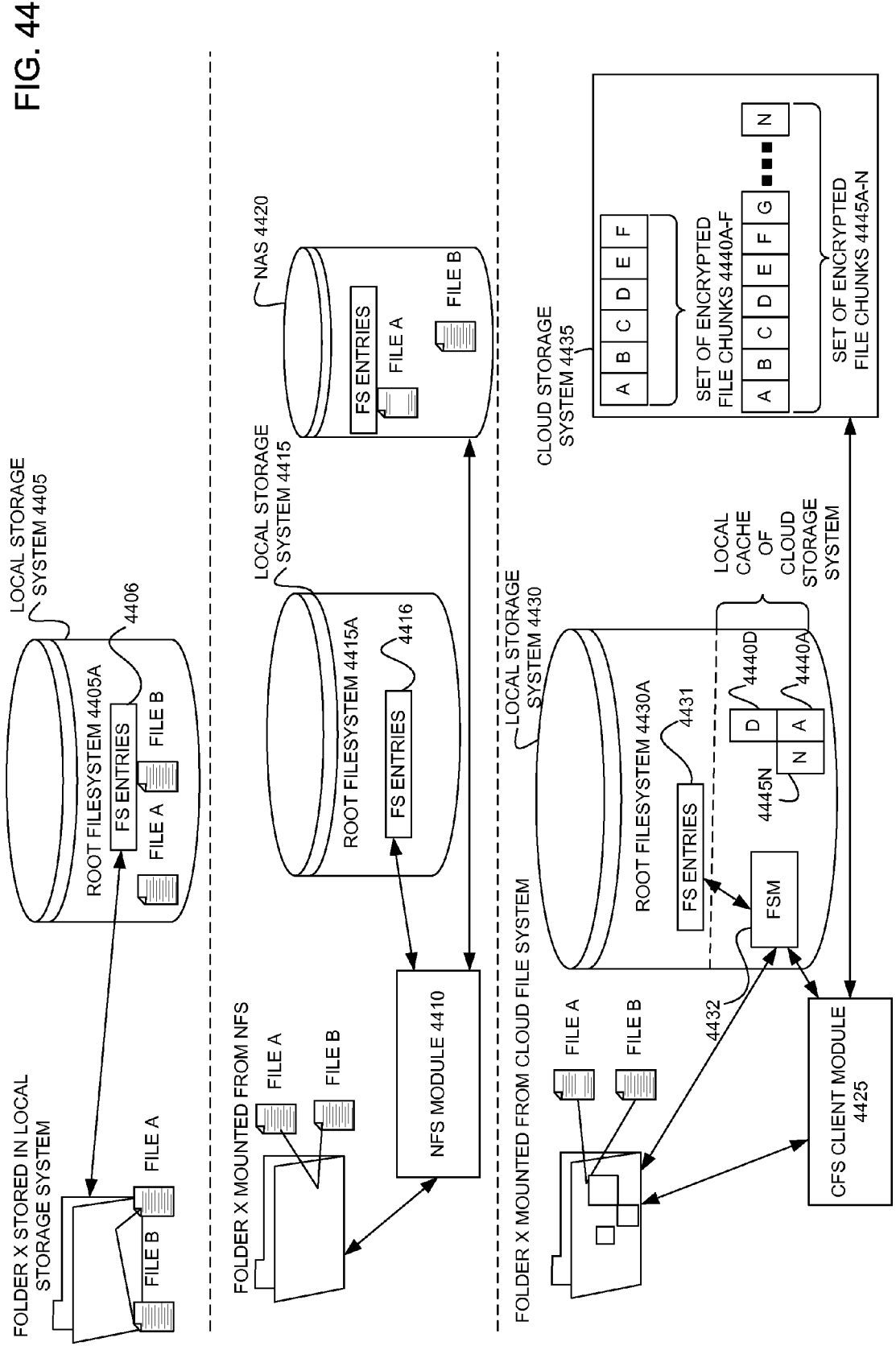
FIG. 44 illustrates aspects previously described of cloud file system mounted in comparison with other mounted file systems in accordance with embodiments of the invention.

FIG. 44 illustrates aspects previously described of cloud file system mounted in comparison with other mounted file systems in accordance with embodiments of the invention. FIG. 44 is shown as split into three sections in each section a folder, Folder X, is present to a user in a file browser and Folder X contains two files File A and File B. In the top section, Folder X is stored in a local storage system on a client device. In the middle section, Folder X is stored in a network file system mounted on a client device. In the bottom section Folder X is stored in a cloud file system.

The top section shows a local storage system 4405 that includes a root file system 4405A that comprises a file system hierarchy for accessing files and folders on a client device. The file system hierarchy is comprised in a set of file system entries 4406 describing paths to various file and folders including entries for Folder X, File A, and File B. Furthermore, the root file system 4405A comprises the data for File A and File B.

As with the top section, the middle section shows a local storage system 4415 that includes a root file system 4415A that comprises a file system hierarchy for accessing files and folders on a client device. Amongst the file system entries 4416 is an entry indicating that Folder X is a mounted network file system. In order to access Folder X, a NFS module 4410 communicates network attached storage 4420 that includes file system entries indicating the contents of the NFS including File A and File. The NFS module 4410 is shown as coupled with the FS entries 4416 to indicate when Folder X is accessed, the NFS module 4410 handles that access. Thus, as the client device browses Folder X, the NFS module 4410 communicates with NAS 4420 to determine the contents of Folder X. Further, NAS 4420 contains the data that comprises File A and File, thus as a user access File A or File B in the middle section, the NFS client module 4410 retrieves the appropriate data from NAS 4420.

As with the top section, the bottom section shows a local storage system 4430 that includes a root file system 4430A that comprises a file system hierarchy for accessing files and folders on a client device. Amongst the file system entries 4431 is an entry indicating that Folder X is a mounted cloud file system. In order to access Folder X, a CFS client module 4425 accesses data located in a portion of the local storage system 4430 for local cache of a cloud storage system 4435 and communicates with the cloud storage system 4435 to access needed data that is not in the local cache of the cloud storage system 4435. In FIG. 44, the local cache of the cloud storage system 4435 comprises a file system manifest 4432 containing entries corresponding with Folder X. The CFS client module is shown as coupled with the FSM 4432 as the CFS client module 4425 is responsible to providing access to Folder X by reading information from the FSM 4432 when a user browses Folder X. The information in FSM 4432 identifies files and folders in Folder X along with information used to access those files, such a file manifest corresponding with each file.

Further, the local cache of the cloud storage system 4435 comprises a plurality of cached encrypted file chunks 4440D, 4440A, and 4445N. For example, assuming that File A comprises a set of encrypted file chunks 4440A-4440F and File B comprises a set of encrypted file chunks 4445A-4445N then the local cache of the cloud storage system comprises portions of both File A and File B. The cloud storage system 4435 is shown as comprising all of File A's encrypted chunks and all of File B's encrypted chunks. Thus, the CFS client module can utilize the local cache of the cloud storage system to access portions of File A and File B, if the CFS client module needs to access portions of data not located the local cache of the cloud storage system, the CFS client module can retrieve that information from the cloud storage system 4435. Thus, the CFS client module has allocated space in the local storage system for storing data from the cloud file system.

Furthermore, the CFS client module can receive a designation to convert a folder, analogous to Folder X in the top section, that is stored in the local storage system to storage in the cloud storage system. This can be accomplished using the client devices existing file browser and a corresponding context menu or with a second user interface provided to the user. The CFS client module can receive a designation of a folder, such as a path of a folder stored in the local storage system and cloudify that folder as described above including transmitting, to the cloud storage system 4435, those encrypted files chunks that are not already present in the cloud storage system 4435. The CFS client module is able to maintain a representation of the converted folder to the user at the same logical path, same location, as the folder that was cloudified such that the user's data is located at the same logical place as far as the operating system of the client device is concerned. The CFS client module is then responsible for providing access to the data in the cloudified folder whenever the operating system requests data from a file or folder.

Furthermore, optimizations at the CFS client module 4425 and in the cloud storage system 4435 allow the CFS client module 4425 to reduce latency associated with accessing files in a cloud file system. For example, caching encrypted file chunks in the local cache of the cloud storage system means that on subsequent accesses of those file chunks, the CFS client module 4425 need not communicate with the cloud storage system 4435. These gains are furthered by enabling the CFS client module 4425 to predictively retrieve encrypted file chunks from the cloud storage system 4435 as described above. The cloud storage system 4435 can be further optimized to respond to prefetch commands to ensure that specified encrypted file chunks are available for subsequent retrieval.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a cloud storage client in a client device for saving a plurality of files to a cloud file system, wherein the cloud file system resides, at least partially, in a cloud storage system, the method comprising the steps of:
   for each of the plurality of files, performing the following:
      splitting that file into a plurality of chunks,
      for each of the plurality of chunks, performing the following:
         generating an encryption key based on data with that chunk,
         encrypting that chunk using the generated encryption key,
         generating a chunk identifier based on data within the encrypted chunk,
         including the encryption key and the chunk identifier in a file manifest,
         determining whether the cloud storage system includes the encrypted chunk, and
         transmitting the encrypted chunk and chunk identifier to the cloud storage system only if it is determined that the cloud storage system does not contain the encrypted chunk,
      wherein the file manifest includes a list of the encryption keys and corresponding chunk identifiers for the plurality of chunks,
      generating a file manifest encryption key based on the data within the file manifest,
      encrypting the file manifest using the file manifest encryption key,
      generating a file manifest identifier based on data within the encrypted file manifest,
      including the file manifest encryption key and the file manifest identifier in a file system manifest,
      determining whether the cloud storage system includes the encrypted file manifest, and
      transmitting the encrypted file manifest and the file manifest identifier to the cloud storage system only if it is determined that the cloud storage system does not include the encrypted file manifest;
   wherein the file system manifest includes a listing of the file manifests for each of the plurality of files and a path of the plurality of files;
   encrypting the file system manifest; and
   transmitting the encrypted file system manifest to the cloud storage system.

2. The method of claim 1, wherein the encryption key generated for each chunk is based on a result of hashing that chunk.

3. The method of claim 1, wherein the generated chunk identifier for each chunk is based on a result of hashing the encrypted chunk.

4. The method of claim 1, wherein the file system manifest is encrypted using an encryption key unique to the client device or a user of the client device.

5. The method of claim 1, further comprising:
   removing the plurality of files from a local storage system of the client device after saving those files to the cloud file system.

6. The method of claim 1, wherein determining whether the cloud storage system includes the encrypted chunk comprises:
   transmitting a query to the cloud storage system that requests information indicating whether the chunk identifier corresponding to the encrypted chunk is present in the cloud storage system; and
   receiving a response indicating whether the chunk identifier is present in the cloud storage system.

7. At least one non-transitory machine-readable storage medium that provides instructions that, if executed by a processor of a client device, will cause said processor to perform operations for saving a plurality of files to a cloud file system that resides, at least partially, in a cloud storage system, the operations comprising:
   for each of the plurality of files, performing the following:
      splitting that file into a plurality of chunks,
      for each of the plurality of chunks, performing the following:
         generating an encryption key based on data with that chunk,
         encrypting that chunk using the generated encryption key,
         generating a chunk identifier based on data within the encrypted chunk,
         including the encryption key and the chunk identifier in a file manifest,
         determining whether the cloud storage system includes the encrypted chunk, and
         transmitting the encrypted chunk and chunk identifier to the cloud storage system only if it is determined that the cloud storage system does not contain the encrypted chunk, wherein the file manifest includes a list of the encryption keys and corresponding chunk identifiers for the plurality of chunks,
generating a file manifest encryption key based on the data within the file manifest,
encrypting the file manifest using the file manifest encryption key,
generating a file manifest identifier based on data within the encrypted file manifest,
including the file manifest encryption key and the file manifest identifier in a file system manifest,
determining whether the cloud storage system includes the encrypted file manifest, and
transmitting the encrypted file manifest and the file manifest identifier to the cloud storage system only if it is determined that the cloud storage system does not include the encrypted file manifest;
wherein the file system manifest includes a listing of the file manifests for each of the plurality of files and a path of the plurality of files;
encrypting the file system manifest; and
transmitting the encrypted file system manifest to the cloud storage system.

8. The at least one non-transitory machine-readable storage medium of claim 7, wherein the encryption key generated for each chunk is based on a result of hashing that chunk.

9. The at least one non-transitory machine-readable storage medium of claim 7, wherein the generated chunk identifier for each chunk is based on a result of hashing the encrypted chunk.

10. The at least one non-transitory machine-readable storage medium of claim 7, wherein the file system manifest is encrypted using an encryption key unique to the client device or a user of the client device.

11. The at least one non-transitory machine-readable storage medium of claim 7, wherein the at least one non-transitory machine-readable storage medium further provides instructions that, if executed by the processor of the client device, will cause said processor to perform the following operation:
removing the plurality of files from a local storage system of the client device after saving those files to the cloud file system.

12. The at least one non-transitory machine-readable storage medium of claim 7, wherein determining whether the cloud storage system includes the encrypted chunk comprises:
transmitting a query to the cloud storage system that requests information indicating whether the chunk identifier corresponding to the encrypted chunk is present in the cloud storage system; and
receiving a response indicating whether the chunk identifier is present in the cloud storage system.

13. A client device configured to save a plurality of files to a cloud file system that resides, at least partially, in a cloud storage system, the client device comprising:
a processor to execute instructions, and
at least one non-transitory machine-readable storage medium coupled with the processor, the medium storing one or more instructions that, when executed, cause the processor to perform operations comprising:
for each of the plurality of files, performing the following:
splitting that file into a plurality of chunks, for each of the plurality of chunks, performing the following:
generating an encryption key based on data with that chunk,
encrypting that chunk using the generated encryption key,
generating a chunk identifier based on data within the encrypted chunk,
including the encryption key and the chunk identifier in a file manifest,
determining whether the cloud storage system includes the encrypted chunk, and
transmitting the encrypted chunk and chunk identifier to the cloud storage system only if it is determined that the cloud storage system does not contain the encrypted chunk,
wherein the file manifest includes a list of the encryption keys and corresponding chunk identifiers for the plurality of chunks,
generating a file manifest encryption key based on the data within the file manifest,
encrypting the file manifest using the file manifest encryption key,
generating a file manifest identifier based on data within the encrypted file manifest,
including the file manifest encryption key and the file manifest identifier in a file system manifest,
determining whether the cloud storage system includes the encrypted file manifest, and
transmitting the encrypted file manifest and the file manifest identifier to the cloud storage system only if it is determined that the cloud storage system does not include the encrypted file manifest;
wherein the file system manifest includes a listing of the file manifests for each of the plurality of files and a path of the plurality of files;
encrypting the file system manifest; and
transmitting the encrypted file system manifest to the cloud storage system.

14. The client device of claim 13, wherein the encryption key generated for each chunk is based on a result of hashing that chunk.

15. The client device of claim 13, wherein the generated chunk identifier for each chunk is based on a result of hashing the encrypted chunk.

16. The client device of claim 13, wherein the file system manifest is encrypted using an encryption key unique to the client device or a user of the client device.

17. The client device of claim 13, wherein the at least one non-transitory machine-readable storage medium further provides instructions that, if executed by the processor, will cause said processor to perform the following operation:
removing the plurality of files from a local storage system of the client device after saving those files to the cloud file system.

18. The client device of claim 13, wherein determining whether the cloud storage system includes the encrypted chunk comprises:
transmitting a query to the cloud storage system that requests information indicating whether the chunk identifier corresponding to the encrypted chunk is present in the cloud storage system; and
receiving a response indicating whether the chunk identifier is present in the cloud storage system.

19. A method in a cloud storage client of a client device for reading a file stored in a cloud file system, wherein the cloud file system resides, at least partially, in a cloud storage system, the method comprising the steps of:
receiving an instruction from an operating system of the client device to read the file stored in the cloud file system;

determining a file manifest identifier corresponding to the file, wherein the file manifest identifier identifies a file manifest that includes a listing of a plurality of encryption keys and a plurality of chunk identifiers corresponding to a plurality of chunks of the file, wherein determining the file manifest identifier corresponding to the file includes accessing a file system manifest that includes a listing of file manifests for files stored in the cloud file system and paths for those files;

responsive to determining that a decrypted file manifest corresponding to the file manifest identifier and an encrypted file manifest corresponding to the file manifest identifier is not present in a local cache of the client device used for the cloud file system, downloading the encrypted file manifest from the cloud storage system;

retrieving a key used to decrypt the encrypted file manifest;

decrypting the encrypted file manifest using the retrieved key;

determining the plurality of chunk identifiers from the decrypted file manifest;

for each of the plurality of chunk identifiers, determining whether a decrypted chunk or an encrypted chunk corresponding to that chunk identifier is present in the local cache of the client device used for the cloud file system;

for each of the plurality of chunk identifiers where a corresponding decrypted chunk or encrypted chunk is not present in the local cache of the client device used for the cloud file system, performing the following:
  downloading that encrypted chunk from the cloud storage system,
  retrieving, from the decrypted file manifest, a key to decrypt that encrypted chunk, and
  decrypting the encrypted chunk using the retrieved key;

for each of the plurality of chunk identifiers where a corresponding encrypted chunk is present in the local cache of the client device used for the cloud file system, performing the following:
  retrieving, from the local cache, the encrypted chunk,
  retrieving, from the decrypted file manifest, a key to decrypt that encrypted chunk, and
  decrypting the encrypted chunk using the retrieved key;

for each of the plurality of chunk identifiers where a decrypted chunk is present in the local cache of the client device used for the cloud file system, retrieving that decrypted chunk from the local cache; and returning the requested file to the cloud file system.

20. The method of claim 19, further comprising: storing each decrypted chunk in the local cache of the client device used for the cloud file system.

21. The method of claim 19, wherein downloading each encrypted chunk from the cloud storage system includes performing the following:
  including a chunk identifier corresponding to that encrypted chunk in a download queue;
  accessing the decrypted file manifest to determine a set of one or more other chunk identifiers whose corresponding chunks are located near that encrypted chunk in the decrypted file manifest;
  including, in the download queue, the set of other chunk identifiers; and
  downloading the encrypted chunks from the cloud storage system according to the download queue.

22. The method of claim 19, further comprising:
  for each of the encrypted chunks downloaded from the cloud storage system, downloading a set of one or more additional encrypted chunks from the cloud storage system.

23. The method of claim 22, further comprising:
  for each of the encrypted chunks downloaded from the cloud storage system, using an analytical model that indicates the set of additional encrypted chunks that will likely be accessed when the encrypted chunk is accessed.

24. The method of claim 19, further comprising:
  instructing the cloud storage system to prefetch one or more chunks to a cloud storage pool.

25. At least one non-transitory machine-readable storage medium that provides instructions that, if executed by a processor of a client device, will cause said processor to perform operations for reading a file stored in a cloud file system that resides, at least partially, in a cloud storage system, the operations comprising:

receiving an instruction from an operating system of the client device to read the file stored in the cloud file system;

determining a file manifest identifier corresponding to the file, wherein the file manifest identifier identifies a file manifest that includes a listing of a plurality of encryption keys and a plurality of chunk identifiers corresponding to a plurality of chunks of the file, wherein determining the file manifest identifier corresponding to the file includes accessing a file system manifest that includes a listing of file manifests for files stored in the cloud file system and paths for those files;

responsive to determining that a decrypted file manifest corresponding to the file manifest identifier and an encrypted file manifest corresponding to the file manifest identifier is not present in a local cache of the client device used for the cloud file system, downloading the encrypted file manifest from the cloud storage system;

retrieving a key used to decrypt the encrypted file manifest;

decrypting the encrypted file manifest using the retrieved key;

determining the plurality of chunk identifiers from the decrypted file manifest;

for each of the plurality of chunk identifiers, determining whether a decrypted chunk or an encrypted chunk corresponding to that chunk identifier is present in the local cache of the client device used for the cloud file system;

for each of the plurality of chunk identifiers where a corresponding decrypted chunk or encrypted chunk is not present in the local cache of the client device used for the cloud file system, performing the following:
  downloading that encrypted chunk from the cloud storage system,
  retrieving, from the decrypted file manifest, a key to decrypt that encrypted chunk, and
  decrypting the encrypted chunk using the retrieved key;

for each of the plurality of chunk identifiers where a corresponding encrypted chunk is present in the local cache of the client device used for the cloud file system, performing the following:
  retrieving, from the local cache, the encrypted chunk,
  retrieving, from the decrypted file manifest, a key to decrypt that encrypted chunk, and
  decrypting the encrypted chunk using the retrieved key;

for each of the plurality of chunk identifiers where a decrypted chunk is present in the local cache of the client device used for the cloud file system, retrieving that decrypted chunk from the local cache; and returning the requested file to the cloud file system.

26. The at least one non-transitory machine-readable storage medium of claim 25, wherein the at least one non-transitory machine-readable storage medium further provides instructions that, if executed by the processor of the client device, will cause said processor to perform the following operation:

storing each decrypted chunk in the local cache of the client device used for the cloud file system.

27. The at least one non-transitory machine-readable storage medium of claim 25, wherein downloading each encrypted chunk from the cloud storage system includes performing the following:

including a chunk identifier corresponding to that encrypted chunk in a download queue;

accessing the decrypted file manifest to determine a set of one or more other chunk identifiers whose corresponding chunks are located near that encrypted chunk in the decrypted file manifest;

including, in the download queue, the set of other chunk identifiers; and downloading the encrypted chunks from the cloud storage system according to the download queues.

28. The at least one non-transitory machine-readable storage medium of claim 25, wherein the at least one non-transitory machine-readable storage medium further provides instructions that, if executed by the processor of the client device, will cause said processor to perform the following operation:

for each of the encrypted chunks downloaded from the cloud storage system, downloading a set of one or more additional encrypted chunks from the cloud storage system.

29. The at least one non-transitory machine-readable storage medium of claim 28, wherein the at least one non-transitory machine-readable storage medium further provides instructions that, if executed by the processor of the client device, will cause said processor to perform the following operation:

for each of the encrypted chunks downloaded from the cloud storage system, using an analytical model that indicates the set of additional encrypted chunks that will likely be accessed when the encrypted chunk is accessed.

30. The at least one non-transitory machine-readable storage medium of claim 25, wherein the at least one non-transitory machine-readable storage medium further provides instructions that, if executed by the processor of the client device, will cause said processor to perform the following operation:

instructing the cloud storage system to prefetch one or more chunks to a cloud storage pool.

31. A client device configured to read a file stored in a cloud file system that resides, at least partially, in a cloud storage system, the client device comprising:

a processor to execute instructions, and at least one non-transitory machine-readable storage medium coupled with the processor, the medium storing one or more instructions that, when executed, cause the processor to perform operations comprising:

receiving an instruction from an operating system of the client device to read the file stored in the cloud file system;

determining a file manifest identifier corresponding to the file, wherein the file manifest identifier identifies a file manifest that includes a listing of a plurality of encryption keys and a plurality of chunk identifiers corresponding to a plurality of chunks of the file, wherein determining the file manifest identifier corresponding to the file includes accessing a file system manifest that includes a listing of file manifests for files stored in the cloud file system and paths for those files;

responsive to determining that a decrypted file manifest corresponding to the file manifest identifier and an encrypted file manifest corresponding to the file manifest identifier is not present in a local cache of the client device used for the cloud file system, downloading the encrypted file manifest from the cloud storage system;

retrieving a key used to decrypt the encrypted file manifest;

decrypting the encrypted file manifest using the retrieved key;

determining the plurality of chunk identifiers from the decrypted file manifest;

for each of the plurality of chunk identifiers, determining whether a decrypted chunk or an encrypted chunk corresponding to that chunk identifier is present in the local cache of the client device used for the cloud file system;

for each of the plurality of chunk identifiers where a corresponding decrypted chunk or encrypted chunk is not present in the local cache of the client device used for the cloud file system, performing the following:

downloading that encrypted chunk from the cloud storage system, retrieving, from the decrypted file manifest, a key to decrypt that encrypted chunk, and decrypting the encrypted chunk using the retrieved key;

for each of the plurality of chunk identifiers where a corresponding encrypted chunk is present in the local cache of the client device used for the cloud file system, performing the following:

retrieving, from the local cache, the encrypted chunk, retrieving, from the decrypted file manifest, a key to decrypt that encrypted chunk, and decrypting the encrypted chunk using the retrieved key;

for each of the plurality of chunk identifiers where a decrypted chunk is present in the local cache of the client device used for the cloud file system, retrieving that decrypted chunk from the local cache; and returning the requested file to the cloud file system.

32. The client device of claim 31, wherein the at least one non-transitory machine-readable storage medium further provides instructions that, if executed by the processor, will cause said processor to perform the following operation:

storing each decrypted chunk in the local cache of the client device used for the cloud file system.

33. The client device of claim 31, wherein downloading each encrypted chunk from the cloud storage system includes performing the following:

including a chunk identifier corresponding to that encrypted chunk in a download queue;

accessing the decrypted file manifest to determine a set of one or more other chunk identifiers whose corresponding chunks are located near that encrypted chunk in the decrypted file manifest;

including, in the download queue, the set of other chunk identifiers; and downloading the encrypted chunks from the cloud storage system according to the download queue.

34. The client device of claim 31, wherein the at least one non-transitory machine-readable storage medium further provides instructions that, if executed by the processor, will cause said processor to perform the following operation:
    for each of the encrypted chunks downloaded from the cloud storage system, downloading a set of one or more additional encrypted chunks from the cloud storage system.

35. The client device of claim 34, wherein the at least one non-transitory machine-readable storage medium further provides instructions that, if executed by the processor, will cause said processor to perform the following operation:
    for each of the encrypted chunks downloaded from the cloud storage system, using an analytical model that indicates the set of additional encrypted chunks that will likely be accessed when the encrypted chunk is accessed.

36. The client device of claim 31, wherein the at least one non-transitory machine-readable storage medium further provides instructions that, if executed by the processor, will cause said processor to perform the following operation:
    instructing the cloud storage system to prefetch one or more chunks to a cloud storage pool.

37. A method performed by a cloud storage client in a client device for saving a plurality of files to a cloud file system, wherein the cloud file system resides, at least partially, in a cloud storage system, the method comprising the steps of:
    for each of the plurality of files, performing the following:
        splitting that file into a plurality of chunks,
        for each of the plurality of chunks, performing the following:
            generating an encryption key based on data with that chunk,
            encrypting that chunk using the generated encryption key,
            generating a chunk identifier based on data within the encrypted chunk,
            including the encryption key and the chunk identifier in a file manifest,
            determining whether the cloud storage system includes the encrypted chunk, and
            transmitting the encrypted chunk and chunk identifier to the cloud storage system only if it is determined that the cloud storage system does not contain the encrypted chunk,
        wherein the file manifest includes a list of the encryption keys and corresponding chunk identifiers for the plurality of chunks,
        generating a file manifest encryption key based on the data within the file manifest,
        encrypting the file manifest using the file manifest encryption key,
        generating a file manifest identifier based on data within the encrypted file manifest,
        including the file manifest encryption key and the file manifest identifier in a file system manifest,
        determining whether the cloud storage system includes the encrypted file manifest, and
        transmitting the encrypted file manifest and the file manifest identifier to the cloud storage system only if it is determined that the cloud storage system does not include the encrypted file manifest;
    wherein the file system manifest includes a listing of the file manifests;
    encrypting the file system manifest;
    generating a file system manifest identifier based on data within the encrypted file system manifest;
    including the file system manifest key and the file system manifest identifier in a user manifest that is associated with a user of the client device, wherein the user manifest includes information that indicates a mount point at which the user has mounted the cloud file system;
    encrypting the user manifest with a key specific to the user; and
    storing the encrypted user manifest in the cloud storage system.

38. The method of claim 37, wherein the encryption key generated for each chunk is based on a result of hashing that chunk.

39. The method of claim 37, wherein the generated chunk identifier for each chunk is based on a result of hashing the encrypted chunk.

40. The method of claim 37, wherein the file system manifest is encrypted using an encryption key unique to the client device or a user of the client device.

41. The method of claim 37, further comprising:
    removing the plurality of files from a local storage system of the client device after saving those files to the cloud file system.

42. The method of claim 37, wherein determining whether the cloud storage system includes the encrypted chunk comprises:
    transmitting a query to the cloud storage system that requests information indicating whether the chunk identifier corresponding to the encrypted chunk is present in the cloud storage system; and
    receiving a response indicating whether the chunk identifier is present in the cloud storage system.

43. The method of claim 37, wherein the user manifest further includes information identifying an index.

44. The method of claim 37, further comprising:
    generating a file system manifest encryption key based on data within the file system manifest, and wherein the file system manifest is encrypted with the generated file system manifest encryption key.

45. At least one non-transitory machine-readable storage medium that provides instructions that, if executed by a processor of a client device, will cause said processor to perform operations for saving a plurality of files to a cloud file system that resides, at least partially, in a cloud storage system, the operations comprising:
    for each of the plurality of files, performing the following:
        splitting that file into a plurality of chunks,
        for each of the plurality of chunks, performing the following:
            generating an encryption key based on data with that chunk,
            encrypting that chunk using the generated encryption key,
            generating a chunk identifier based on data within the encrypted chunk,
            including the encryption key and the chunk identifier in a file manifest,
            determining whether the cloud storage system includes the encrypted chunk, and
            transmitting the encrypted chunk and chunk identifier to the cloud storage system only if it is determined that the cloud storage system does not contain the encrypted chunk,
        wherein the file manifest includes a list of the encryption keys and corresponding chunk identifiers for the plurality of chunks,
        generating a file manifest encryption key based on the data within the file manifest,
        encrypting the file manifest using the file manifest encryption key, generating a file manifest identifier based on data within the encrypted file manifest,
including the file manifest encryption key and the file manifest identifier in a file system manifest,
determining whether the cloud storage system includes the encrypted file manifest, and
transmitting the encrypted file manifest and the file manifest identifier to the cloud storage system only if it is determined that the cloud storage system does not include the encrypted file manifest;
wherein the file system manifest includes a listing of the file manifests;
encrypting the file system manifest;
generating a file system manifest identifier based on data within the encrypted file system manifest;
including the file system manifest key and the file system manifest identifier in a user manifest that is associated with a user of the client device, wherein the user manifest includes information that indicates a mount point at which the user has mounted the cloud file system;
encrypting the user manifest with a key specific to the user; and
storing the encrypted user manifest in the cloud storage system.

46. The at least one non-transitory machine-readable storage medium of claim 45, wherein the encryption key generated for each chunk is based on a result of hashing that chunk.

47. The at least one non-transitory machine-readable storage medium of claim 45, wherein the generated chunk identifier for each chunk is based on a result of hashing the encrypted chunk.

48. The at least one non-transitory machine-readable storage medium of claim 45, wherein the file system manifest is encrypted using an encryption key unique to the client device or a user of the client device.

49. The at least one non-transitory machine-readable storage medium of claim 45, wherein the at least one non-transitory machine-readable storage medium further provides instructions that, if executed by the processor of the client device, will cause said processor to perform the following operation:
removing the plurality of files from a local storage system of the client device after saving those files to the cloud file system.

50. The at least one non-transitory machine-readable storage medium of claim 45, wherein determining whether the cloud storage system includes the encrypted chunk comprises:
transmitting a query to the cloud storage system that requests information indicating whether the chunk identifier corresponding to the encrypted chunk is present in the cloud storage system; and
receiving a response indicating whether the chunk identifier is present in the cloud storage system.

51. The at least one non-transitory machine-readable storage medium of claim 45, wherein the user manifest further includes information identifying an index.

52. The at least one non-transitory machine-readable storage medium of claim 45, wherein the at least one non-transitory machine-readable storage medium further provides instructions that, if executed by the processor of the client device, will cause said processor to perform the following operation:
generating a file system manifest encryption key based on data within the file system manifest, and wherein the file system manifest is encrypted with the generated file system manifest encryption key.

53. A client device configured to save a plurality of files to a cloud file system that resides, at least partially, in a cloud storage system, the client device comprising:
a processor to execute instructions, and
at least one non-transitory machine-readable storage medium coupled with the processor, the medium storing one or more instructions that, when executed, cause the processor to perform operations comprising:
for each of the plurality of files, performing the following:
splitting that file into a plurality of chunks,
for each of the plurality of chunks, performing the following:
generating an encryption key based on data with that chunk,
encrypting that chunk using the generated encryption key,
generating a chunk identifier based on data within the encrypted chunk,
including the encryption key and the chunk identifier in a file manifest,
determining whether the cloud storage system includes the encrypted chunk, and
transmitting the encrypted chunk and chunk identifier to the cloud storage system only if it is determined that the cloud storage system does not contain the encrypted chunk,
wherein the file manifest includes a list of the encryption keys and corresponding chunk identifiers for the plurality of chunks,
generating a file manifest encryption key based on the data within the file manifest,
encrypting the file manifest using the file manifest encryption key,
generating a file manifest identifier based on data within the encrypted file manifest,
including the file manifest encryption key and the file manifest identifier in a file system manifest,
determining whether the cloud storage system includes the encrypted file manifest, and
transmitting the encrypted file manifest and the file manifest identifier to the cloud storage system only if it is determined that the cloud storage system does not include the encrypted file manifest;
wherein the file system manifest includes a listing of the file manifests;
encrypting the file system manifest;
generating a file system manifest identifier based on data within the encrypted file system manifest;
including the file system manifest key and the file system manifest identifier in a user manifest that is associated with a user of the client device, wherein the user manifest includes information that indicates a mount point at which the user has mounted the cloud file system;
encrypting the user manifest with a key specific to the user; and
storing the encrypted user manifest in the cloud storage system.

54. The client device of claim 53, wherein the encryption key generated for each chunk is based on a result of hashing that chunk.

55. The client device of claim 53, wherein the generated chunk identifier for each chunk is based on a result of hashing the encrypted chunk.

56. The client device of claim 53, wherein the file system manifest is encrypted using an encryption key unique to the client device or a user of the client device.

57. The client device of claim 53, wherein the at least one non-transitory machine-readable storage medium further stores one or more instructions that, when executed, cause the processor to perform the following operation:
removing the plurality of files from a local storage system of the client device after saving those files to the cloud file system.

58. The client device of claim 53, wherein determining whether the cloud storage system includes the encrypted chunk comprises:
transmitting a query to the cloud storage system that requests information indicating whether the chunk identifier corresponding to the encrypted chunk is present in the cloud storage system; and
receiving a response indicating whether the chunk identifier is present in the cloud storage system.

59. The client device of claim 53, wherein the user manifest further includes information identifying an index.

60. The client device of claim 53, wherein the at least one non-transitory machine-readable storage medium further stores one or more instructions that, when executed, cause the processor to perform the following operation:
generating a file system manifest encryption key based on data within the file system manifest, and wherein the file system manifest is encrypted with the generated file system manifest encryption key.

61. A method in a cloud storage client of a client device for providing a user with access to a cloud file system, wherein the cloud file system resides, at least partially, in a cloud storage system, the method comprising:
retrieving an encrypted file system manifest and file system manifest encryption key, wherein the encrypted file system manifest corresponds with a file system manifest that has been shared by another user;
decrypting the file system manifest using the file system manifest encryption key, wherein the decrypted file system manifest includes a listing of a set of one or more encrypted file manifests and a set of one or more file manifest keys;
decrypting the set of encrypted file manifests using the set of file manifest keys, wherein each decrypted file manifest includes a set of encryption keys and a corresponding set of chunk identifiers of a file, wherein the file was encrypted in a user agnostic manner to allow encrypted file chunks to be deduplicated across multiple users at the cloud storage system; and
adding the decrypted file system manifest to a user manifest of the user.

62. The method of claim 61, further comprising:
encrypting the user manifest with a key specific to the user; and
transmitting the encrypted user manifest to the cloud storage system.

63. The method of claim 61, wherein the decrypted file system manifest is associated with metadata that indicates a mount point for that file system manifest.

64. The method of claim 63, wherein adding the decrypted file system manifest to the user manifest of the user comprises:
responsive to determining that data currently resides at the location of the indicated mount point, mounting the decrypted file system manifest to a different location.

65. The method of claim 64, wherein the different location is automatically selected by the cloud storage client.

66. The method of claim 64, wherein the different location is chosen by the user of the client device.

67. The method of claim 61, wherein the file system manifest key is a universally unique identifier to the cloud storage system.

68. The method of claim 61, wherein the file system manifest key is provided by the another user, and wherein the file system manifest key is received from the another user.

69. At least one non-transitory machine-readable storage medium that provides instructions that, if executed by a processor of a client device, will cause said processor to perform operations for providing a user with access to a cloud file system that resides, at least partially, in a cloud storage system, the operations comprising:
retrieving an encrypted file system manifest and file system manifest encryption key, wherein the encrypted file system manifest corresponds with a file system manifest that has been shared by another user;
decrypting the file system manifest using the file system manifest encryption key, wherein the decrypted file system manifest includes a listing of a set of one or more encrypted file manifests and a set of one or more file manifest keys;
decrypting the set of encrypted file manifests using the set of file manifest keys, wherein each decrypted file manifest includes a set of encryption keys and a corresponding set of chunk identifiers of a file, wherein the file was encrypted in a user agnostic manner to allow encrypted file chunks to be deduplicated across multiple users at the cloud storage system; and
adding the decrypted file system manifest to a user manifest of the user.

70. The at least one non-transitory machine-readable storage medium of claim 69, wherein the at least one non-transitory machine-readable storage medium further provides instructions that, if executed by the processor of the client device, will cause said processor to perform the following operations:
encrypting the user manifest with a key specific to the user; and
transmitting the encrypted user manifest to the cloud storage system.

71. The at least one non-transitory machine-readable storage medium of claim 69, wherein the decrypted file system manifest is associated with metadata that indicates a mount point for that file system manifest.

72. The at least one non-transitory machine-readable storage medium of claim 71, wherein adding the decrypted file system manifest to the user manifest of the user comprises:
responsive to determining that data currently resides at the location of the indicated mount point, mounting the decrypted file system manifest to a different location.

73. The at least one non-transitory machine-readable storage medium of claim 72, wherein the different location is automatically selected by the cloud storage client.

74. The at least one non-transitory machine-readable storage medium of claim 72, wherein the different location is chosen by the user of the client device.

75. The at least one non-transitory machine-readable storage medium of claim 69, wherein the file system manifest key is a universally unique identifier to the cloud storage system.

76. The at least one non-transitory machine-readable storage medium of claim 69, wherein the file system manifest key is provided by the another user, and wherein the file system manifest key is received from the another user.

77. A client device configured to provide a user with access to a cloud file system that resides, at least partially, in a cloud storage system, the client device comprising:
- a processor to execute instructions, and
- at least one non-transitory machine-readable storage medium coupled with the processor, the medium storing one or more instructions that, when executed, cause the processor to perform operations comprising:
  - retrieving an encrypted file system manifest and file system manifest encryption key, wherein the encrypted file system manifest corresponds with a file system manifest that has been shared by another user;
  - decrypting the file system manifest using the file system manifest encryption key, wherein the decrypted file system manifest includes a listing of a set of one or more encrypted file manifests and a set of one or more file manifest keys;
  - decrypting the set of encrypted file manifests using the set of file manifest keys, wherein each decrypted file manifest includes a set of encryption keys and a corresponding set of chunk identifiers of a file, wherein the file was encrypted in a user agnostic manner to allow encrypted file chunks to be deduplicated across multiple users at the cloud storage system; and
  - adding the decrypted file system manifest to a user manifest of the user.

78. The client device of claim 77, wherein the at least one non-transitory machine-readable storage medium further stores instructions that, when executed by the processor, cause the processor to perform the following operations:
- encrypting the user manifest with a key specific to the user; and
- transmitting the encrypted user manifest to the cloud storage system.

79. The client device of claim 77, wherein the decrypted file system manifest is associated with metadata that indicates a mount point for that file system manifest.

80. The client device of claim 79, wherein adding the decrypted file system manifest to the user manifest of the user comprises:
- responsive to determining that data currently resides at the location of the indicated mount point, mounting the decrypted file system manifest to a different location.

81. The client device of claim 80, wherein the different location is automatically selected by the cloud storage client.

82. The client device of claim 80, wherein the different location is chosen by the user of the client device.

83. The client device of claim 77, wherein the file system manifest key is a universally unique identifier to the cloud storage system.

84. The client device of claim 77, wherein the file system manifest key is provided by the another user, and wherein the file system manifest key is received from the another user.

85. A method for use of a cloud file system (CFS) on a client device, wherein the CFS resides, at least partially, in a cloud storage system remote from the client device, the method comprising:
- allocating space, in a local storage system of the client device, for storing data to act as a local cache of the CFS,
- receiving, in a file browser interface executing in the client device, a designation of a folder stored in the local file system to convert it and a plurality of files beneath it to the CFS, wherein the folder and the plurality of files are stored in the local storage system, and wherein the folder is identified at a location in the local file system,
- converting the folder, including the plurality of files, from storage in the local storage system to storage in the cloud storage system of the CFS, wherein the plurality of files are stored in the cloud storage system using a plurality of encrypted file chunks encrypted in a user agnostic manner to allow the encrypted file chunks to be deduplicated across multiple users at the cloud storage system,
- transmitting one or more of the plurality of encrypted file chunks to the cloud storage system, wherein the one or more of the plurality of encrypted file chunks are those of the plurality of encrypted file chunks that are not present in the cloud storage system,
- storing a file system manifest in the local cache of the CFS, wherein the file system manifest identifies the folder and the plurality of files,
- maintaining a representation of the folder at the location of the local file system such that each of the plurality of files may be accessed by a logical path at which that file was previously accessible,
- removing the plurality of files from the location of the local file system, and
- directing accesses to the folder to a CFS client module executing on the client device to provide access to each of the plurality of files now located in the cloud storage system via the logical path at which that file was previously accessible.

86. The method of claim 85, further comprising:
- caching one or more of the plurality file chunks in the local cache of the CFS;
- in response to receiving a request for access of one of the plurality of file chunks,
  performing the following:
  - retrieving that file chunk from the cloud storage system if that file chunk is not cached in the local cache of the CFS, and
  - predictively retrieving others of the plurality of file chunks from the cloud storage system that are not in the local cache of the CFS.

87. The method of claim 86, wherein the step of predictively retrieving others of the plurality of file chunks from the cloud storage system includes accessing the file system manifest to determine which chunks are located near the requested chunk and requesting from the cloud storage system at least some of those chunks.

88. The method of claim 86, wherein the step of predictively retrieving others of the plurality of file chunks from the cloud storage system includes using an analytical model that indicates a set of one or more chunks that will likely be accessed when the requested chunk is accessed, and requesting from the cloud storage system at least some of those set of chunks.

89. The method of claim 86, further comprising:
- communicating prefetch commands to the cloud storage system identifying the others of the plurality of chunks.

90. The method of claim 86, further comprising:
- receiving a request for an amount of space available in the folder stored in the cloud storage system; and
- generating a value to present to the user as the amount of space available in the folder stored in the cloud storage system, the value being greater than an amount available on the local storage system.

91. The method of claim 90, wherein the value is a maximum value supported by that operating system for storage.

92. The method of claim 86, further comprising:
- providing an interface to a user of the client device for setting the amount of space to act as the local cache in the CFS; and receiving, via the interface for setting the amount of space to act as the local cache in the CFS, an indication of the amount of space to act as the local cache in the CFS.

93. The method of claim 86, further comprising:
providing an interface for converting the folder to the CFS that allows the user to drag and drop the folder to designate it as to be converted to the CFS.

94. The method of claim 86, wherein the designation of the folder is received via a selection in a context menu associated with the folder.

95. At least one non-transitory machine-readable storage medium that provides instructions that, if executed by a processor of a client device, will cause said processor to perform operations for use of a cloud file system (CFS) that resides, at least partially, in a cloud storage system remote from the client device, the operations comprising:
allocating space, in a local storage system of the client device, for storing data to act as a local cache of the CFS,
receiving, in a file browser interface executing in the client device, a designation of a folder stored in the local file system to convert it and a plurality of files beneath it to the CFS, wherein the folder and the plurality of files are stored in the local storage system, and wherein the folder is identified at a location in the local file system,
converting the folder, including the plurality of files, from storage in the local storage system to storage in the cloud storage system of the CFS, wherein the plurality of files are stored in the cloud storage system using a plurality of encrypted file chunks encrypted in a user agnostic manner to allow the encrypted file chunks to be deduplicated across multiple users at the cloud storage system,
transmitting one or more of the plurality of encrypted file chunks to the cloud storage system, wherein the one or more of the plurality of encrypted file chunks are those of the plurality of encrypted file chunks that are not present in the cloud storage system,
storing a file system manifest in the local cache of the CFS, wherein the file system manifest identifies the folder and the plurality of files,
maintaining a representation of the folder at the location of the local file system such that each of the plurality of files may be accessed by a logical path at which that file was previously accessible,
removing the plurality of files from the location of the local file system, and
directing accesses to the folder to a CFS client module executing on the client device to provide access to each of the plurality of files now located in the cloud storage system via the logical path at which that file was previously accessible.

96. The at least one non-transitory machine-readable storage medium of claim 95, wherein the at least one non-transitory machine-readable storage medium further provides instructions that, if executed by the processor of the client device, will cause said processor to perform the following operations:
caching one or more of the plurality file chunks in the local cache of the CFS;
in response to receiving a request for access of one of the plurality of file chunks, performing the following:
retrieving that file chunk from the cloud storage system if that file chunk is not cached in the local cache of the CFS, and
predictively retrieving others of the plurality of file chunks from the cloud storage system that are not in the local cache of the CFS.

97. The at least one non-transitory machine-readable storage medium of claim 96, wherein the step of predictively retrieving others of the plurality of file chunks from the cloud storage system includes accessing the file system manifest to determine which chunks are located near the requested chunk and requesting from the cloud storage system at least some of those chunks.

98. The at least one non-transitory machine-readable storage medium of claim 96, wherein the step of predictively retrieving others of the plurality of file chunks from the cloud storage system includes using an analytical model that indicates a set of one or more chunks that will likely be accessed when the requested chunk is accessed, and requesting from the cloud storage system at least some of those set of chunks.

99. The at least one non-transitory machine-readable storage medium of claim 96, wherein the at least one non-transitory machine-readable storage medium further provides instructions that, if executed by the processor of the client device, will cause said processor to perform the following operation:
communicating prefetch commands to the cloud storage system identifying the others of the plurality of chunks.

100. The at least one non-transitory machine-readable storage medium of claim 96, wherein the at least one non-transitory machine-readable storage medium further provides instructions that, if executed by the processor of the client device, will cause said processor to perform the following operations:
receiving a request for an amount of space available in the folder stored in the cloud storage system; and
generating a value to present to the user as the amount of space available in the folder stored in the cloud storage system, the value being greater than an amount available on the local storage system.

101. The at least one non-transitory machine-readable storage medium of claim 100, wherein the value is a maximum value supported by that operating system for storage.

102. The at least one non-transitory machine-readable storage medium of claim 96, wherein the at least one non-transitory machine-readable storage medium further provides instructions that, if executed by the processor of the client device, will cause said processor to perform the following operations:
providing an interface to a user of the client device for setting the amount of space to act as the local cache in the CFS; and
receiving, via the interface for setting the amount of space to act as the local cache in the CFS, an indication of the amount of space to act as the local cache in the CFS.

103. The at least one non-transitory machine-readable storage medium of claim 96, wherein the at least one non-transitory machine-readable storage medium further provides instructions that, if executed by the processor of the client device, will cause said processor to perform the following operation:
providing an interface for converting the folder to the CFS that allows the user to drag and drop the folder to designate it as to be converted to the CFS.

104. The at least one non-transitory machine-readable storage medium of claim 96, wherein the designation of the folder is received via a selection in a context menu associated with the folder.

105. A client device configured to use a cloud file system (CFS) that resides, at least partially, in a cloud storage system remote from the client device, the client device comprising:
a processor to execute instructions, and at least one non-transitory machine-readable storage medium coupled with the processor, the medium storing one or more instructions that, when executed, cause the processor to perform operations comprising:
   allocating space, in a local storage system of the client device, for storing data to act as a local cache of the CFS,
   receiving, in a file browser interface executing in the client device, a designation of a folder stored in the local file system to convert it and a plurality of files beneath it to the CFS, wherein the folder and the plurality of files are stored in the local storage system, and wherein the folder is identified at a location in the local file system,
   converting the folder, including the plurality of files, from storage in the local storage system to storage in the cloud storage system of the CFS, wherein the plurality of files are stored in the cloud storage system using a plurality of encrypted file chunks encrypted in a user agnostic manner to allow the encrypted file chunks to be deduplicated across multiple users at the cloud storage system,
   transmitting one or more of the plurality of encrypted file chunks to the cloud storage system, wherein the one or more of the plurality of encrypted file chunks are those of the plurality of encrypted file chunks that are not present in the cloud storage system,
   storing a file system manifest in the local cache of the CFS, wherein the file system manifest identifies the folder and the plurality of files,
   maintaining a representation of the folder at the location of the local file system such that each of the plurality of files may be accessed by a logical path at which that file was previously accessible,
   removing the plurality of files from the location of the local file system, and
   directing accesses to the folder to a CFS client module executing on the client device to provide access to each of the plurality of files now located in the cloud storage system via the logical path at which that file was previously accessible.

106. The client device of claim 105, wherein the at least one non-transitory machine-readable storage medium further stores one or more instructions that, when executed, cause the processor to perform operations comprising:
   caching one or more of the plurality file chunks in the local cache of the CFS;
   in response to receiving a request for access of one of the plurality of file chunks, performing the following:
      retrieving that file chunk from the cloud storage system if that file chunk is not cached in the local cache of the CFS, and
      predictively retrieving others of the plurality of file chunks from the cloud storage system that are not in the local cache of the CFS.

107. The client device of claim 106, wherein the step of predictively retrieving others of the plurality of file chunks from the cloud storage system includes accessing the file system manifest to determine which chunks are located near the requested chunk and requesting from the cloud storage system at least some of those chunks.

108. The client device of claim 106, wherein the step of predictively retrieving others of the plurality of file chunks from the cloud storage system includes using an analytical model that indicates a set of one or more chunks that will likely be accessed when the requested chunk is accessed, and requesting from the cloud storage system at least some of those set of chunks.

109. The client device of claim 106, wherein the at least one non-transitory machine-readable storage medium further stores one or more instructions that, when executed, cause the processor to perform the following operation:
   communicating prefetch commands to the cloud storage system identifying the others of the plurality of chunks.

110. The client device of claim 106, wherein the at least one non-transitory machine-readable storage medium further stores one or more instructions that, when executed, cause the processor to perform operations comprising:
   receiving a request for an amount of space available in the folder stored in the cloud storage system; and
   generating a value to present to the user as the amount of space available in the folder stored in the cloud storage system, the value being greater than an amount available on the local storage system.

111. The client device of claim 110, wherein the value is a maximum value supported by that operating system for storage.

112. The client device of claim 106, wherein the at least one non-transitory machine-readable storage medium further stores one or more instructions that, when executed, cause the processor to perform operations comprising:
   providing an interface to a user of the client device for setting the amount of space to act as the local cache in the CFS; and
   receiving, via the interface for setting the amount of space to act as the local cache in the CFS, an indication of the amount of space to act as the local cache in the CFS.

113. The client device of claim 106, wherein the at least one non-transitory machine-readable storage medium further stores one or more instructions that, when executed, cause the processor to perform the following operation:
   providing an interface for converting the folder to the CFS that allows the user to drag and drop the folder to designate it as to be converted to the CFS.

114. The client device of claim 106, wherein the designation of the folder is received via a selection in a context menu associated with the folder.

115. A method in a cloud storage system that includes a cloud storage gateway and a set of one or more cloud storage pools, the cloud storage system providing at least part of a cloud file system for a plurality of client devices, the method comprising:
   storing in a user agnostic deduplicated manner, a plurality of encrypted file chunks and a plurality of file chunk identifiers, wherein each of the encrypted file chunks is deduplicated in a user agnostic manner such that the presence of identical unencrypted file chunks is recognized through identical file chunk identifiers;
   responding to retrieval requests from one of the plurality of client devices by transmitting one or more of the plurality of encrypted file chunks identified in the retrieval requests; and
   responding to prefetch commands from the one of the plurality of client devices by, at least temporarily, storing encrypted file chunks in a remote cache of the cloud file system at the cloud storage gateway, wherein the cloud storage gateway is closer to the one of the plurality of client devices than the set of cloud storage pools.

116. The method of claim 115, wherein the set of cloud storage pools include a plurality of cloud storage pools that are geographically distributed, and wherein the cloud storage gateway responds to retrieval requests that include an indication of region by directing those requests to the one of the cloud storage pool corresponding to that geographic region.

117. The method of claim 115, further comprising:
providing a web file access portal for allowing a user to access one or more of the plurality of files stored in the cloud storage system;
receiving, via the web file access portal, the user's encryption information;
accessing the user's cloud file systems utilizing the user's encryption information;
presenting, via the web file access portal, a listing of files available in the user's cloud file systems;
receiving, via the web file access portal, a request from the user to access a file in the listing of files;
generating a decrypted copy of the file; and
transmitting the decrypted copy of the file to the user.

118. The method of claim 117, wherein the web file access portal generates the decrypted copy of the file by performing the following:
retrieving a set of one or encrypted file chunk identifiers corresponding to a set of one or more encrypted file chunks that make up the file;
retrieving a set of one or more encryption keys corresponding to the set of one or more encrypted file chunks;
retrieving the set of one or more encrypted file chunks; and
decrypting each of the set of one or more encrypted file chunks with a corresponding one of the one or more encryption keys.

119. At least one non-transitory machine-readable storage medium that provides instructions that, if executed by a processor of a cloud storage system that includes a cloud storage gateway and a set of one or more cloud storage pools, will cause said processor to perform operations comprising:
storing in a user agnostic deduplicated manner, a plurality of encrypted file chunks and a plurality of file chunk identifiers, wherein each of the encrypted file chunks is deduplicated in a user agnostic manner such that the presence of identical unencrypted file chunks is recognized through identical file chunk identifiers;
responding to retrieval requests from one of a plurality of client devices by transmitting one or more of the plurality of encrypted file chunks identified in the retrieval requests; and
responding to prefetch commands from the one of the plurality of client devices by, at least temporarily, storing encrypted file chunks in a remote cache of a cloud file system at the cloud storage gateway, wherein the cloud storage gateway is closer to the one of the plurality of client devices than the set of cloud storage pools.

120. The at least one non-transitory machine-readable storage medium of claim 119, wherein the set of cloud storage pools include a plurality of cloud storage pools that are geographically distributed, and wherein the cloud storage gateway responds to retrieval requests that include an indication of region by directing those requests to the one of the cloud storage pool corresponding to that geographic region.

121. The at least one non-transitory machine-readable storage medium of claim 119, wherein the at least one non-transitory machine-readable storage medium further stores one or more instructions that, when executed, cause the processor to perform operations comprising:
providing a web file access portal for allowing a user to access one or more of the plurality of files stored in the cloud storage system;
receiving, via the web file access portal, the user's encryption information;
accessing the user's cloud file systems utilizing the user's encryption information;
presenting, via the web file access portal, a listing of files available in the user's cloud file systems;
receiving, via the web file access portal, a request from the user to access a file in the listing of files;
generating a decrypted copy of the file; and
transmitting the decrypted copy of the file to the user.

122. The at least one non-transitory machine-readable storage medium of claim 121, wherein the at least one non-transitory machine-readable storage medium further stores one or more instructions that, when executed, cause the processor to perform operations comprising:
retrieving a set of one or encrypted file chunk identifiers corresponding to a set of one or more encrypted file chunks that make up the file;
retrieving a set of one or more encryption keys corresponding to the set of one or more encrypted file chunks;
retrieving the set of one or more encrypted file chunks; and
decrypting each of the set of one or more encrypted file chunks with a corresponding one of the one or more encryption keys.

123. A cloud storage system that provides access to a plurality of files stored in the cloud storage system as part of a plurality of cloud file systems (CFSs), wherein the cloud storage system comprises:
a cloud storage gateway configured to perform the following:
receive data corresponding to CFS to store in the cloud storage system,
respond to prefetch commands from a client device by, at least, temporarily storing one or more encrypted file chunks in a cache of the cloud storage gateway to reduce latency in responding to retrieval requests for those encrypted file chunks identified in the prefetch commands, and
respond to retrieval requests from a client device by transmitting one or more encrypted files chunks identified in each retrieval requests; and
a cloud storage pool configured to store the plurality of encrypted file chunks and a corresponding plurality of chunk identifiers, wherein each encrypted file chunk includes at least a portion of one or more of the plurality of files stored in the cloud storage system, wherein each of the plurality of encrypted file chunks is deduplicated in a user agnostic manner such the presence of identical unencrypted file chunks is recognized through identical file chunk identifiers, and wherein the cloud storage pool is further configured to retrieve each of the plurality of encrypted file chunks and transmit each of the plurality of encrypted file chunks to the cloud storage gateway.

124. The cloud storage system of claim 123, further comprising:
wherein the cloud storage gateway is further configured to receive the data corresponding to the CFS to store in the cloud storage system by receiving one or more file system manifests each corresponding to a CFS, wherein the file system manifest is to comprise a listing of a plurality of files in the CFS along with information to identify a file manifest for each of the plurality of files;
wherein the cloud storage gateway is further configured to receive one or more file manifests each to correspond to a file in the plurality of files and each to include information to identify a set of one or more encrypted file chunks that make up the corresponding file along with encryption information to be used to decrypted the corresponding file, wherein the cloud storage gateway is further configured to receive a plurality of encrypted file chunks corresponding to one or more of the plurality of files.

125. The cloud storage system of claim 123, further comprising:
a web file access portal configured to provide an interface to a user for accessing one or more of the plurality of files stored in the cloud storage system by retrieving the user's encryption information, accessing the user's cloud file systems utilizing the user's encryption information, presenting a listing of files available in the user's cloud file systems, receiving a request from the user to access a file in the listing of files, generating a decrypted copy of the file, and presenting the decrypted copy of the file to the user.

126. The cloud storage system of claim 125, wherein the web file access portal is further configured to generate the decrypted copy of the file by retrieving a set of one or encrypted file chunk identifiers corresponding to a set of one or more encrypted file chunks that make up the file, retrieving a set of one or more encryption keys corresponding to the set of one or more encrypted file chunks, retrieving the set of one or more encrypted file chunks, and decrypting each of the set of one or more encrypted file chunks with a corresponding one of the one or more encryption keys.

127. A method for a content provider to distribute content to subscribers that are users of a cloud storage system, wherein the cloud storage system is coupled via a wide area network to a plurality of computing devices acting as client devices of the cloud storage system, the method comprising:
generating for each of the subscribers, by a computing device of the content provider, a cloud file system (CFS) containing their content, wherein the cloud storage system acts as a primary storage of data for the cloud file systems (CFSs), wherein each of the plurality of computing devices is configured to run a cloud file system (CFS) module that manages a local cache of the CFSs utilized by that client device, wherein files of the CFSs are encrypted using user agnostic encryption such that two files with the same data encrypted by different users will produce files with identical encrypted data, wherein the user agnostic file encryption requires for a CFS:
for each file to the CFS performing the following:
splitting the file into chunks,
generating an encryption key for each chunk from the data within that chunk,
encrypting each chunk with its the respective encryption key,
generating a chunk identifier for each chunk, and
generating a file manifest for each file, wherein the file manifest for each file includes the chunk identifiers and decryption keys for each of the encrypted chunks of the file,
generating an encryption key for each the file manifest from the data within that file manifest,
generating a file manifest identifier for each the file manifest,
encrypting the file manifest with the encryption key generated for the file manifest;
uploading any of the encrypted chunks and the encrypted file manifest not already stored in the cloud storage system;
generating a file system manifest with the file manifest identifiers and the encryption keys generated for the file manifest; and
encrypting the file system manifest with an encryption key; and
sharing the CFSs with the respective users.

128. The method of claim 127, wherein each of the CFSs generated by the content provider all contain the same content and the content provide only uploads the content one time to the cloud storage system.

129. The method of claim 127, wherein the sharing includes transmitting to each user their respective one of the encrypted file system manifests and the encryption key used to encrypt that file system manifest.

130. The method of claim 127, wherein the sharing includes:
uploading the encrypted file system manifests to the cloud storage system; and
sharing with each user their respective one of the identifiers for their encrypted file system manifest and the encryption key used to encrypt that file system manifest.

131. At least one non-transitory machine-readable storage medium that provides instructions that, if executed by a processor of a cloud storage system, will cause said processor to perform operations for distributing content to subscribers that are users of the cloud storage system, wherein the cloud storage system is coupled via a wide area network to a plurality of computing devices acting as client devices of the cloud storage system, the operations comprising:
generating for each of the subscribers, by a computing device of the content provider, a cloud file system (CFS) containing their content, wherein the cloud storage system acts as a primary storage of data for the cloud file systems (CFSs), wherein each of the plurality of computing devices is configured to run a cloud file system (CFS) module that manages a local cache of the CFSs utilized by that client device, wherein files of the CFSs are encrypted using user agnostic encryption such that two files with the same data encrypted by different users will produce files with identical encrypted data, wherein the user agnostic file encryption requires for a CFS:
for each file to the CFS performing the following:
splitting the file into chunks,
generating an encryption key for each chunk from the data within that chunk,
encrypting each chunk with its the respective encryption key,
generating a chunk identifier for each chunk, and
generating a file manifest for each file, wherein the file manifest for each file includes the chunk identifiers and decryption keys for each of the encrypted chunks of the file,
generating an encryption key for each the file manifest from the data within that file manifest,
generating a file manifest identifier for each the file manifest,
encrypting the file manifest with the encryption key generated for the file manifest;
uploading any of the encrypted chunks and the encrypted file manifest not already stored in the cloud storage system;
generating a file system manifest with the file manifest identifiers and the encryption keys generated for the file manifest; and
encrypting the file system manifest with an encryption key; and
sharing the CFSs with the respective users.

132. The at least one non-transitory machine-readable storage medium of claim 131, wherein each of the CFSs generated by the content provider all contain the same content and the content provide only uploads the content one time to the cloud storage system.

133. The at least one non-transitory machine-readable storage medium of claim 131, wherein the sharing includes transmitting to each user their respective one of the encrypted file system manifests and the encryption key used to encrypt that file system manifest.

134. The at least one non-transitory machine-readable storage medium of claim 131, wherein the sharing includes:
uploading the encrypted file system manifests to the cloud storage system; and
sharing with each user their respective one of the identifiers for their encrypted file system manifest and the encryption key used to encrypt that file system manifest.

135. A cloud storage system comprising:
a processor to execute instructions, and
at least one non-transitory machine-readable storage medium coupled with the processor, the medium storing one or more instructions that, when executed, cause the processor to perform operations for distributing content to subscribers that are users of the cloud storage system, wherein the cloud storage system is coupled via a wide area network to a plurality of computing devices acting as client devices of the cloud storage system, the operations comprising:
generating for each of the subscribers, by a computing device of the content provider, a cloud file system (CFS) containing their content, wherein the cloud storage system acts as a primary storage of data for the cloud file systems (CFSs), wherein each of the plurality of computing devices is configured to run a cloud file system (CFS) module that manages a local cache of the CFSs utilized by that client device, wherein files of the CFSs are encrypted using user agnostic encryption such that two files with the same data encrypted by different users will produce files with identical encrypted data, wherein the user agnostic file encryption requires for a CFS:
for each file to the CFS performing the following:
splitting the file into chunks,
generating an encryption key for each chunk from the data within that chunk,
encrypting each chunk with its the respective encryption key,
generating a chunk identifier for each chunk, and
generating a file manifest for each file, wherein the file manifest for each file includes the chunk identifiers and decryption keys for each of the encrypted chunks of the file,
generating an encryption key for each the file manifest from the data within that file manifest,
generating a file manifest identifier for each the file manifest,
encrypting the file manifest with the encryption key generated for the file manifest;
uploading any of the encrypted chunks and the encrypted file manifest not already stored in the cloud storage system;
generating a file system manifest with the file manifest identifiers and the encryption keys generated for the file manifest; and
encrypting the file system manifest with an encryption key; and
sharing the CFSs with the respective users.

136. The cloud storage system of claim 135, wherein each of the CFSs generated by the content provider all contain the same content and the content provide only uploads the content one time to the cloud storage system.

137. The cloud storage system of claim 135, wherein the sharing includes transmitting to each user their respective one of the encrypted file system manifests and the encryption key used to encrypt that file system manifest.

138. The cloud storage system of claim 135, wherein the sharing includes:
uploading the encrypted file system manifests to the cloud storage system; and
sharing with each user their respective one of the identifiers for their encrypted file system manifest and the encryption key used to encrypt that file system manifest.

139. A cloud storage system coupled via a wide area network to a plurality of computing devices acting as client devices of the cloud storage system, each of the plurality of computing devices is configured to run a cloud file system (CFS) module that manages a local cache of the CFSs utilized by that client device, wherein the cloud storage system acts as a primary storage of data for the cloud file systems (CFSs), wherein the cloud storage system includes:
a cloud storage pool that stores CFSs generated by a content provider to distribute content to subscribers by generating the CFS containing their content and sharing the CFSs with the respective subscribers, for each of the CFSs:
an encrypted file system manifest;
a plurality of encrypted file manifests; and
a plurality of encrypted file chunks, wherein the encrypted file system manifest identifies each of the plurality of file manifest, and each of the file manifest represents one file of the CFS and identifiers those of the encrypted file chunks FSM that comprise that file, wherein the plurality of encrypted file manifests and encrypted file chunks were encrypted by the CFS modules using user agnostic encryption, wherein use agnostic encryption requires, an encryption key be generated from the data to be encrypted, that data to be encrypted by the generated key, and an identifier be generated for that data; and
a cloud storage gateway coupled to wide area network and the cloud storage pool to translate requests from the client devices to cloud storage system application programming interface ("API") calls for the cloud storage pool.

140. The cloud storage system of claim 139, wherein the cloud storage gateway is configured to respond to prefetch commands from the CFS modules that instruct the cloud storage gateway to move from the cloud storage pool into a remote cache in the cloud storage gateway the encrypted file chunk chunks identified by the prefetch commands.

141. The cloud storage system of claim 139, wherein the CFSs generated by the content provider each contain the same content and that content was only uploaded one time.

142. A method for providing cloud storage, the method comprising:
storing, in a cloud storage system, user-agnostic encrypted user data of a plurality of files of a plurality of cloud file systems of a plurality of client devices of a plurality of users that has been deduplicated across the users, wherein the user-agnostic encrypted data was generated using the same user agnostic encryption function such that the same data encrypted for different ones of the users will produce identical encrypted data, wherein the user-agnostic encrypted data of each of the files of the cloud file systems of the client devices of the users includes one or more encrypted keys to decrypt that user-agnostic encrypted data, those one or more encrypted keys being encrypted with an encryption key unique to that user;

wherein each of the cloud file systems stored by the cloud storage system includes a path at which each file should be displayed by the corresponding client device, wherein each client device includes a root file system that comprises a file system hierarchy for accessing files and folders on the client device, wherein each cloud file system is mounted as one of a drive and a folder at a mount point in the folder hierarchy of the client device's storage system, wherein the cloud storage system acts as a primary storage of data for the cloud file systems, wherein the cloud storage system has substantially larger capacity than the client devices, and wherein the amount of storage space available to the users is based on the amount of storage in the cloud storage system.

143. The method of claim 142, wherein the user agnostic encryption function includes performing the following on data that is being encrypted:

generating a user agnostic encryption key from the data such that the user agnostic encryption key for that data will be the same regardless of the user that data belongs, encrypting the data with the generated user agnostic encryption key, and generating an identifier (ID) for the encrypted data such that the ID will be the same regardless of the user that encrypted data belongs.

144. The method of claim 142, wherein the cloud storage system stores as part of the cloud file systems file manifests and file system manifests, wherein each of the file manifests is based on the content of a file that file manifest represents and not the name or location of the file such that two users could have the same files with different names and/or locations in their corresponding file system manifest but resolve to the same file manifest.

145. The method of claim 142, wherein among the file system entries of each of the root file systems is an entry for the mounted cloud file system, wherein the cloud storage system stores a file system manifest for each such mounted cloud file system, wherein each file system manifest identifies files and folders in the mounted cloud file system along with information used to access those files, such as the file manifests corresponding with each file stored in that mounted cloud file system.

146. The method of claim 142, wherein the cloud storage system stores for each cloud file system a manifest encrypted with one of a user's user specific key and a user's user specific password, wherein these different manifests identify directly or indirectly the user-agnostic encrypted files of the different cloud file systems.

147. The method of claim 146, further comprising:

performing server based data decryption and access responsive to one of the users entering their user specific password into a secure web form provided by a web file access portal, wherein the server decrypts the required data from the cloud storage system on the fly to display during a web session, wherein the web file access portal acts as a pass through buffer, and does not maintain an unencrypted local cache of the cloud storage system.

148. The method of claim 142, wherein cloud storage system includes a cloud storage gateway and a cloud storage pool, the method further comprising:

receiving from one of the client devices an instruction to prefetch encrypted data from the cloud storage pool to a remote cache in the cloud storage gateway.

149. The method of claim 142, wherein each of the client devices presents the contents of its cloud file system to the respective user as if the cloud file system is a local device.

150. The method of claim 142, wherein folders in the cloud file systems of the respective client device are represented to the operating system of each to the respective client devices as having as an amount of free space the largest value available to the operating system to display.

151. An apparatus, comprising:

a cloud storage system that provides a plurality of users online storage and retrieval of their data, wherein the amount of storage space available to the users is based on the amount of storage of the cloud storage system, and wherein the cloud storage system is configured to perform the following:

store encrypted user data of the plurality of users in a user agnostic deduplicated manner, wherein the user data is encrypted using a same user agnostic encryption function such that the same data of different users produces identical encrypted data, store, for each of the users, one or more encrypted keys to decrypt the encrypted user data of at least that user, wherein the one or more encrypted keys to decrypt the encrypted user data of that user have been encrypted with an encryption key that is unique to that user, and wherein each piece of encrypted user data and the one or more encrypted keys to decrypt that piece of user data are stored in association with an identifier that has been generated such that the identifier would be the same regardless of which user that piece of encrypted user data belongs;

receive requests for different pieces of the stored encrypted user data from client devices of the users, wherein each request indicates an identifier for a piece of the stored encrypted user data; and in response to receipt of each of the requests, access the stored encrypted user data that corresponds to the identifier indicated in that request, and transmit the accessed stored encrypted user data to that client device.

152. The apparatus of claim 151, wherein the stored encrypted user data of at least one of the plurality of users is not permanently stored in a location other than the cloud storage system.

153. The apparatus of claim 151, wherein the user agnostic encryption function is further configured to perform, for each piece of user data that is to be stored in the cloud storage system, the following:

generate an encryption key from that piece of user data such that the encryption key for that piece of user data will be the same regardless of the user that data belongs; and encrypt that piece of user data with the generated encryption key.

154. The apparatus of claim 151, wherein the encrypted user data to be stored by the cloud storage system includes, for each of the plurality of users, one or more file manifests that each include a list of one or more identifiers for one or more pieces of the stored encrypted user data.

155. The apparatus of claim 154, wherein encrypted user data to be stored by the cloud storage system further includes for each of the plurality of users, one or more file system manifests that each include a list of one or more files that are encrypted and stored on the cloud storage system.

156. The apparatus of claim 155, wherein the encrypted user data to be stored by the cloud storage system further includes for each of the plurality of users, a user manifest that includes a list of the one or more file system manifests of that user.

157. The apparatus of claim 151, further comprising:
a web file access portal that is configured to provide the users access to their encrypted user data stored on the cloud storage system responsive to entering their user specific password into a secure web form provided by the web file access portal, wherein the web file access portal is configured to, upon receipt of a user specific password from a user, perform the following:
request and receive from the cloud storage system an encrypted user manifest belonging to the user;
decrypt the encrypted user manifest using the received user specific password, wherein a list of one or more files belonging to the user that are stored in the cloud storage system is derived from the user manifest; and
present a user interface that allows the user to explore the one or more files that are stored in the cloud storage system.

158. The apparatus of claim 157, wherein the web file access portal does not maintain an unencrypted local cache of the cloud storage system.

159. A method in a client device, comprising:
encrypting data of a file of a user of the client device with a user agnostic file encryption function, wherein the user agnostic file encryption function performs the following:
generating a user agnostic encryption key from the data;
encrypting the data with the encryption key; and
generating an identifier (ID) for the encrypted data based on the encrypted data;
encrypting the generated user agnostic encryption key with an encryption key that is unique to the user of the client device;
transmitting the encrypted data, the encrypted user agnostic encryption key, and the identifier to a cloud storage system that is to store the encrypted data in a user-agnostic deduplicated manner such that the encrypted data is deduplicated across a plurality of users;
receiving an instruction from an operating system of the client device to read the file that corresponds with the encrypted data;
transmitting a request for the encrypted data to the cloud storage system, wherein the request indicates the identifier for the encrypted data;
receiving the encrypted data and the encrypted user agnostic encryption key from the cloud storage system;
decrypting the encrypted user agnostic encryption key using the encryption key that is unique to the user of the client device; and
decrypting the received encrypted data using the decrypted user agnostic encryption key.

160. The method of claim 159, wherein the data for the file is one of a plurality of chunks of the file, and wherein the user agnostic file encryption function is performed on each of the plurality of chunks.

161. The method of claim 160, further comprising:
including the user agnostic encryption key for each chunk of the file and the identifier for that chunk of the file in a file manifest;
generating a file manifest encryption key based on the data within the file manifest;
encrypting the file manifest using the file manifest encryption key; and
generating a file manifest identifier based on data within the encrypted file manifest.

162. The method of claim 161, further comprising:
including the file manifest encryption key and the file manifest identifier in a file system manifest that includes a listing of the file manifest and one or more other file manifests belonging to different files of the user; and
encrypting the file system manifest with the encryption key that is unique to the user of the client device.

\* \* \* \* \*